(12) United States Patent
Putman et al.

(10) Patent No.: US 9,015,297 B2
(45) Date of Patent: Apr. 21, 2015

(54) COMMUNICATION APPLICATION SERVER FOR CONVERGED COMMUNICATION SERVICES

(75) Inventors: Janis Rae Putman, Hillsborough, NJ (US); Mai-Huong Nguyen, Rockville, MD (US); Thomas C. Hanson, Boulder, CO (US); Suchitra Srinivasan, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 1817 days.

(21) Appl. No.: 10/484,400

(22) PCT Filed: Jan. 14, 2003

(86) PCT No.: PCT/US03/01097

§ 371 (c)(1),
(2), (4) Date: Jan. 21, 2004

(87) PCT Pub. No.: WO03/061242

PCT Pub. Date: Jul. 24, 2003

(65) Prior Publication Data

US 2008/0086564 A1    Apr. 10, 2008

Related U.S. Application Data

(60) Provisional application No. 60/348,776, filed on Jan. 15, 2002, provisional application No. 60/363,377, filed on Mar. 11, 2002.

(51) Int. Cl.
G06F 15/16    (2006.01)
G06F 15/173   (2006.01)
(Continued)

(52) U.S. Cl.
CPC ............. *H04L 29/06* (2013.01); *H04L 67/16* (2013.01); *H04L 67/02* (2013.01); *H04L 67/10* (2013.01); *H04L 67/142* (2013.01)

(58) Field of Classification Search
CPC ....... H04L 29/06; H04L 67/16; H04L 67/142; H04L 67/10; H04L 67/02

USPC .......... 709/203, 219, 222–223; 370/458, 466, 370/493
See application file for complete search history.

(56) References Cited

U.S. PATENT DOCUMENTS 5,835,724 A * 11/1998 Smith .......................... 709/227
5,878,118 A    3/1999 Mohr
(Continued)

FOREIGN PATENT DOCUMENTS

EP    1098490 A2    5/2001
JP    08-237371      9/1998
(Continued)

OTHER PUBLICATIONS

E. Bayeh, "The WebSphere Application Server Architecture and Programming Model," IBM Systems Journal, vol. 37, No. 3, pp. 336-348, 1998.

(Continued)

*Primary Examiner* — Shripal Khajuria
*Assistant Examiner* — Farhad Ali

(57) ABSTRACT

A communication application server for supporting converged communications in a communication system. The communication application server is responsive to communication service requests from external endpoints, applications or other c requesting entities, and in one embodiment comprises at least first and second components. The first component is operative: (i) to process a given one of the communication service requests to identify at least one corresponding communication service supported by the communication application server, (ii) to determine one or more executable communication tasks associated with the identified communication service; and (iii) to establish communication with one or more external servers to carry out execution of at least a subset of the one or more executable communication taks associated with the communication service. The second component is coupled between the first component and the one or more external servers, and provides, for each of the external servers, a corresponding interface for connecting the communication application server to the external server.

26 Claims, 29 Drawing Sheets

(51) Int. Cl.
H04L 29/06 (2006.01)
H04L 29/08 (2006.01)

(56) References Cited

U.S. PATENT DOCUMENTS

| | | | |
|---|---|---|---|
| 6,161,008 A * | 12/2000 | Lee et al. | 455/415 |
| 6,266,341 B1 * | 7/2001 | Surprenant et al. | 370/458 |
| 6,498,791 B2 * | 12/2002 | Pickett et al. | 370/353 |
| 6,704,394 B1 | 3/2004 | Kambhatla et al. | |
| 6,981,263 B1 * | 12/2005 | Zhang et al. | 719/310 |
| 7,120,139 B1 * | 10/2006 | Kung et al. | 370/352 |
| 2001/0036173 A1 * | 11/2001 | Shmulevich et al. | 370/352 |
| 2001/0036176 A1 * | 11/2001 | Girard | 370/352 |
| 2001/0047385 A1 * | 11/2001 | Tuatini | 709/203 |
| 2002/0091533 A1 | 7/2002 | Ims et al. | |
| 2003/0018700 A1 * | 1/2003 | Giroti et al. | 709/201 |
| 2004/0054690 A1 | 3/2004 | Hillerbrand et al. | |
| 2004/0201611 A1 | 10/2004 | Bagsby | |
| 2005/0096960 A1 | 5/2005 | Plutowski et al. | |
| 2006/0163338 A1 | 7/2006 | Allen et al. | |

FOREIGN PATENT DOCUMENTS

| | | |
|---|---|---|
| JP | 2000-032138 | 1/2000 |
| WO | WO 01/86486 A2 | 11/2001 |

OTHER PUBLICATIONS

Rosenberg et al., "An Application Server Component Architecture for SIP," Internet Engineering Task Force, pp. 1-38, Mar. 2001.

J. Rosenberg et al., "An Application Server Architecture for Communications Services," White Paper, Dynamicsoft, pp. 1-12, 2000.

Guenther, Koerbler, "EP Application No. 03705767.6 Office Action Nov. 10, 2010", , Publisher: EPO, Published in: EP.

Dianda et al. "Programmable Service Platforms for Converged Voice/Data Services," *Bell Labs Technical Journal*, Jul.-Sep. 2000.

Leymann et al., "Web services and business process management", "IBM Systems Journal", 2002, vol. 41, No. 2.

Thone et al., "Process-Oriented, Flexible Composition of Web Services with UML", 2002, Publisher: University of Paderborn Germany.

Greenfield et al., "Software Factories—Assembling Applications with Patterns, Models, Frameworks and Tools", "Conference on Object Oriented Programming, Systems, Languages, and Applications OOPSLA '03 Anaheim, CA", Oct. 26-30, 2003.

Askary et al, "OASIS—Web Services Business Process Execution Language", "Working Draft 01, Sep. 8, 2004", , Publisher: OASIS Open, Inc.

Parlay X Working Group, "Parlay 4.0—Parlay X Web Services Specification", "Version 1.0", May 9, 2003, Publisher: The Parlay Group, Inc.

Gorney, Boris, "U.S. Appl. No. 11/099,242 Notice of Allowance Sep. 7, 2010", , Publisher: USPTO, Published in: US.

Gorney, Boris, "U.S. Appl. No. 11/099,242 Office Action Nov. 17, 2009", , Publisher: USPTO, Published in: US.

Gorney, Boris, "U.S. Appl. No. 11/099,242 Office Action Nov. 26, 2008", , Publisher: USPTO, Published in: US.

Gorney, Boris, "U.S. Appl. No. 11/099,242 Office Action Apr. 9, 2010", , Publisher: USPTO, Published in: US.

Gorney, Boris, "U.S. Appl. No. 11/099,242 Office Action May 18, 2009", , Publisher: USPTO, Published in: US.

Gorney, Boris, "U.S. Appl. No. 11/099,242 Office Action Jul. 22, 2010", , Publisher: USPTO, Published in: US.

Gorney, Boris, "U.S. Appl. No. 11/099,242 Panel Decision Sep. 18, 2009", , Publisher: USPTO, Published in: US.

Denic, Sanja, "CA Application No. 2,469,664 Office Action May 12, 2011", , Publisher: CIPO, Published in: CA.

Denic, Sanja, "CA Application No. 2,469,664 Office Action Mar. 11, 2010", , Publisher: CIPO, Published in: CA.

Ebsen, C., "CA Application No. 2,469,664 Office Action Apr. 7, 2005", , Publisher: CIPO, Published in: CA.

Che, Ada, "CA Application No. 2,469,664 Office Action May 14, 2008", , Publisher: CIPO, Published in: CA.

Betsuki, K., "JP Application No. 2003-561205 Office Action Aug. 27, 2007", , Publisher: JPO, Published in: JP.

\* cited by examiner

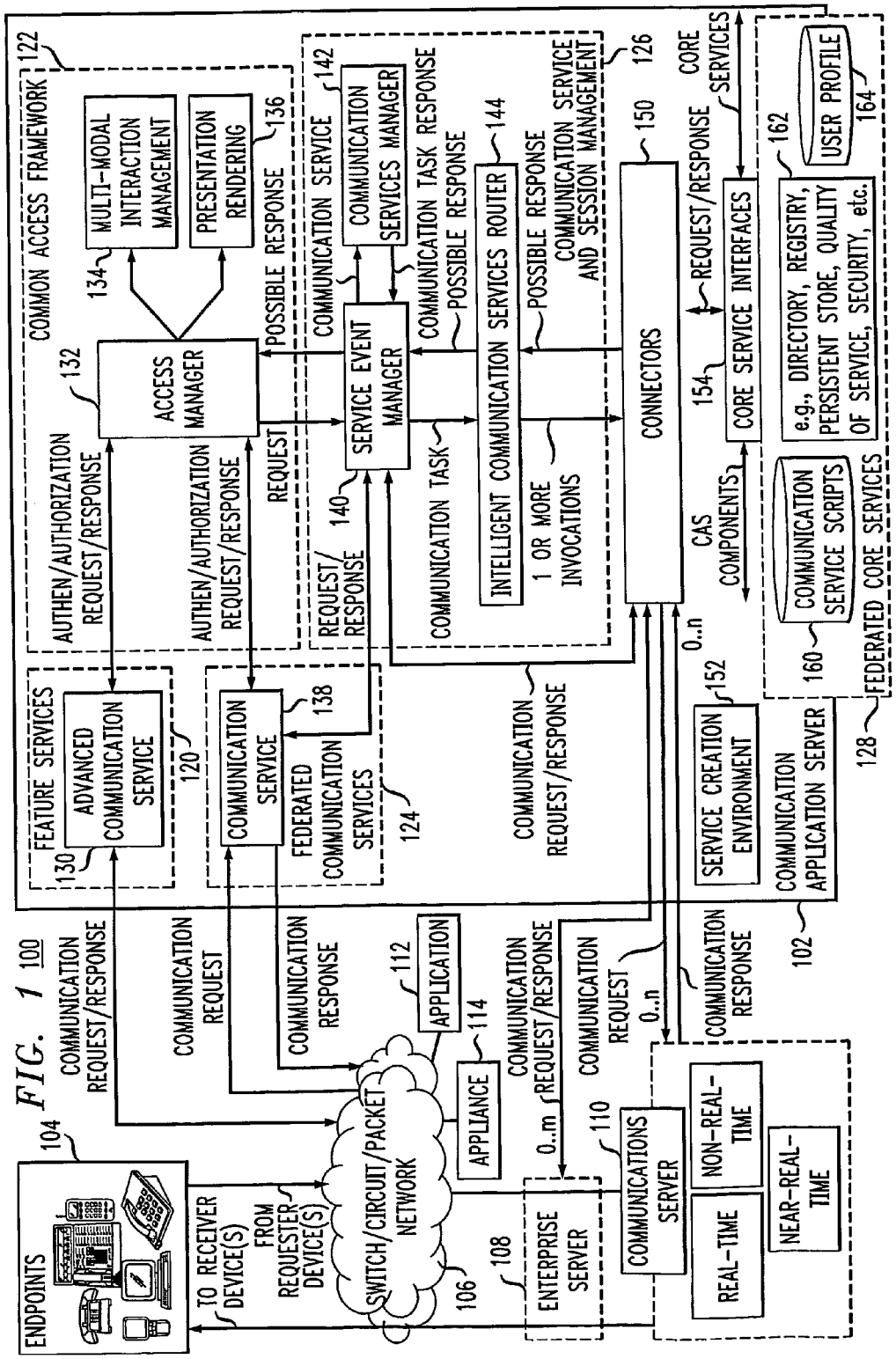

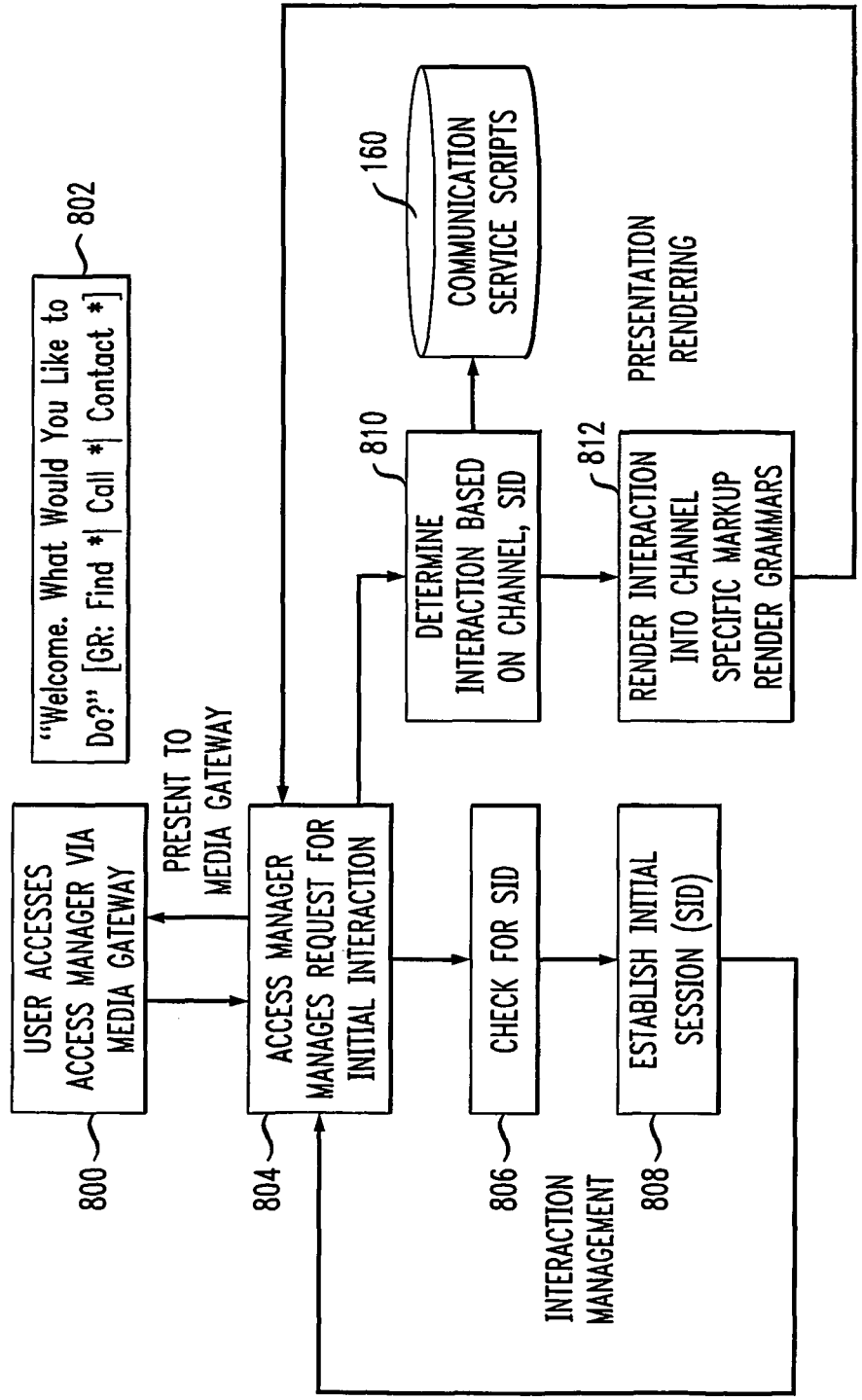

VIRTUAL ENTERPRISE

FIG. 22

COMMUNICATION APPLICATION SERVER FOR CONVERGED COMMUNICATION SERVICES

RELATED APPLICATION(S)

The present application claims the priority of U.S. Provisional Patent Application Ser. No. 60/348,776 filed Jan. 15, 2002 in the name of inventors J. R. Putman et al. and entitled "Communication Application Server for Converged Communications Services," and U.S. Provisional Patent Application Ser. No. 60/363,377 filed Mar. 11, 2002 in the name of inventors J. R. Putman et al. and entitled "Communication Application Server for Converged Communications Services and Federated Services," both of which are incorporated by reference herein.

FIELD OF THE INVENTION

The present invention relates generally to the field of communication systems, and more particularly to techniques for implementing communication services within such systems.

BACKGROUND OF THE INVENTION

Efficient communication services are integral to the success of any enterprise. However, as enterprises "virtualize," it is becoming increasingly difficult to provide the requisite degree of communication efficiency using conventional techniques. Moreover, efficient communication must occur not only within a given enterprise but also between multiple enterprises. Unfortunately, conventional stand-alone telephony systems or other types of communication system hardware and software are often unable to provide adequate support for the many different modes of communication that may be required as integral parts of the business process of a given enterprise, particularly a virtual enterprise. The needs of a virtual enterprise dictate that the user experience be consistent and personalized, regardless of the mechanism or location for collaboration. In addition, business performance needs dictate that the existing enterprise infrastructure be leveraged, regardless of types of applications or services.

One conventional approach to converged communications involves deploying multiple applications on an Internet Protocol (IP) network. However, this approach is problematic in that it addresses only certain aspects of infrastructure convergence. Virtual enterprises need their users and applications to be interconnected regardless of the particular type of network infrastructure which is utilized.

Improved communication techniques are therefore needed which address the convergence of voice, data and other communication applications across disparate communication networks, while also providing the ability to handle seamlessly both real-time and non-real-time communications as demanded by a virtual enterprise.

SUMMARY OF THE INVENTION

The present invention provides a communication application server, and an associated method and article of manufacture, for providing converged communications in a manner which addresses one or more of the above-noted issues.

In accordance with one aspect of the invention, a communication application server is provided for supporting converged communications in a communication system. The communication application server is responsive to communication service requests from external endpoints, applications or other requesting entities, and in an illustrative embodiment comprises at least first and second components in the form of a communication service and session management component and a connectors component, respectively.

The communication service and session management component in the illustrative embodiment is operative: (i) to process a given one of the communication service requests to identify at least one corresponding communication service supported by the communication application server; (ii) to determine one or more executable communication tasks associated with the identified communication service; and (iii) to establish communication with one or more external servers to carry out execution of at least a subset of the one or more executable communication tasks associated with the communication service.

The connectors component is preferably coupled between the communication service and session management component and the one or more external servers, and provides, for each of the external servers, a corresponding interface for connecting the communication application server to the corresponding external server.

The communication service and session management component in the illustrative embodiment may include a service event manager, a communication services manager, and an intelligent router.

The communication application server in the illustrative embodiment may include one or more additional components, such as a common access framework component with an access manager, a feature services component, a federated communication services component, a federated core services component, and a service creation environment.

In accordance with another aspect of the invention, the communication service and session manager component of the communication application server includes a session manager operative to manage session information associated with the communication services request. The session information may comprise a session hierarchy. More specifically, the session hierarchy may comprise a user session associated with a plurality of communication services, a service session associated with a given one of the plurality of communication services, and a communication session associated with a communication task corresponding to the given one of the plurality of communication services. By way of example, the communication session may comprise one or more of a telephony session, a messaging session, an instant messaging session and a presence session. The communication session generally corresponds to a given one of the executable communication tasks associated with the given communication service, and may involve execution of at least a portion of the communication task by one of the external servers.

BRIEF DESCRIPTION OF THE DRAWINGS

FIG. 1 shows an illustrative embodiment of a communication system including a communication application server (CAS) in accordance with the invention.

FIGS. 8A and 8B show examples of the operation of an access manager in a CAS in accordance with the invention.

FIGS. 19 through 24 illustrate exemplary communication systems and operating configurations utilizing a CAS in accordance with the invention.

DETAILED DESCRIPTION OF THE INVENTION

Figure 2A:
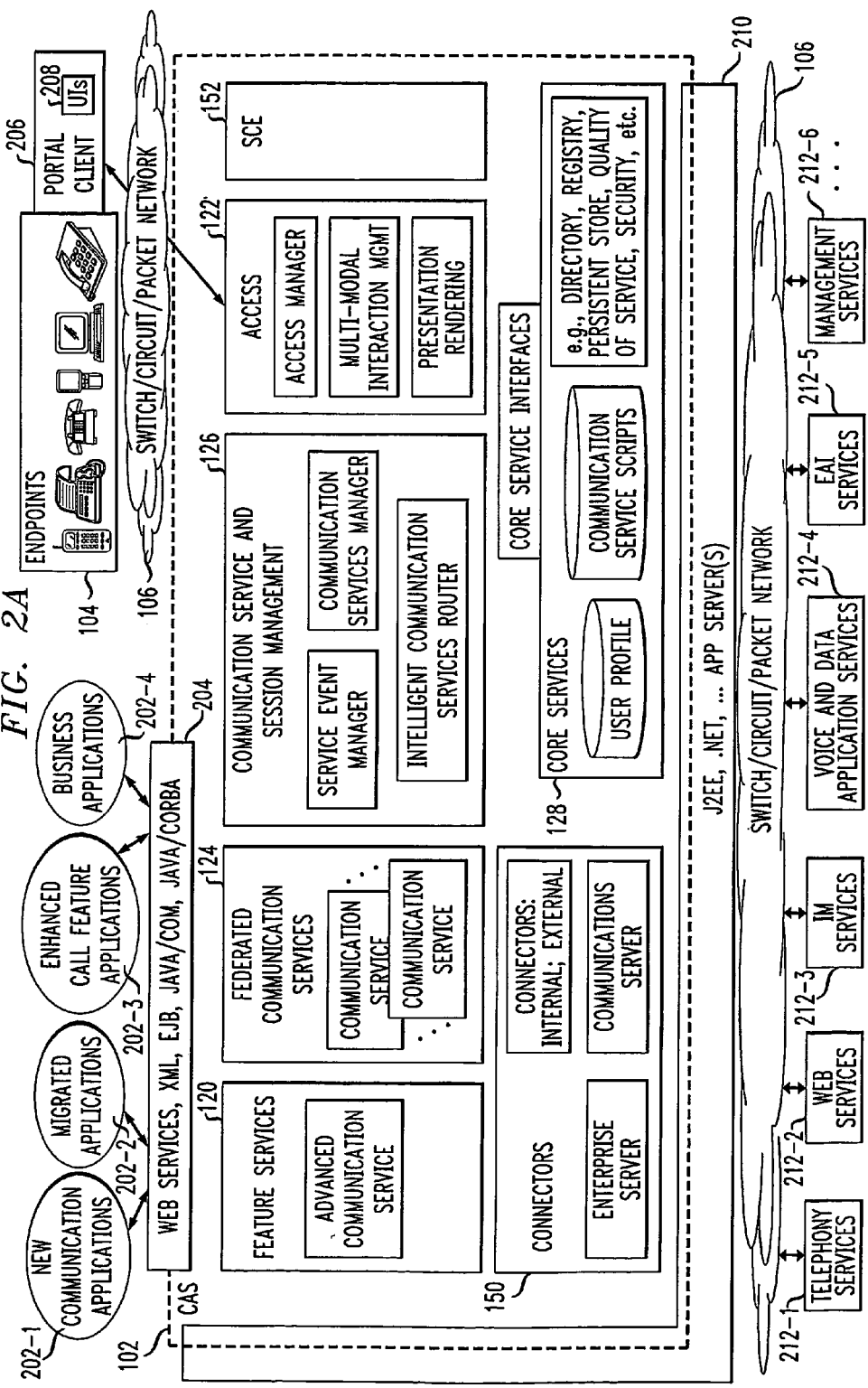
FIGS. 2A, 2B and 2C show examples of alternative implementations of communication systems each including a CAS in accordance with the invention.

The present invention will be illustrated herein as implemented in exemplary communication systems. It should be understood, however, that the invention does not require the use of the particular system configurations shown, and is more generally suitable for use in conjunction with any communication system or communication service application for which improved processing efficiency is desired.

The illustrative embodiments of the invention may make use of the Session Initiation Protocol (SIP), described in Internet Engineering Task Force (IETF) Request for Comments (RFC) 3261, "SIP: Session Initiation Protocol," Jun. 2002, which is incorporated by reference herein. For example, SIP enables the disaggregation of real-time communication services into simpler components that can be re-aggregated as necessary with other applications and services to support the needs of a virtual enterprise in a flexible and open environment. For both enterprise and service provider use, SIP provides lowered total cost of deployment and more rapid application development.

The present invention in an illustrative embodiment thereof is directed to a communication application server (CAS) configured to provide converged communications services. More particularly, in the illustrative embodiment, the CAS is configured to communication-enable enterprise applications, as well as multimodal clients, including all voice, messaging, media, and other communication services.

In addition, the CAS supports SIP service offerings, data service offerings, voice service offerings, and extensible Markup Language (XML) dialects associated with communication. The CAS also supports the convergence of voice and data in and among enterprises.

Advantageously, the present invention in the above-noted illustrative embodiment provides techniques for achieving convergence within and across all means of communication, including but not limited to voice and data applications, disparate network infrastructures, disparate network services, and both real-time and non-real-time communication. For example, the present invention allows for the seamless collaboration between a variety of devices (e.g., wired telephones, mobile telephones, IP soft phones, pagers, personal digital assistants (PDAs), personal computers (PCs), etc.), interacting using a variety of mechanisms (e.g., phone calls, instant messaging, email), over a variety of media (e.g., voice, text, text-to-speech (TTS), etc.), and over multiple network infrastructures (e.g., IP, PSTN, wireless, etc.). The present invention thus allows enterprises to better leverage their existing investments and manage cost while improving productivity.

A CAS in accordance with the invention can be configured to utilize common communication services as incremental building blocks, such that more complex composable services based on these building blocks may be provided in a particularly efficient manner to enterprise applications and other end users. For example, an "establish a call" service may be provided to the user at a PDA, PC, wireless phone, PC based softphone, or other endpoint device. This service can be initiated as a data request, a voice request or in another suitable format. The CAS may be configured to address issues such as presence of the callee and/or caller; communication network that hosts the callee and/or caller; mode of device (e.g., PSTN, IP telephony, SIP, etc.); context of the callee and/or caller; management of security, profiling, personal call receipt preferences, call event, context of the callee and/or caller; and management of the actual call connection. These and other CAS-based communication service processing operations may be provided transparently to the initiator of the "establish a call" service.

The present invention can illustratively operate with a wide variety of SIP-based technologies, including, by way of example, an Avaya Call Processing (ACP) Enterprise Communication Service (ECS) switch, from Avaya Inc. of Basking Ridge, N.J., USA, which may be used as a SIP-enabled call feature platform, supporting SIP proxy, registrar, media gateway, and signaling gateway functions, as well as Avaya 4624 and Avaya 4630 Screen Phones functioning as SIP phones, with multi-modal, instant messaging (IM), and presence capabilities, or a SIP application server supporting VoiceXML and rules-based notification communication services, integrated with a business application. These are examples of Avaya products, but it should be understood that the invention does not require the use of any particular product, nor does it require the use of products from any particular vendor. Numerous other arrangements of communication hardware and software, from a wide variety of vendors, can be utilized in implementing the invention, as will become more readily apparent from the following description of the illustrative embodiments.

Communication Application Server (CAS) Architecture

FIG. 1 shows a communication system 100 which includes a communication application server (CAS) 102 in accordance with an illustrative embodiment of the invention. The system 100 further includes a set of endpoints 104, a network 106, an enterprise server 108, and a communications server 110. The endpoints 104, CAS 102, enterprise server 108 and communications server 110 are each coupled to the network 106. In addition, the enterprise server 108 and communications server 110 are coupled to the CAS 102 via connectors to be described in greater detail below. Also coupled to the network 106 are additional elements including an application 112 and an appliance 114.

The term "appliance" as used herein is intended to refer to one particular example of an endpoint.

The term "endpoint" refers to any device capable of communication, including appliances, sensors, electrical or electronic devices, end user communication devices, etc.

As a more particular example, the endpoints 104 may comprise one or more end user communication devices such as wired telephones, mobile telephones, IP soft phones, Bluetooth devices, pagers, PDAs, personal computers, or other types of communication system endpoints, configured in a conventional manner. The network 106 may comprise switch, circuit or packet components in any combination. For example, the network 106 may comprise an IP network, a public switched telephone network (PSTN), a wireless network, a cable network, a cellular network, a satellite network, or portions or combinations of these or other types of networks.

The enterprise server 108 runs enterprise software applications providing functions such as customer relationship management (CRM), supply chain management, employee resource management, sales force automation, databases, back office applications, etc.

The communications server 110 illustratively includes elements for supporting real-time communications, such as conventional telephony and IP telephony, non-real-time communications, such as email and messaging, and near-real-time communications, such as instant messaging, chat and short message services.

The servers 108, 110 may be co-resident with the CAS or geographically remote therefrom, and each may be implemented in a single-server configuration, or in a distributed configuration so as to comprise multiple distributed servers.

The servers 108, 110 are examples of what are more generally referred to herein as "external servers." However, it should be noted that the term "external server" as used herein is intended to be more generally construed so as to include, by way of example and without limitation, a server which is functionally separate from the CAS but implemented on the same processing platform as the CAS.

The CAS 102 as shown in this illustrative embodiment includes a feature services component 120, a common access framework 122, a federated communication services component 124, a communication service and session management component 126, and a federated core services component 128. These particular components are shown by way of example only. It should therefore be appreciated that a CAS in accordance with the invention may be implemented using other arrangements of components.

The term "federated" as used herein is intended to refer generally to centralized services that can be discovered or invoked across domains, in a manner substantially independent of the particular configuration or characteristics of any given domain, using a common framework or infrastructure. Such services generally can be dynamically located and executed. These services typically do not belong to the invoker, but are instead autonomous services.

The feature services component 120 includes one or more advanced communication service elements 130.

The common access framework 122 includes an access manager 132, a multi-modal interaction management element 134, and a presentation rendering element 136. The multi-modal interaction management element 134 and the presentation rendering element 136 may be considered elements of the access manager 132, or may be implemented as stand-alone elements separate from the access manager 13,.

The federated communication services component 124 includes one or more communication service elements 138.

The communication service and session management component 126 includes a service event manager 140, a communication services manager 142, and an intelligent communication services router 144.

Also included in the CAS 102 is a set of connectors 150 which provide an interface between the CAS and each of the servers 108, 110. As shown in the figure, the connectors 150 send up to m communication requests to the server 108 and receive zero or more corresponding responses in accordance with the form of the request(s), and send up to n communication requests to the server 110 and receive zero or more corresponding responses in accordance with the form of the request(s), where n and m are each greater than or equal to zero. Certain types of requests therefore need not receive a particular response. Other types of interaction between the connectors component 150 and the external servers may be used.

Although not explicitly shown in the figure, routing requests and corresponding responses may be passed between the service event manager 140 and the intelligent router 144, and between the intelligent router 144 and the connectors 150. Alternatively, such routing requests and corresponding responses may be viewed as being part of the interactions explicitly shown between these elements in the figures.

The CAS 102 further includes a service creation environment (SCE) 152 which comprises one or more software tools for use in developing services supported by the CAS 102 and other components of the system 100. For example, the service creation environment 152 may comprise a set of software development toolkits that enable a developer to compose the services offered by the CAS 102, to create higher level services from the communication services offered by the CAS 102, to integrate the CAS 102 into capabilities associated with a given customer environment, or to provide other service creation functionality.

A set of core services interfaces 154 provides interfaces between the core services component 128 and other components of the CAS 102. For example, communication requests and associated responses may be sent over these interfaces.

The federated core services component 128 includes a communication service scripts database 160, core services information 162, and a user profile database 164.

The communication service scripts database may include, for example, voiceXML scripts, Call Processing Language (CPL) scripts, Xforms, CommXML, ccXML, or information configured using any other scripting engine or language suitable for interaction with the CAS. These scripts may alternatively be co-resident in whole or in part with the communication service and session management component 126.

The core services information 162 may include, for example, a directory, a registry, a persistent store, Quality of Service (QoS) information, etc.

The communication service scripts 160 are also referred to herein as "communication scripts," "comm scripts," or simply "scripts."

The core services component 128 is shown in dashed outline in the figure in that it is preferably a centralized component, one or more portions of which may be shared across multiple CASs in a given communication system.

Examples of federated core services include communicating user management, identification, profile, roles, directory, metadirectory, QoS, feature licensing, service licensing, service registry, communicating user presence, communicating user context, security, feature access lists, etc.

As shown in FIG. 1, a given one of the endpoints 104 may represent a requesting device for a particular communication service, while another of the endpoints 104 represents a receiver device for that communication service. Communication request and response information is communicated between the endpoints 104, the CAS 102, and the servers 108, 110 over the network 106. Request and response information relating to authentication and authorization is communicated between the access manager 132 and elements 130, 138. The access manager 132 also communicates with the service event manager, 140 and the presentation rendering element 136 regarding possible responses to a given communication task. The service event manager 140 may also communicate with the communication services manager 142, intelligent communication services router 144 and via router 144 with the connectors 150 in determining the possible responses to a given communication task.

The CAS 102 may be implemented on a general-purpose computer or other data processing platform which comprises a processor coupled to a memory and one or more network interfaces. The term "processor" as used in this context is intended to be construed generally so as to encompass any arrangement of one or more microprocessors or other digital data processing devices configured in a conventional manner. The memory may include RAM, ROM, disk-based storage or other types of storage devices, including one or more persistent store elements, also configured in a known manner, and in any combination. The communication processing functions described herein are implemented at least in part in the form of one or more software programs which are stored in the memory and executed by the processor.

The CAS 102 as shown in FIG. 1 is by way of illustrative example only, and should not be construed as limiting the scope of the invention in any way. Other embodiments of the invention can be configured in which the CAS 102 includes only a subset of the elements shown in FIG. 1, such as, for example, the communication service and session management component 126 with elements 140, 142 and 144, and the connectors component 150. Other arrangements of components may be used to provide CAS functionality in accordance with the invention.

Figure 2B:
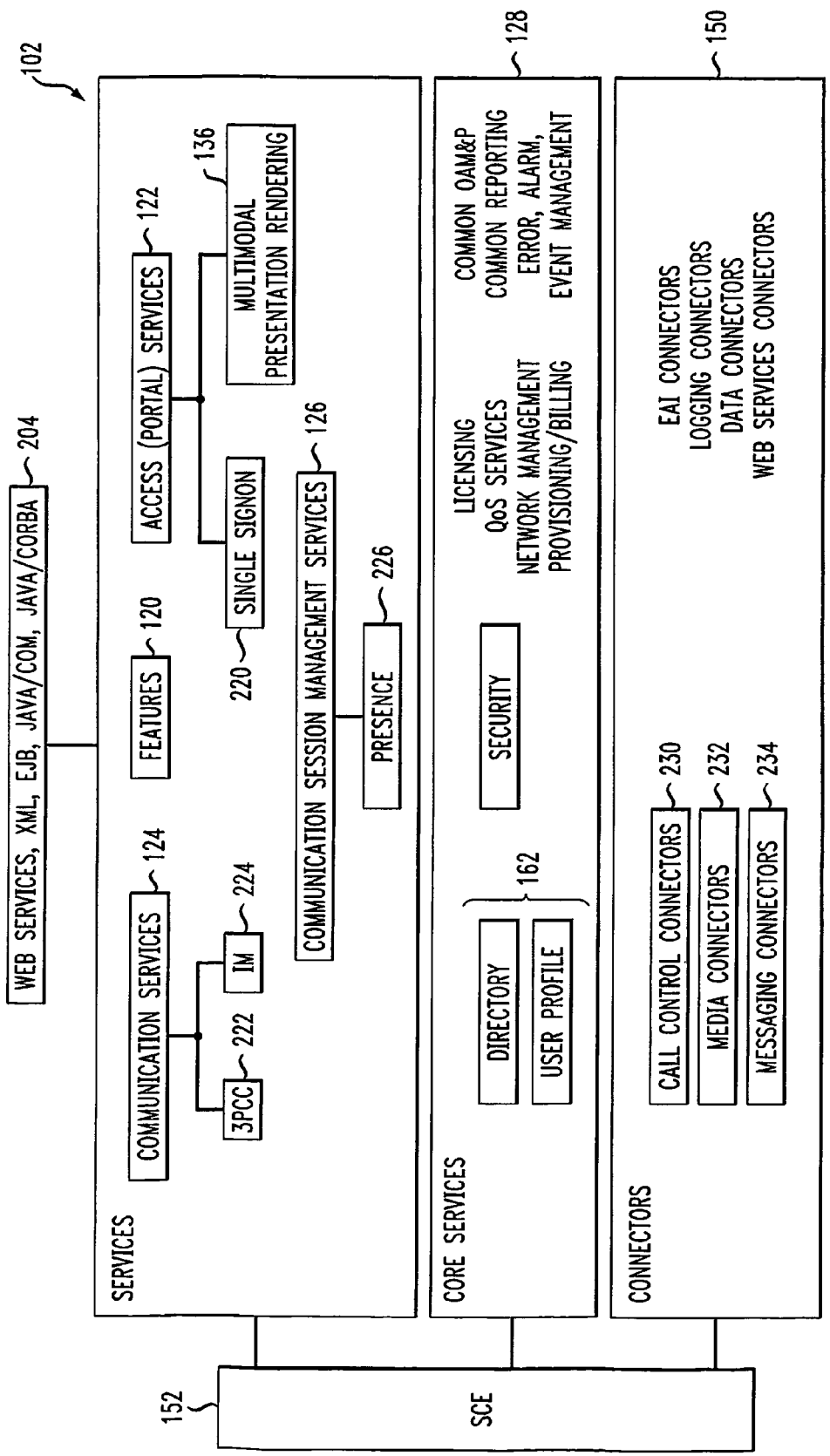
Figure 2C:
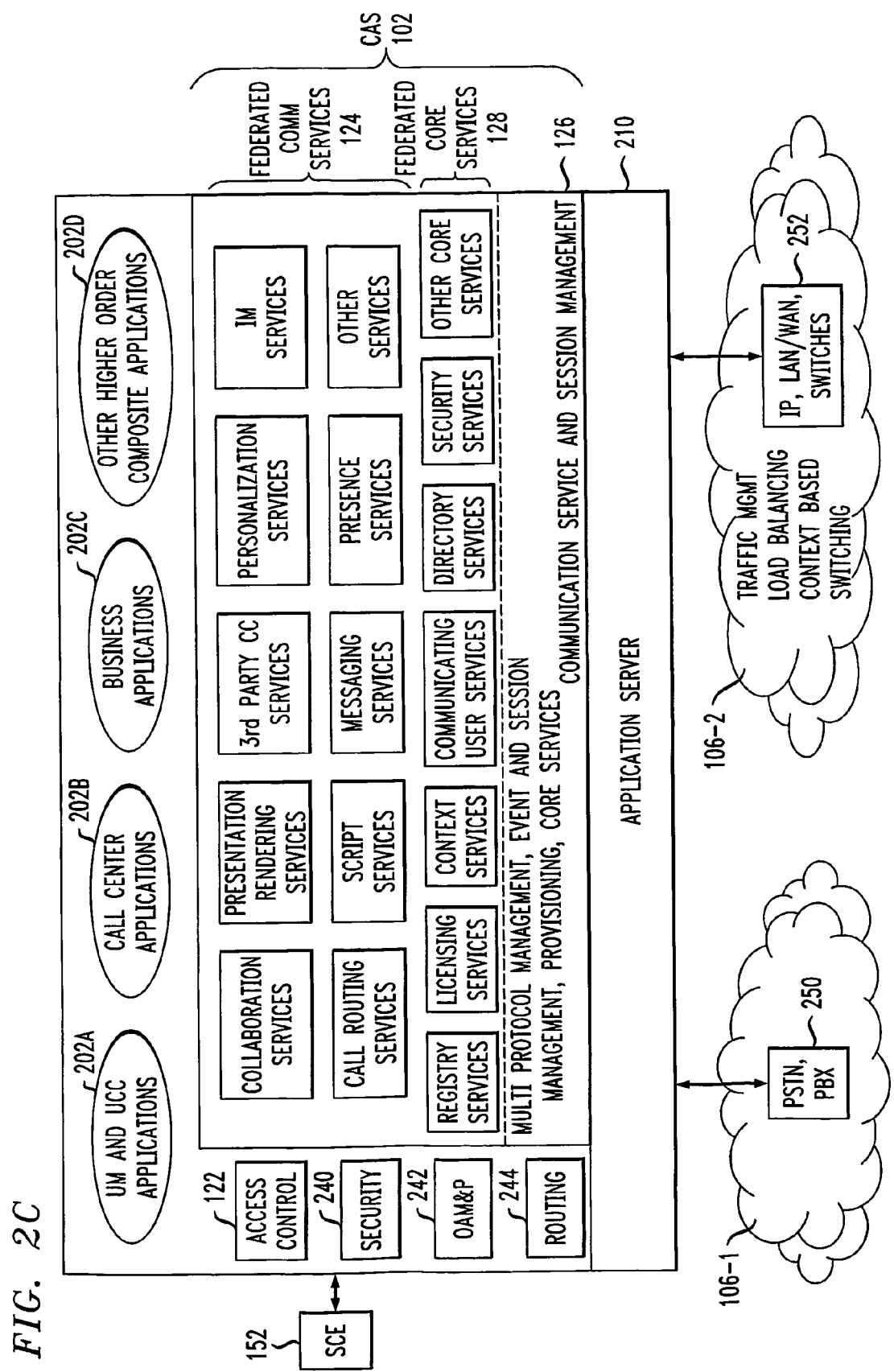

FIGS. 2A, 2B and 2C show examples of alternative implementations of communication systems including a CAS in accordance with the invention.

With reference now to FIG. 2A, the CAS 102 is shown as including components 120, 122, 124, 126 and 128, as well as the connectors component 150 and service creation environment 152, all configured substantially as previously described.

The CAS in this illustration provides support for a set of communication applications which include, by way of example, "new" communication applications 202-1, migrated applications 202-2, enhanced call feature applications 202-3, and business applications 202-4. The applications 202-1 may represent applications developed for the CAS using the service creation environment 152, while the applications 202-2 may represent legacy applications migrated from other processing platforms. The applications 202-3 are configured to provide enhanced call features using the capabilities of the CAS. The applications 202-4 may comprise one or more business communication applications configured in a conventional manner. The applications 202, which may be resident on one or more of the servers 108, 110, communicate with the CAS via interfaces 204. The interfaces 204 may utilize well-known conventional functionality such as web services, XML, Enterprise Java Beans (EJB), Common Object Request Broker Architecture (CORBA), Java/COM, Java/CORBA, etc.

Although not specifically shown in the figure, other services may be supported using the CAS 102, such as, for example, enterprise class services, Simple Object Access Protocol (SOAP) services, voice services, Net services, etc.

The CAS is coupled to endpoints 104 via the network 106, and also to a portal client 206 which includes one or more user interfaces (UIs) 208.

One or more of the components of the CAS may be managed in an application server environment utilizing one or more application servers 210 which may include a Java 2, Enterprise Edition (J2EE) application server, a Net server or other type of application server, as well as combinations of such servers. The application servers 210 may be configured, for example, to provide so-called container services, in a conventional manner. One or more of the components of the CAS communicate over network 106 via open interfaces with external components 212 including a telephony services component 212-1, a web services component 212-2, an instant messaging (IM services component 212-3, a voice and data application services component 212-4, an Enterprise Application Integrator (EAI) services component 212-5, and a management services component 212-6. Each of the external components 212 may comprise a server or other data processing platform One or more of the external components may be combined onto a single server or other platform.

The external components 212 preferably communicate with the CAS 102 via network 106 using well-known conventional protocols, such as SIP, Adjunct/Switch Applications Interface (ASAI), Computer Supported Telephony Application (CSTA), XML, SOAP, JMS, JTA, Java Connector Architecture (JCA), JAXR, JAXP, VoiceXML, Common Profile for Instant Messaging (CPIM), Internet Messaging Access Protocol—Version 4 (IMAP4), Java Naming and Directory Interface (JNDI), Lightweight Directory Access Protocol (LDAP), Security Assertion Markup Language (SAML), Directory Services Markup Language (DSML), Simple Network Management Protocol (SNMP), etc. The invention does not require the use of any particular protocol, however, for these or other communication system elements.

The communication services implementable under the control of the CAS 102 are initiated by the CAS but may execute at least in part on physical servers or other devices external to the CAS. The actual execution devices can be distributed over any number of physical locations, and can be hosted on servers such as those providing access to or otherwise associated with components 212 of FIG. 2A, including J2EE application servers, Linux servers, .Net servers, etc. It is also possible that one or more of the communication services may execute at least in part on the same physical platform on which the CAS is implemented. Communication services can be offered via the CAS to enterprise applications, endpoint devices, or other system elements, without limitation.

For example, an enterprise application, such as a supply chain management application running on enterprise server 108, can interact with the CAS through one of the connectors 150 and hence gain access directly to the communication services manager 142. Note that this avoids authentication and access control in the access manager 132, thereby enabling the CAS to grant access to applications as well as appliances or other devices. If an application gains access to the CAS, it may or may not have been previously authenticated and authorized for the access. This is preferably an enterprise policy decision, established at administration time. However, if a communication service request is authorized only to selected individuals, is resource constrained, or is otherwise considered critical, a policy may be established that the request be required to re-authenticate and re-authorize the use of the service by requesting authentication and authorization from the access manager.

There may be multiple CASs associated with a given enterprise. Moreover, different instances of a given CAS can cooperate across different domains.

Referring now to FIG. 2B, an alternative implementation of a communication system including a CAS 102 is shown. The CAS 102 as shown in this figure includes components 120, 122, 124, 126 and 128, as well as the connectors component 150 and service creation environment 152, all configured substantially as previously described. The CAS 102 interacts with external applications via interfaces 204, which as noted previously may include well-known conventional interfaces such as web services, XML, EJB, Java/COM, Java/CORBA, etc.

In this implementation, common access framework component 122 comprises access or portal services for providing a single sign-on function 220 and multimodal presentation rendering 136. Communication service component 124 provides a third-party call control (3PCC) function 222 and IM function 224. Communication session management component 126 provides a presence function 226.

Examples of the core services associated with component 128 in this embodiment include licensing, QoS services, network management, provisioning and billing, common operations, administration, maintenance and provisioning (OAM&P), common reporting, and error, alarm and event management.

The connectors 150 in FIG. 2B are shown as including call control connectors 230, media connectors 232, and messaging connectors 234. More specific examples include EAI connectors, logging connectors, data connectors and web services connectors.

FIG. 2C shows another possible implementation of a communication system comprising CAS 102. In this implementation, the CAS 102 includes an access component 122, a set of federated communication services 124, a communication service and session management component 126 which may be implemented as a communication session management server, and a set of federated core services 128. Also shown are a number of additional functional components, including a security component 240, an OAM&P component 242, and a routing element 244. The routing element 244 may comprise or otherwise correspond to the intelligent communication service router 144 described in conjunction with FIG. 1. One or more additional components, such as other CAS components described in conjunction with FIG. 1, may also be included.

The federated communication services 124 in this implementation include collaboration services, presentation rendering services, 3PCC services, personalization services, rM services, call routing services, script services, messaging services, presence services, and one or more other services. The federated core services 128 in this implementation include registry services, licensing services, context services, communicating user services, directory services, security services, and one or more other core services. It should be noted that services identified in FIG. 2C as being "federated" may alternatively be implemented in a non-federated manner.

The CAS 102 in FIG. 2C interacts with external applications 202, including Unified Messaging (UM) & Unified Communications Center (UCC) applications 202A, call center applications 202B, business applications 202C, and other higher order composite applications 202D. The CAS 102 is coupled to or otherwise associated with the service creation environment 152 as shown. The CAS 102 is also coupled to via an application server 210 to a network 106 comprising first and second network portions 106-1 and 106-2. Network portion 106-1 includes a number of telephony elements 250 such as a Private Branch Exchange (PBX) and PSTN. Network portion 106-2 includes a number of telephony elements 252 such as IP telephony elements, local area and wide area network elements, and associated switches, configured for providing traffic management, load balancing and context based switching in a conventional manner.

As noted above, a given communication system in accordance with the invention may include multiple CASs, each implemented in a manner similar to CAS 102 as described above. An example of such a system will now be described with reference to FIG. 3A.

Figure 3A:
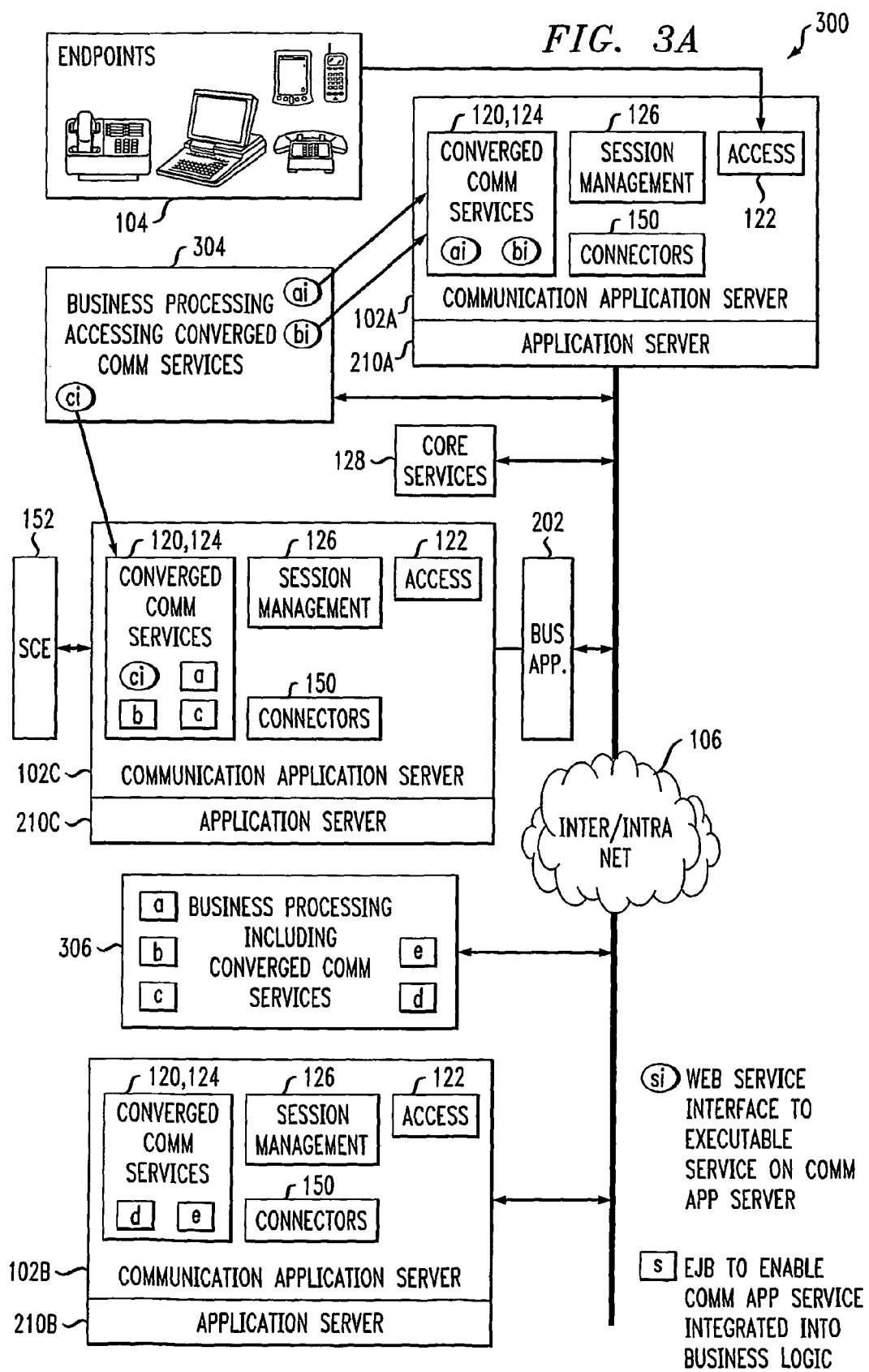
FIG. 3A illustrates an example multiple-CAS system in accordance with the invention.

FIG. 3A illustrates an example multiple-CAS system 300 in accordance with the invention. The system 300 includes the set of endpoint devices 104 and network 106 as previously described in conjunction with FIG. 1. The system 300 further includes a number of CASs, denoted 102A, 102B and 102C. The particular number of CASs shown is illustrative only, and a given multiple-CAS system may include more or fewer CASs. Each of the CASs 102A, 102B and 102C in this embodiment includes converged communication services 120, 124, which may represent one or more of the feature services 120 or federated communication services 124 of CAS 102 in FIG. 1, access manager 122, communication service and session management component 126, and connectors 150. As in the FIG. 1 embodiment, the communication service and session management component 126 includes a routing element such as intelligent communication service router 144. The three CASs 102A, 102B and 102C in this embodiment each access the same federated core services component 128. The federated core services component 128 is thus implemented in this illustrative embodiment as a centralized component of the communication system, shared among multiple distinct CASs. Associated with a given one of the CASs, namely CAS 102C, is a corresponding service creation environment 152. One or both of the other CASs, that is, CAS 102A and CAS 102B, may share the same service creation environment 152, or each may have its own service creation environment associated therewith.

Each of the CASs 102A, 102B and 102C is associated with a corresponding application server 210. More specifically, CASs 102A, 102B and 102C are associated with respective application servers 210A, 210B and 210C. One of the CASs, namely CAS 102C, is shown as having one or more business applications 202 associated therewith, and the other CASs may be similarly configured. It should be noted that the business applications 202 may be executing remotely from the CAS rather than co-located with the CAS as in this example.

Also included in the multiple-CAS system 300 are processing elements 304 and 306, each of which represents a business processing element accessing converged communication services provided by one or more of the CASs. One or more of the processing elements 304, 306 may be implemented as a server, workstation or other computer, or any other processing device having a memory coupled to a processor. Element 304 may be viewed as comprising a business application implemented remotely from the CAS.

In this embodiment, the processing element 304 includes a number of web service interfaces, generically denoted by ovals si where s=a, b, c, etc. More specifically, the processing element 304 includes web service interfaces ai and bi which have corresponding interfaces in the CAS 102A, and a web service interface ci, which has a corresponding interface in the CAS 102C.

Similarly, the processing element 306 includes a number of integration programs, which may illustratively comprise EJB programs, generically denoted by rectangles s where s=a, b, C, etc. The integration programs enable communication services to be integrated into business processing logic. More specifically, the processing element 306 includes integration programs a, b and c, which have corresponding elements in the CAS 102C, and integration programs d and e, which have corresponding elements in the CAS 102B.

Figure 3B:
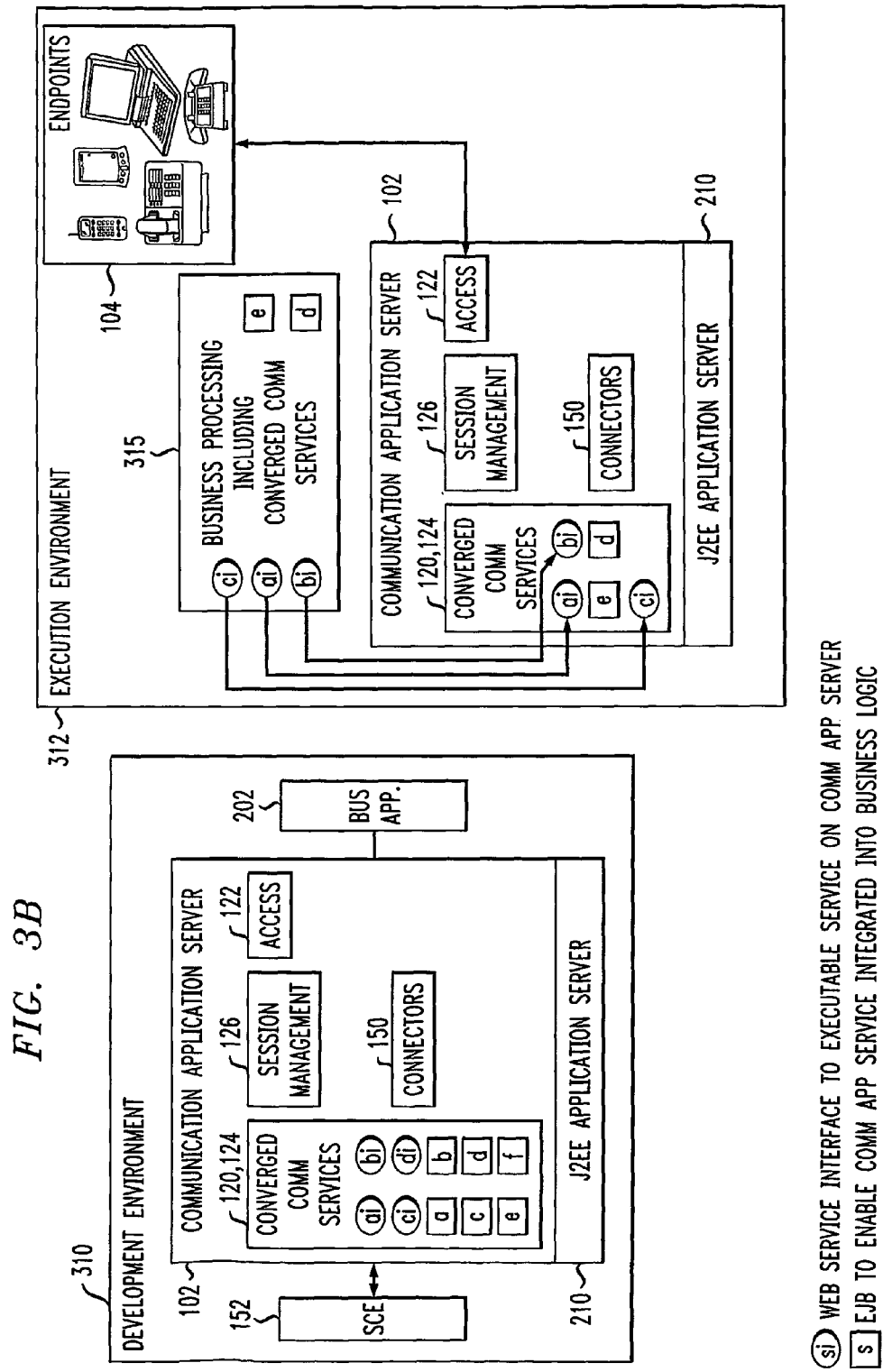
FIG. 3B illustrates example CAS development and runtime environments.

FIG. 3B illustrates example CAS development and runtime environments. In the example development environment 310, CAS 102, which may represent any one of the CASs 102A, 102B or 102C of FIG. 3A, includes elements 120, 122, 124, 126 and 150 as previously described, and is associated with service creation environment 152, business application 202 and application server 210 as shown. The development environment in this example results in the inclusion of web service interfaces ai, bi, ci and di and integration programs a through f in the CAS 102. However, in the execution environment 312, not all of the web service interfaces and integration programs installed in the development environment 310 are utilized. Instead, in the execution environment 312, web services interfaces ai, bi and ci are activated CAS 102 for communicating with corresponding interfaces in a processing element 315, and integration programs e and d are present in both CAS 102 and processing element 315. The execution environment of a particular CAS may therefore involve only a subset of the web service interfaces and integration programs implemented within that CAS for use and selection by a business application in a development environment.

Figure 4:
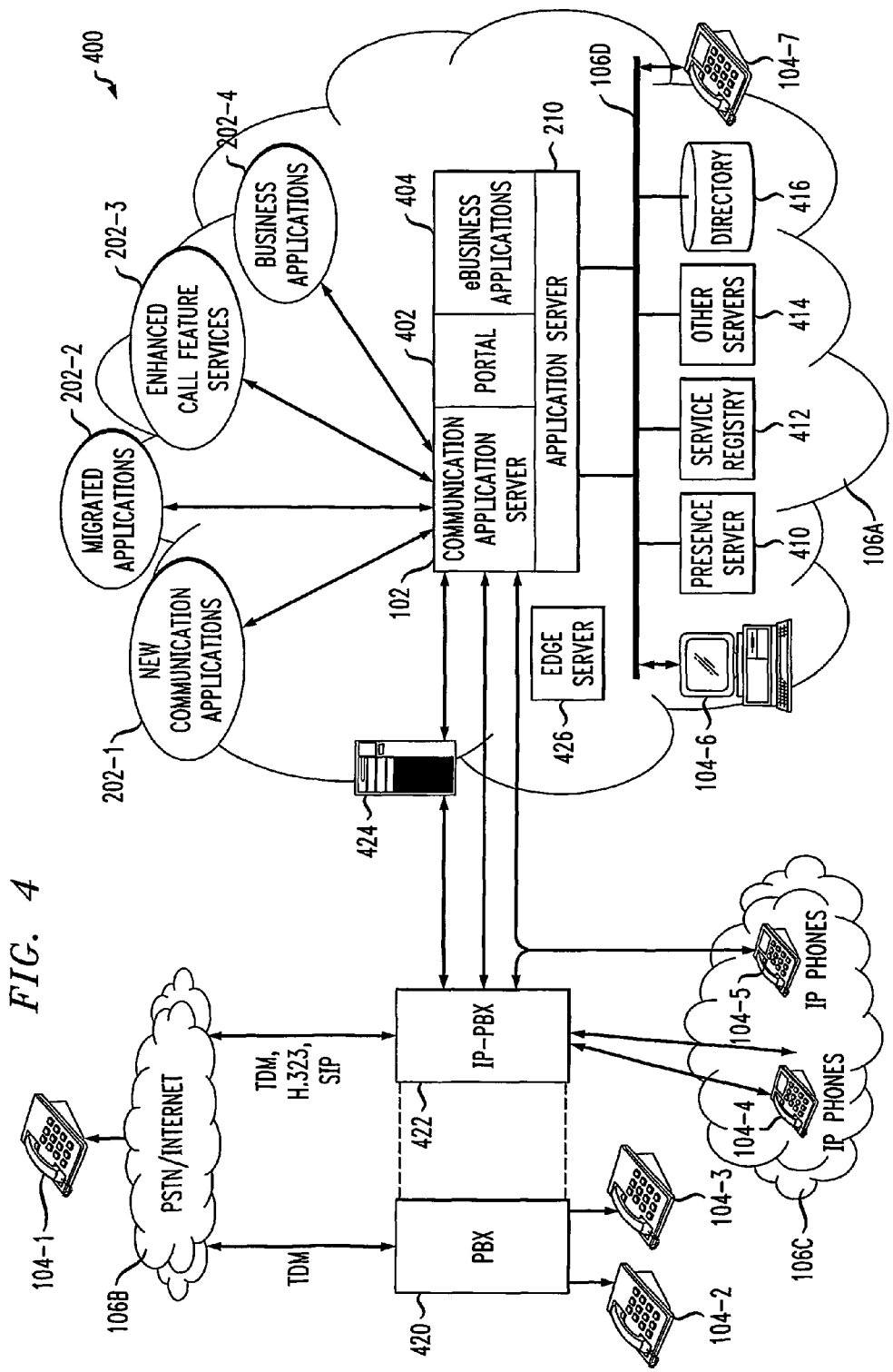
FIGS. 4 and 5 illustrate other possible implementations of a communication system including a CAS in accordance with the invention.
Figure 5:
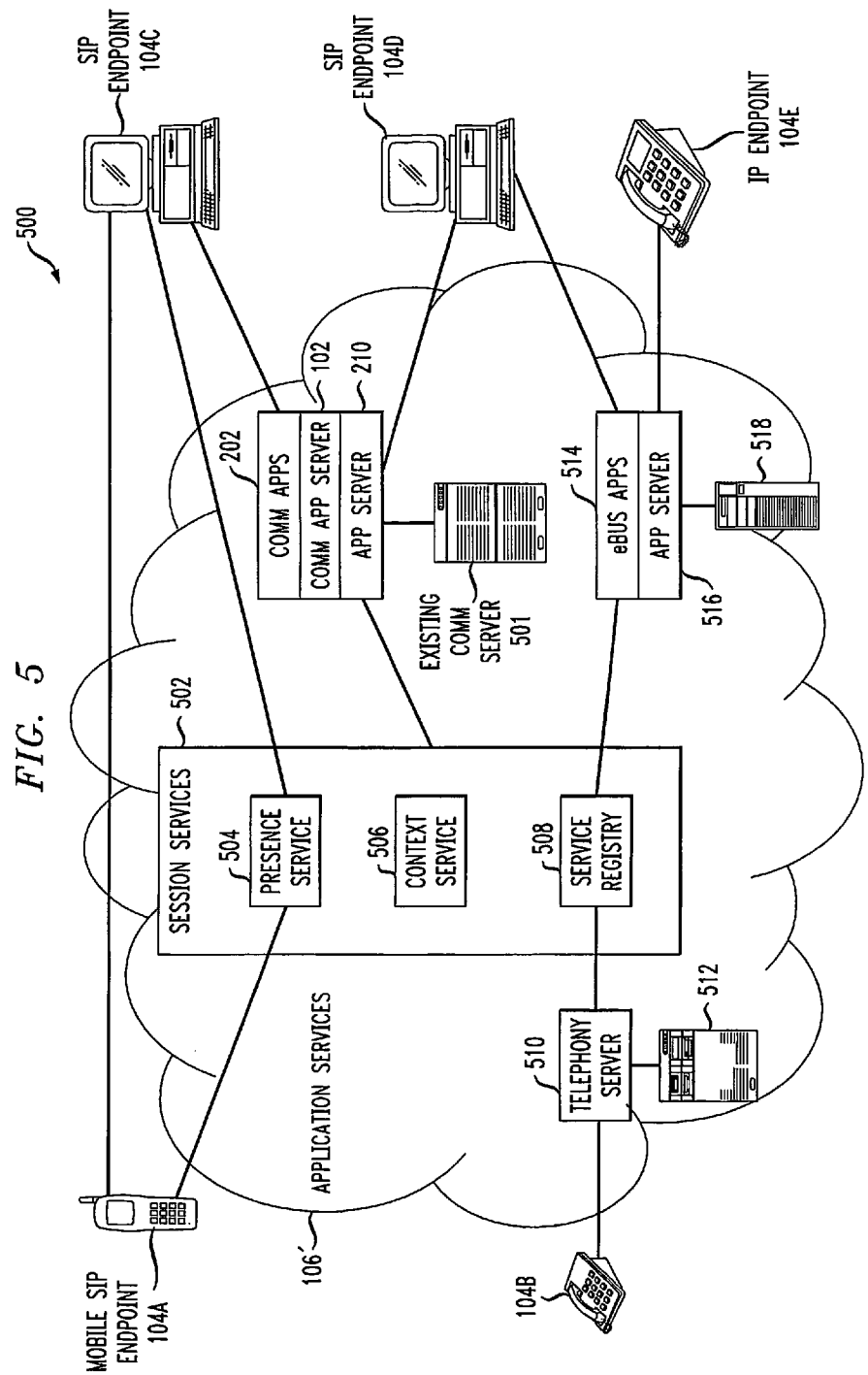

FIGS. 4 and 5 illustrate other possible implementations of a communication system including a CAS in accordance with the invention.

With reference to FIG. 4, a communication system 400 is shown which includes CAS 102, applications 202-1, 202-2, 202-3 and 202-4, and application server 210, all as previously described. Also associated with the CAS 102 in this embodiment is a portal 402, and one or more electronic business applications 404, the latter being shown as being distinct from the applications 202. The portal 402 is preferably configured to support client user interfaces by providing appropriate presentation and display of service-related information to any of a number of different types of endpoint devices over any of a number of different communication media.

The system 400 also includes network portions 106A, 106B, 106C and 106D, arranged as shown. These network portions may represent, for example, different networks, different network environments, or different portions of one or more networks. Also shown are a number of endpoints 104, including conventional analog telephones 104-1, 104-2 and 104-3, IP phones 104-4 and 104-5, and intelligent clients 104-6 and 104-7.

The application server 210 is coupled via network portion 106D to intelligent clients 104-6 and 104-7, and to a presence server 410, service registry 412, one or more other servers 414, and a directory 416. The service registry 412 and directory 416 may be part of a federated core services component 128 associated with the CAS 102 in the manner illustrated in FIG. 1.

The system 400 includes a conventional PBX 420 which is coupled between the network portion 106B, which may be representative of the PSTN, Internet or other network, or combinations thereof, and analog telephone endpoints 104-2, 104-3. The system further includes an IP-enabled PBX 422, also referred to as an IP-PBX, which is coupled between the network portion 106B and the network portion 106C with its associated sets of IP phones 104-4 and 104-5. The IP-PBX 422 is configured to support well-known communication standards such as time division multiplexing (TDM), H.323, SIP, etc. The IP-PBX 422 also communicates with the CAS 102, and with another application server 424 that is coupled to the CAS 102.

The network portion 106A, which is shown as including the CAS and the other elements coupled to network portion 106D, further includes an edge server 426, which may be used as a gateway into the network portion 106A, and which may provide communication with other system elements not explicitly shown in the figure. The elements associated with the CAS 102 within network portion 106A are preferably configured to support IP services, virtual private networks (VPNs), firewalls, Domain Name Service (DNS) and other directory services, policy management services, etc.

The particular system configuration shown in FIG. 4 illustrates that the CAS 102 can be utilized in conjunction with conventional communication system equipment, such as PBX 420 and IP-PBX 422. The CAS 102 is thus compatible with migration from existing telephony processing platforms, which facilitates its implementation in a given communication system. For example, as systems migrate towards offering communication services that provide the features of multiple diverse servers, those communication services can be integrated into the CAS 102 and can also or alternatively be made interoperable with the CAS.

The CAS 102 in the system 400 may be viewed as forming the basis for a communication service node in the network portion 106A. It should be noted that there could be many such nodes associated with multiple virtual enterprises communicating with each other in a given system. Applications residing on various nodes are preferably able to invoke remote services on other nodes so as to provide seamless converged communication functionality to the virtual enterprises, supported by the above-noted federated core services.

FIG. 5 shows another example of a communication system 500 which includes a CAS 102 in accordance with the invention. Associated with the CAS 102 in this embodiment are communication applications 202 and application server 210, both configured substantially as previously described. The CAS 102 is coupled to an "existing" communication server, that is, a server which provides conventional communication functionalities.

The system 500 as shown further includes a network environment 106' which supports communications between a plurality of endpoints including mobile SIP endpoint 104A, analog telephony endpoint 104B, SIP endpoints 104C and 104D, and an IP endpoint 104E. Network environment 106' utilizes CAS 102 to support a set of session services 502. The session services 502 include a presence service 504, a context service 506, and a service registry 508. The presence service 504 in this example communicates with SIP endpoints 104A and 104C. The service registry 508 interacts with a telephony server 510 which is coupled to analog telephony endpoint 104B and a server 512. The service registry 508 also interacts with a set of electronic business applications 514 associated with an application server 514 and a storage element 518.

It is to be appreciated that the particular embodiments of the CAS 102 as shown in FIGS. 1 through 5, as well as the other CAS embodiments described herein, are intended to be merely illustrative of the present invention. A CAS in accordance with the invention can be implemented using numerous alternative arrangements of elements, as will be readily apparent to those skilled in the art.

As is apparent from the foregoing, the present invention in accordance with one aspect thereof provides a CAS architecture that in an illustrative embodiment comprises a distributed services platform for development of converged communication services as well as the runtime processing of converged communication services.

Converged communication services may comprise communication services completely integrated into an enterprise business process, with the communication behavior being driven by substantially the same business rules as the enterprise process.

A CAS can allow enterprises to communication-enable their applications, to construct applications that are communication-based in unique ways through composition of federated services, and to use communication services as building blocks to rapidly create new business applications that are specific to a business need, all in a particularly efficient manner. Numerous additional functions, features and advantages that may be associated with a given embodiment of a CAS of the present invention will be presented below.

Various components of the CAS 102 will now be described in greater detail. These include the communication services 120 and 124, the access manager 132, the service event manager 140, the communication services manager 142, the intelligent communication services outer 144, the connectors 150, the service creation environment 152, and the communication service scripts 160.

Communication Services 120,124

The term "communication service" as used herein refers generally to an offered service accessible via the CAS 102. These communication services include, in the illustrative embodiment of FIG. 1, the advanced communication service elements 130 associated with the feature services component 120, and the communication services elements 138 associated with the federated communication services component 124. A given communication service may be provided via an "open" interface, e.g., a standard interface, or a "proprietary" interface, e.g., a non-standard interface published for use by a business application. The advanced communication service elements 130 associated with the feature services component 120 are generally higher-level services than the communication services elements 138, and may involve more complex recursive and hierarchical processing internal to the CAS. However, both elements 130 and 138 are considered to be encompassed by the term "communication service" as used herein, and both are processed in substantially the same manner within the CAS.

One or more of the communication services provided via the CAS 102 are preferably invocable by Internet-based standard interfaces, such as XML.

A communication service provides a communication-related capability or functionality within the system 100, and may be simple or complex. Examples include without limitation communication system features commonly known as "find me," "hide me," "reach me," conference-in-designated-parties, notify, establish-3$^{rd}$-party-call, instant messaging, presence information, message management, rules-based routing, etc.

Another example is a service referred to herein as a "click-to-communicate" service, which will be described in greater detail below.

Other examples include services that provide processing associated with communication, such as user-preference inbound call routing, communicating device user profiles, and so on.

Further examples include SIP services that provide processing associated with communication, such as instant messaging which requires no IM server, access of user profile information regarding communication devices associated with a user, etc.

Communication services can be registered in an appropriate registry, e.g., a registry in the core services information 162 associated with the federated core services component 128. Other techniques can be used to determine the characteristics of a given communication service.

As indicated previously, a given communication service may be "federated" in that it can be discovered and invoked across domains using dynamic service location and remote service invocation. A federated service typically comprises an open standards-based interface that can be executed across different domain boundaries, e.g., enterprise or technical boundaries.

A given communication service may comprise at least a subset of the following elements.

1. A set of possible actions, associated parameters, associated types, related exceptions.

2. A description of behavior, including constraints such as pre-/post-conditions, invariants, etc.

3. A description of policy, including information such as QoS requirements, resource requirements, security requirements such as encryption, routing choices, etc.

4. A process flow description of the processing steps associated with the requested service. A possible default may be sequential processing.

5. Descriptive information which can include the organization or other entity providing the service, a point of contact, a description of the service, etc.

Other elements may be used to specify a communication service accessible via the CAS 102, and the invention is not limited in this regard.

A number of more general examples are as follows.

A communication service denoted "communicate," which may result in the setup of a call, the sending of a voicemail, the sending of an instant message, etc., depending on user preferences as expressed in corresponding rules.

A communication service denoted "determine presence," which determines if the person to receive the message is present on an endpoint accessible over a network, and if so, determines which endpoint and the most recent presence registration.

A communication service denoted "locate," which determines where a user is and on what endpoint.

A communication service denoted "communicate with best cost," which involves determining endpoint location, evaluating routing rules, and arranging call setup to achieve a best cost. The best cost scenario may dictate that, instead of initiating a call setup, a user may be placed into email or voicemail, or an alternative channel such as the Internet may be used to transmit the message.

A communication service denoted "conference," which obtains the address of each communication party, e.g., telephone number, IP address, Uniform Resource Locator (URL), etc., locates each communication party, determines if each communication party is present to receive a conference call (and if not, may send an instant message or invoke voicemail), communicates to the communication parties in the preferred manner (e.g., telephone, PDA, cell phone, softphone, SIP phone), determines best cost routing, and establishes the conference.

Numerous other types of communication services can be provided using a CAS in accordance with the present invention.

One or more of the communication services provided by the CAS may be modular services offering communication capabilities with open interfaces that provide the information, transaction, and communication services along with the support structure that enables the integration of business applications with underlying communication services. Advantageously, such an arrangement facilitates the rapid integration of business applications with common communication services, independent of the manner in which communication is provided.

The communication services may be configured utilizing a high level language and may be deployed as native enterprise Java beans (EJBs) or web services, for example, which are dynamically searchable and executable services. The actual service execution, accessed through the library, may be in a J2EE application server environment, in a distant non-J2EE environment, or other environment, as well as in a combination of different environments, managed by the CAS.

The communication services may comprise one or more libraries of services that are integratable along with other components into a business application or other communication application. Communication interface services may be used to connect communication service requests from business applications to underlying communication services, through the use of interfaces to network infrastructure elements. The connectors 150 may be utilized for functions such as data access and synchronizing behavior with external business processes. The federated core services 128 may be utilized for user information, user related preferences, security, directory services, etc. Resource management and information management services are accessed through the communication service and session management component 126 of the CAS. The particular services specifically needed for communication library execution may be obtained from a run-time registry service and composed through a software development kit (SDK) or other software tool of the service creation environment 152.

The above-noted communication libraries may function as multilevel building blocks, and a given library can be built from other libraries. The communication library interfaces to applications are preferably "open" in order to promote multi-vendor development of applications and the creation of new communication libraries. These communication libraries may be supported in the service creation environment 152 by well-defined programming specifications for creating new libraries. A repository of known communication libraries may be maintained in a registry and made available to application developers.

A given communication library can be configured to translate application level context into network policies, such as QoS, presence, security, etc. Context refers to selecting the most appropriate person or resource for a transaction or service, presenting the right information for personalization (e.g., right time, right format, etc.), based on information about the user maintained in the directory federated service. This information about the user may include, without limitation, user information and permissions (role in/outside of organization), presence, user preferences both on initiating communication as well as receiving of communication, endpoint media capabilities, and transaction histories.

Communication services are preferably modular and reusable across applications. For example, such services can be configured to initiate a communication session from within any application. In addition, an end-user could be using any access device (e.g., graphical web browser, Wireless Access Protocol (WAP)-enabled wireless device, phone for a voice-enabled web site, etc.) to reach a communication service. The communication services may be made extensible and customizable in that they can be composed together to provide enhanced communication related services, such as providing media translation in addition to call completion. As noted above, a given service can be built from other services, so as to provide a higher level capability, or a more complex communication capability (e.g., conference on demand that requires using presence services, location services, and basic multi-modal communication services).

In the illustrative embodiment of FIG. 1, the communication service and session management component 126 of the CAS is responsible for locating a given communication service, determining if the service comprises one or more tasks, directing the execution of the tasks in appropriate defined order, aggregating responses, returning results, and providing management of sessions, states, events, errors and alarms.

Figure 6:
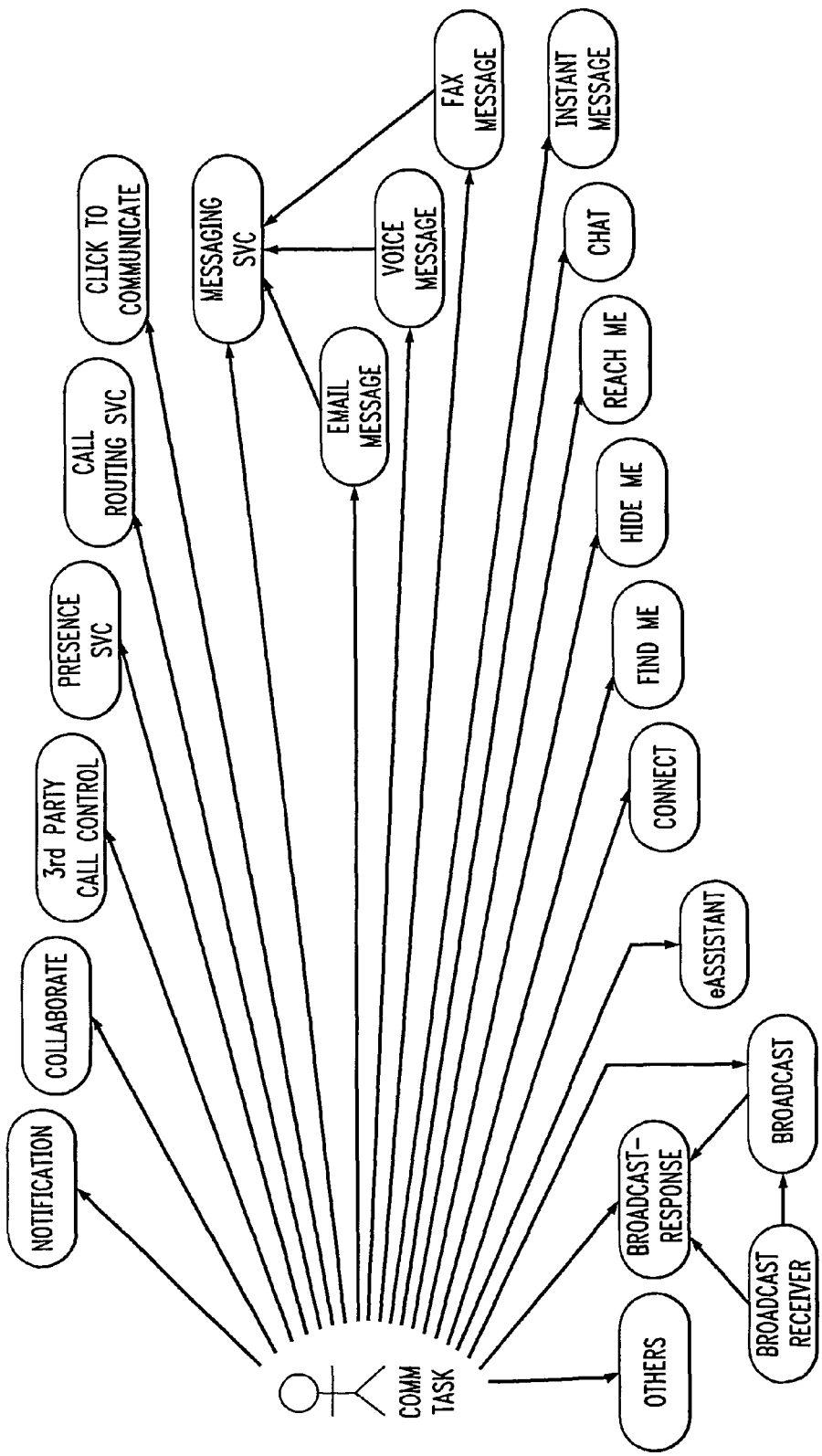
FIG. 6 is a diagram illustrating example communication services implementable in a CAS in accordance with the invention.

FIG. 6 shows a diagram illustrating example communication services implementable in the CAS 102 in accordance with the invention. In this example, it is assumed that a given communication service comprises one or more communication service tasks, also referred to herein as "communication tasks" or simply "comm tasks." The figure illustrates that a particular communication task may include notification, collaborate, 3PCC, presence service, call routing service, click to communicate service, messaging service (and related email, voice and fax message services), connect, "find me," "hide me," "reach me," chat, instant message, electronic assistant (eAssistant), broadcast (and related broadcast response and broadcast receiver), as well as others. A given communication task may also result in invocation of other tasks or services, such as, for example, other communication tasks, other communication services each of which may contain one or more communication tasks, or one or more core services tasks. The relationship between communication services and communication tasks is illustrated and described in greater detail in conjunction with FIG. 22.

Communication services associated with the CAS 102 are generally provided to communication parties, where a communication party may denote one or more of the endpoints 104 or an associated user that is accessing a communication service. For example, a communication party may be a person, virtual business entity (company, group, organization, etc.), an automated service (interactive voice response (IVR), web service, etc.), or an appliance or other endpoint device with communication capability, etc. The term "user" as utilized herein is therefore intended to include a communication system endpoint, appliance, application, an associated human user, or other communication party.

Figure 7:
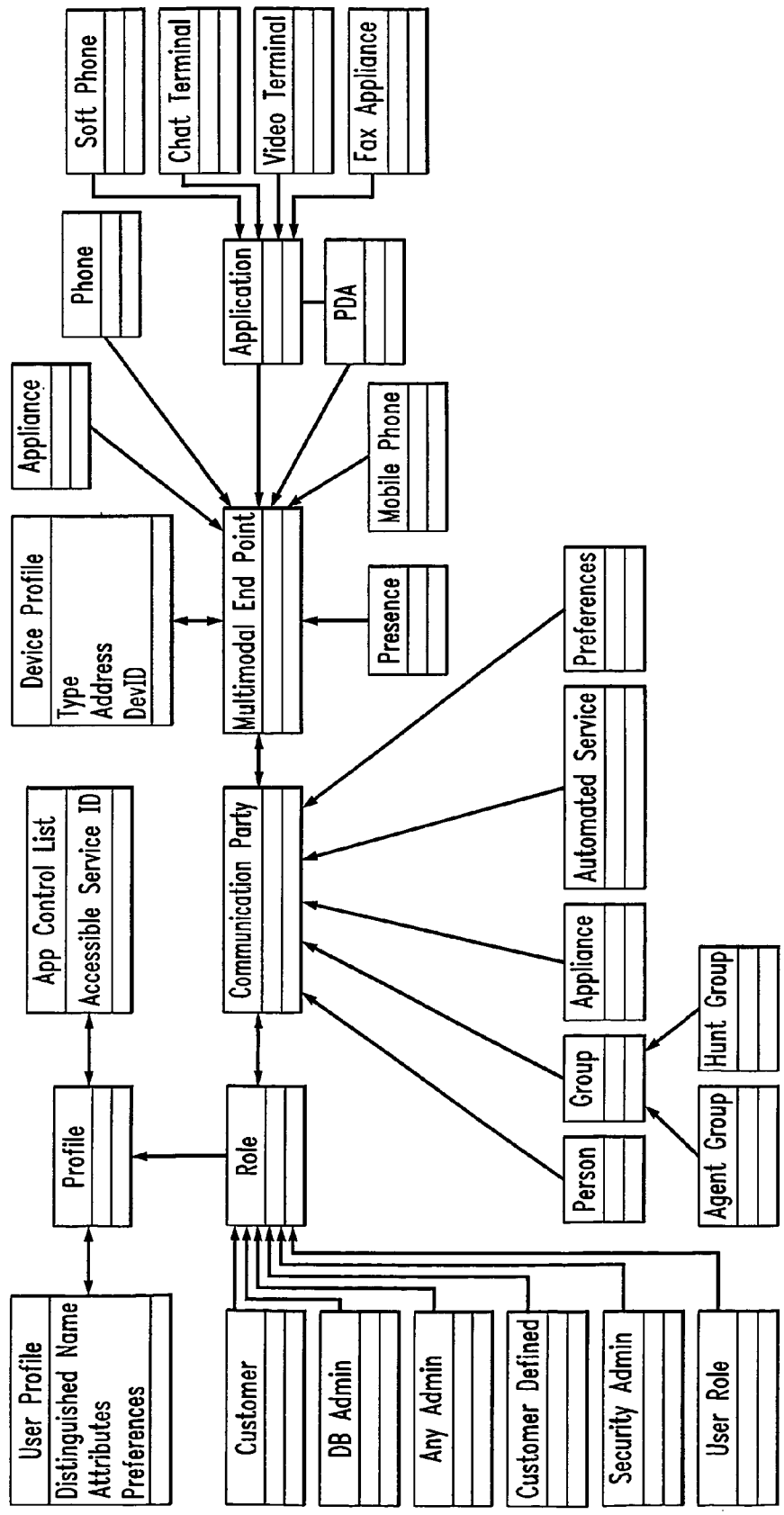
FIG. 7 is a diagram illustrating an example communication party that may be associated with a CAS in accordance with the invention.

FIG. 7 shows a diagram illustrating an example communication party that may be associated with a CAS in accordance with the invention. In this example, the communication party as illustrated may have associated therewith information specifying person, group, appliance, automated service, preferences, a multi-modal endpoint, and role. The group may include information specifying agent group, hunt group, etc. The multi-modal endpoint may include information specifying appliance, phone, application (e.g., softphone, chat terminal, video terminal, fax appliance, etc.), PDA, mobile phone, presence, and device profile (e.g., type, address, device ID). The role may include information specifying customer, database administrator, security administrator, any administrator, user role, customer defined role, and profile. Associated with the profile may be a user profile element specifing, e.g., distinguished name, attributes, preferences, and an application control list, specifying, e.g., accessible service ID.

The particular diagrams shown in FIGS. 6 and 7, and elsewhere herein, should be understood to be illustrative only. Alternative arrangements of elements, including elements not shown in these particular diagrams, may be used in implementing the invention.

Access Manager 132

The access manager 132 processes the access control and presentation control for communication service task requests, in accordance with business rules, personal rules, presence related associations, etc. It may be invoked by any CAS component that requires access control functionality.

The access manager preferably manages all access-related events. It handles multi-modal session information and presentation mark-up in conjunction with multi-modal interaction management component 134, where possible properties include multiple media, multiple devices under session control, etc. Concurrency may be with respect to all devices under session control, with respect to media inputs and outputs, and with respect to inputs from multiple devices. Users are able to interact with an application in multiple modes and in multiple sessions. The modes can be independent of one another, such as independent voice and pointing device inputs, or can be designed as concurrent, such as related voice and pointing device inputs. The latter are collectively treated as a concurrent and therefore compound event.

The access manager 132 can manage multiple media events associated with an interaction. For example, audio-related events (such as DTMF recognition events, speech recognition events, etc.) can be managed across one interaction channel, while text or video events are managed across another interaction channel, and application sharing events are associated with all channels. The access manager 132 provides the continuity and management of all media events related to the same communication control channel, each requiring a different media stream, such as multi-media collaboration across multiple devices. Typically, the access manager 132 does not manage the media itself but provides support to underlying components that support rendering and dialogue interactions based on media manipulation.

The access manager 132 thus provides access to communications services available via the CAS 102. For example, access can be provided to one or more system users, via one of the endpoint devices 104 or otherwise, to application 112 or appliance 114 through synchronous or asynchronous messaging, etc. The access manager analyzes a request, and invokes a CAS service as appropriate. For example, for an end user associated with one of the endpoints 104, the access manager may manage multi-modal interactions through meta-dialog markup, or manage presentation rendering for dialog markup languages. For application 112 or appliance 114, the access manager can provide support for the above-noted synchronous or asynchronous messaging.

The authentication and authorization control in the access manager may include functions such as identification, role-based access, etc. Also, the access manager can initiate a session or link to a previous session, so as to accommodate asynchronous, parallel event, or multiple parent session conditions. The access manager can manage a variety of other functions, such as access to voice services, portal services, media stream inputs and outputs, rendering to both media and device capabilities, and personalization of presentation based on policy, roles, application, device, etc. in the illustrative embodiment of FIG. 1, the access manager 132 is implemented within the common access framework 122. In other embodiments, the access manager 132 may comprise or otherwise be associated with a portal component which provides access, presentation, and personalization services within the CAS. Such a portal may be viewed as an example of a type of common access framework, and is preferably configured to support endpoint device independent access to communication services. A given portal may include conventional data portal and voice portal components.

A voice portal component may be configured to provide voice-enabled support, in the form of voice services that are interpreted through a standard interface such as VoiceXML, Speech Application Language Tags (SALT), XHTML, or other dialogue or media markup language. For example, the set of voice-enabled services defined by VoiceXML comprises grammar-based voice user interface dialogues. In such an arrangement, the CAS may be configured to dynamically generate and control the serving of VoiceXML pages to a VoiceXML media gateway or other suitable rendering layer of the CAS.

The access manager 132 can be configured to permit a user to access a personalized portal (e.g., based on business and personal roles, time information, scheduled information, location information, presence information, etc.) through any device. Thus, a user can access the CAS through, for example, a computer, TDM telephone, SIP telephone, wireless telephone, PDA device, pager device, kiosk, converged device, etc. In addition, the multiple modes of presentation supported by the access manager 132 permit access to the CAS through, for example, a web-browser interface, voice and audio interface, touch-tone interface, micro-browser interface, Short Message Service (SMS) interface, etc.

Figure 8B:
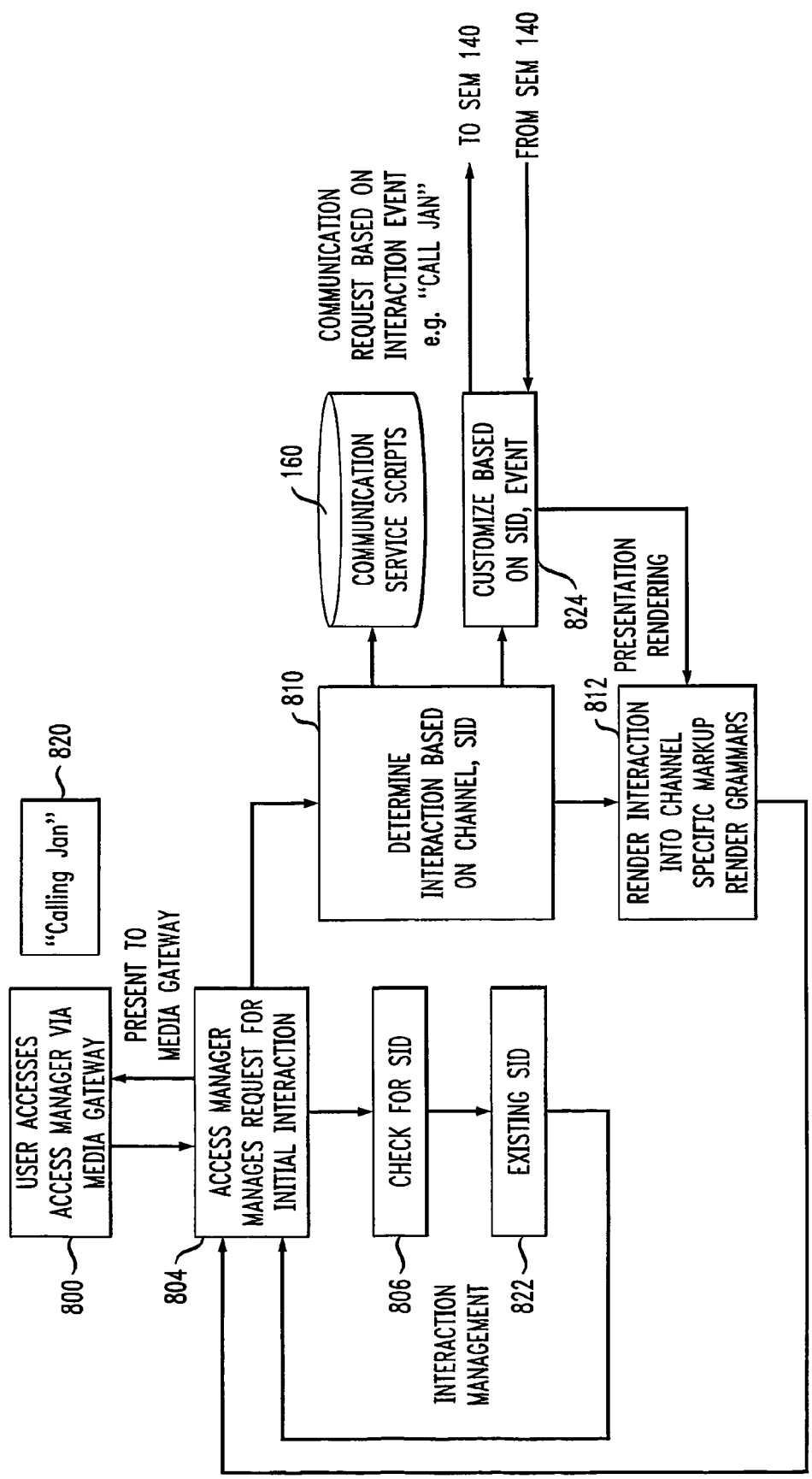

FIGS. 8A and 8B show examples of the operation of the access manager 132 in the CAS 102 of FIG. 1. With reference initially to FIG. 8A, as indicated in block 800 a user accesses the access manager 132 via a media gateway associated with the CAS 102. Such a gateway may be implemented, by way of example, within the network 106, or within the CAS itself, using well-known conventional techniques. The access manager 132 directs the presentation to the user of a welcome dialogue 802, which provides the user with a number of selection options such as Find, Call and Contact, and in block 804 manages a request for initial interaction. This interaction management involves checking for a session identifier (SID) in block 806. If no session identifier has been established, an initial SID is established for the session in block 808. In block 810, an appropriate interaction is determined based on the channel over which the user is communicating with the CAS and the SID, at least in part by referencing communication service scripts 160. Then, in block 812, the determined interaction is rendered into channel specific markup and render-appropriate grammars to provide interaction input. Of course, other types of interaction management and presentation rendering may be used.

Referring now to FIG. 8B, the operation of the access manager 132 is illustrated in a situation in which a session has previously been established, e.g., in the manner described in conjunction with FIG. 8A. It is assumed that there has been an interaction event denoted "Call Jan," which specifies that the accessing user is calling a party denoted as Jan. The access manager causes a dialogue 820 to be presented to the user, indicating that the system is "Calling Jan." The dialogue 820 may comprise markup which causes a media gateway to translate text to audio output. Blocks 806, 810 and 812 operate substantially as described in conjunction with FIG. 8A. In block 822, it is determined from the SID check in block 806 that there is an existing SID, and the interaction determination block 810 operates using this existing SID. The existing SID and the "Call Jan" interaction event are also used to formulate a communication request that is delivered via block 824 to the service event manager 140. The service request manager generates a corresponding response that is used in providing customization based on SID and event in block 824.

It is to be appreciated that the particular operations shown in the examples of FIGS. 8A and 8B are for purposes of illustration only. An access manager in accordance with the invention is not required to implement any of these specific operations.

Service Event Manager 140

The service event manager 140 manages the communication service request, session, context, events and policies associated with the requester and potential receiver of the request. It initiates the communication services manager 142 to decompose the communication service into executable communication tasks or "comm tasks," and directs the intelligent communication services router 144 to link to one or more of the servers 108, 110 through the connectors 150 to provide appropriate processing operations for the communication service. As indicated previously, and as is illustrated in conjunction with FIG. 22, the communication service may be decomposed into a number of communication tasks, any of which may be composite services, requiring recursive processing behavior. The service event manager 140 also preferably aggregates all communication task responses, as needed, into an overall response.

A session can be short-lived or long-lived, and may be based on synchronous or asynchronous events. It may be associated with a sub-session.

An example to a synchronous session is a session which exists while a requesting user remains connected to the CAS 102. The above-noted click-to-communicate service is a more particular example of a synchronous session. Sessions which are not synchronous are referred to herein as "asynchronous sessions."

A session may be viewed as a sequence of events that originate from a request and terminate either from a response or from some deactivation action, preferably an external deactivation action. Session services manage the working environment of a given user during and between service connections. This may include, for example, operations such as open and close user session, initiate and deactivate a service session, establish and remove a communication session, listen for asynchronous communication events, query and set user state, and update user context. The service event manager 140 will typically manage the sessions, initiating (as appropriate) a communication session through the intelligent router 144.

A user session generally includes all activities from initial sign on to signoff of a given user. If the user requests an asynchronous session establishment, the user session typically persists until all events associated with all requests are fulfilled, or until such time as an error is reported.

A service session generally includes all activities associated with fulfilling the service. This includes any communication services associated with components 120 and 124, and any routing requests. The service session typically persists until all events associated with the service are fulfilled, or until such time as an error is reported.

A communication session includes all activities that are managed by the intelligent router 144. The duration of this session is typically from the initial routing request to the fulfillment of that request. Similarly, a telephony or messaging session typically persists until all activities associated with the requested service are complete, or until such time as an error is reported.

As indicated above, the service event manager invokes the intelligent communication services router 144 to determine the communications routing strategy, which may involve a single server, multiple simultaneous server requests, resource-based routing decisions, routing to a separate server requiring appropriate rendering, etc. The service event manager 140 also initiates a main session for the original communication service, linking this to the user initiated session, and initiates a sub-session for each communication service task, managing sub-session state, context, and other related information.

The service event manager 140 may thus be viewed in the illustrative embodiment as comprising or being otherwise associated with a session manager, for managing session information in conjunction with the provision of communication services via the CAS 102. In subsequent description, separate references to a "session manager" may be viewed as referring to a session manager element of the service event manager 140, or to a session manager element otherwise accessible to the service event manager 140. Therefore, in one or more of the figures to be described below in conjunction with the service event manager 140, the service event manager and the session manager may be designated as separate elements. In this context, where the session manager corresponds to an element of the service event manager, references to the service event manager are intended to include all elements of the service event manager other than the session manager. Operations below referring to session may be carried out by a session manager, or by other components of a service event manager.

A session can be associated with one or more sub-sessions.

A session can be associated with a parallel session based on requested events. A user, for example, can bring up a PC browser after a session has been initiated for some communication activity, and request that the sessions be linked together.

A session can be associated with one or more parent sessions. If there are multiple parent sessions, a response regarding success or failure is "fanned out" to each of the multiple parent sessions.

A task process requests a session, requesting a response of success or failure of the task and zero or more sub-tasks, and recursive processing.

Execution of a task need not be co-resident with the session manager.

A given session may be initiated by a user-initiated task, by a process, or by other suitable mechanism.

An initiating session establishes a root identifier or token that relates the session to the properties of the initiating request. This provides identification of a communication party, authentication, task, etc. All sub-sessions are related to the initiating session token.

An initiating session may be requested to be associated with a parallel session, also referred to herein as a sibling session, that is not in direct hierarchical relationship with the initiating session. An example of this is multiple modes of communication that relate their media rendering to a common event.

The service event manager allocates session identifiers, associates sessions and sub-sessions, associates parallel sessions together, manages and tracks the success and failure of sessions, and manages the session tokens.

All communication requests are preferably session-managed, and hence interact with the service event manager if only to maintain session and associated states.

A request initiates a session. That session may be associated with a sibling session, or a parent session. Each session is preferably associated with a token and a session authorized communication party.

On successful completion of a task, the session is concluded, and all related sessions are informed. Related sessions may include parent session, sibling session, parallel session, etc.

On failure of a task, the session is concluded, and all related sessions are informed of the failure.

On a component or infrastructure failure, the session is concluded, and all related sessions are informed of the failure.

Session information is preferably recorded in persistent store.

Success or failure of a session can be responded to by a parent session, a user, a parallel session, or fanned out to multiple sessions.

As noted above, the session management operations within the service event manager 140 may be implemented using a session manager. Such a session manager may be an element of the service event manager, or otherwise associated with the service event manager.

A given session manager can be configured to manage the session token allocation and retirement. A session token is an example of what is more generally referred to herein as a session identifier or SID. A token is typically allocated on a new session, on a new sub-session, on a joining of two or more sessions, etc. Rules may be utilized to manage session duration, sub-session depth, persistence, sub-session end if still active, and session context management. As indicated previously, a session can be created, initiated, ended, terminated, or joined. The session manager communicates to other CAS components requesting sessions in terms of allocating a new session ID, and requesting termination of a process associated with a session. Also, other CAS components communicate to the session manager to request session initiation (top level), session creation (sub level), session join, session end, or session termination.

Figure 9:
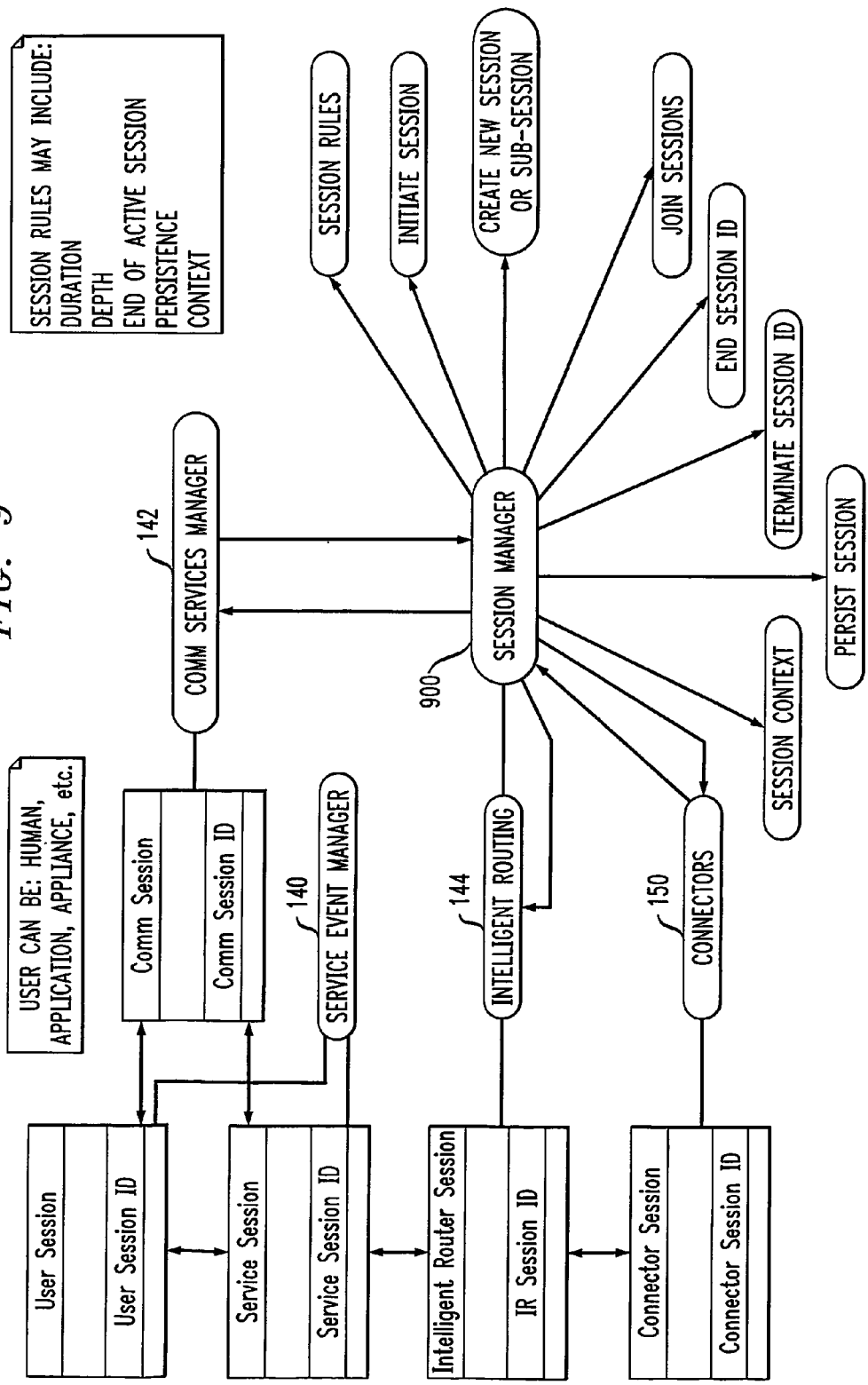
FIG. 9 is a diagram illustrating an example session manager element associated with a service event manager in a CAS in accordance with the invention.

FIG. 9 shows a diagram of a session manager such as that described above, illustrating its interaction with other CAS components. The figure includes elements corresponding to service event manager 140, communication services manager 142, intelligent communication services router 144, and connectors 150. A session manager 900 interacts with each of these components as shown. As indicated above, the session manager 900 may be an element of the service event manager 140. The session manager 900 performs session-related operations on behalf of the service event manager 140. These operations include Initiate Session, Create New Session or Sub-Session, Join Sessions, End Session ID, Terminate Session ID, Persist Session, Session Context, etc. The session manager 900 utilizes information such as Session Rules, which may include duration, depth, end of active session, persistence, context, etc.

The session manager 900 preferably associates a session token with each session, and maintains a hierarchy of session tokens so as to be able to identify specific sessions and to relate the sessions to one another as appropriate. All operations on sessions, in this illustrative embodiment, operate on the session identified by the session token. Termination of a session is based on rules implemented in the session manager. These rules also specify handling of any related linked sessions, e.g., sub-sessions, parallel sessions, etc.

In this example, one or more different sets of inter-related session information are associated with each of the CAS components 140, 142, 144 and 150 as shown. More specifically, service event manager 140 is associated with a User Session (including User Session ID, where "user" can be human, application, appliance or other endpoint device, etc.) and a Service Session (including Service Session ID). The communication services manager 142 is associated with a Comm Session (including Comm Session ID). The intelligent router 144 is associated with an Intelligent Router Session (including IR Session ID). The connectors 150 are associated with a Connector Session (including Connector Session ID). Of course, this particular diagram is merely illustrative, and other types and arrangements of CAS components can be used to provide session management features in accordance with the invention.

Figure 10:
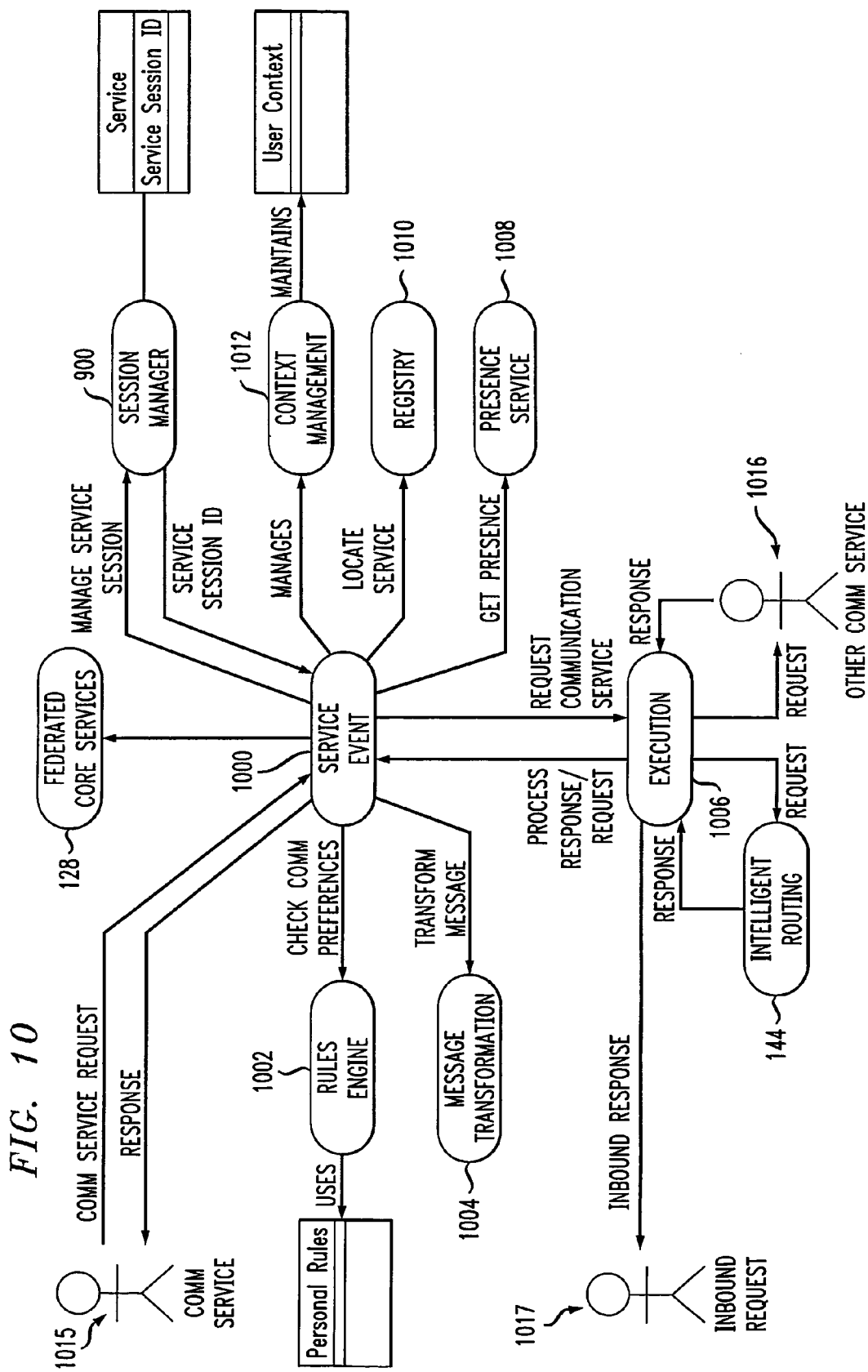
FIG. 10 is a diagram illustrating an example service event manager in a CAS in accordance with the invention.

FIG. 10 shows a diagram illustrating the operation of an example service event manager 140 and its interaction with other CAS components including the federated core services component 128, and the intelligent router 144. The service event manager in this example includes or is otherwise associated with the session manager 900. The diagram illustrates the processing associated with a given service event 1000, and utilizes a number of elements to provide run-time services and session management. These elements include rules engine 1002, message transformation 1004, execution element 1006, presence service 1008, registry 1010 and context management 1012. These elements may be implemented in whole or in part within the service event manager, or within one or more other components of the CAS 102.

The service event manager in this example performs processing operations associated with a communication service 1015, one or more other communication services 1016, and an inbound request 1017. The inbound request 1017 represents a response, from execution element 1006, which results in a new communication request.

As indicated previously, the session manager 900 may be configured to maintain a common session across multiple underlying platforms for every communication service request. To manage these session activities, the service event manager 140 recognizes the events that include the arrival of a communication service request, or the completion of such a service. Each of these services constitutes a service session context. Since the user is able to logon to the CAS 102 and subsequently initiate more than one service request, a user session may be maintained by the communication services manager 142. Each service, communication and session context is preferably associated with the context of the corresponding user through a persistent user history store, which may be implemented in a memory or other suitable machine-readable storage medium within or otherwise accessible to the CAS 102.

The rules engine 1002 allows users to specify preferences regarding call and session handling based on various parameters such as originator of request, time of day, etc. These can be stored as communication service scripts 160 and executed as part of the rules engine environment. Rules can be set up at the individual user level as well as the administrator level.

The message transformation 1004 provides the capability of interacting with external services registered through the registry 1010. For example, the message transformation element 1010 may provide the appropriate translation between the communication events in the service event manager to standards based messaging interfaces like XML. This element may be configured to provide transformation across, for example, EJBs, CORBA objects, CORBA beans, etc. to integrate with external messaging brokers. One or more of these transformations may be a part of J2EE, and may be automatically provided in the messaging broker.

The execution element 1006 requests communication service for the service event 1000, which may involve interaction with the intelligent router 144, the one or more other communication services 1016, or other CAS elements. As indicated previously, another inbound request may be generated as a result of this execution.

The presence service 1008 is configured to provide access to subscriber presence and availability information at the time of completing a communication service request. This may be achieved through queries to a presence service regarding user status, where the user is determined by the user profile.

The registry 1010 may be an element of the federated core services component 128 of the CAS 102, as is illustrated in conjunction with element 162 of component 128 in the communication system of FIG. 1. The registry in this illustrative embodiment provides the ability to discover, identify and access a communication service.

The context management element 1012 supports user context across the use of CAS services, throughout both synchronous and asynchronous activities. Context management services manage the user specific history of initiated and receiving of events. Context may be defined in terms of communication context as well as business context. The persistence of context for a user is preferably administrable by the customer, since user context typically requires a persistent history of activities associated with that user. That is, persistence may be through a single user session or may include all sessions, over some specified duration, associated with the corresponding user. Business rules associated with maintaining user context, although not explicitly shown in FIG. 10, may be used to direct the management and duration associated with persistence of the user context.

Context may include, for example, one or more of the following elements.

1. The user's identity: User distinguished name, business application ID, customer administrator, etc.

2. Role of the requester at the time of the request: user, administrator, special "platinum" user, etc.

3. Location of the user.

4. Security policies associated with the user.

5. Personalization rules.

6. Privacy constraints, that may be associated with the communication and the user (e.g., request to not pass along caller identification).

7. Communication request.

8. Communication device information: what type of device is being used by the user to originate the request; what type of device is being used by the user to receive a communication response.

9. Duration and state of communication.

10. Service session context such as which service is requested, duration of the service session, etc.

11. Communication session context such as what the user requested in terms of communication services, media type; media stream (e.g., recording, voice call, video clip, set of images, etc.).

12. Preferences used that may be offered for the service requested.

13. Previous history associated with the user of communication services.

In multiple communication requests are composed into a business service (within the scope of a user session), these services should generally share this user context, and maintain a single persistent context history. This user context history may be made available to the user of the CAS through an open interface.

Context aids the CAS in providing a given user with appropriate communication services. For example, a repeated user of the CAS may be associated with a "platinum" role, and thereby receive priority communication services. The CAS user may activate special communication to a "good" customer, through a user-preferred mode of communication. Context also aids the CAS in understanding a user's request based on previous history, in determining the presence and availability of users, and in establishing a preferred means of communication.

By way of example, many web-based enterprises maintain personalized information about each of their customers. Such enterprises maintain information such as identity, service usage, goods purchased or returned, and context. CAS context as described above can augment this information to provide the such web-based enterprises with a holistic and consistent use of business rules across application and infrastructure layers.

The service event manager may also include other event, error and fault management elements, which are not explicitly shown in the FIG. 10 diagram. For example, such elements may be used to provide a common framework for identifying events of a critical nature, and associated notification of such events, recording events of interest (e.g., failure, security violation, etc.), and common logged information across products.

As indicated above, the session management operations performed by service event manager 140 may involve interaction with other CAS components. For example, the communication services manager 142 may operate in conjunction with the intelligent router 144 in assisting the service event manager 140 with providing session management.

The session management aspects of the CAS 102 can provide a number of desirable features to system users. For example, a user can control different aspects of an interaction from different endpoint devices. As a more particular example, a user could place a call from his/her phone but add parties to the call from a softphone on his/her PC. Also, .a user can send instant messages or launch video in the context of that call from his/her PC while the audio is still rendered on the phone. Individual sessions may be maintained for each aspect of the interaction, and linked as appropriate. User context may be maintained to define the communication contexts for the duration of the overall session.

Figure 11A:
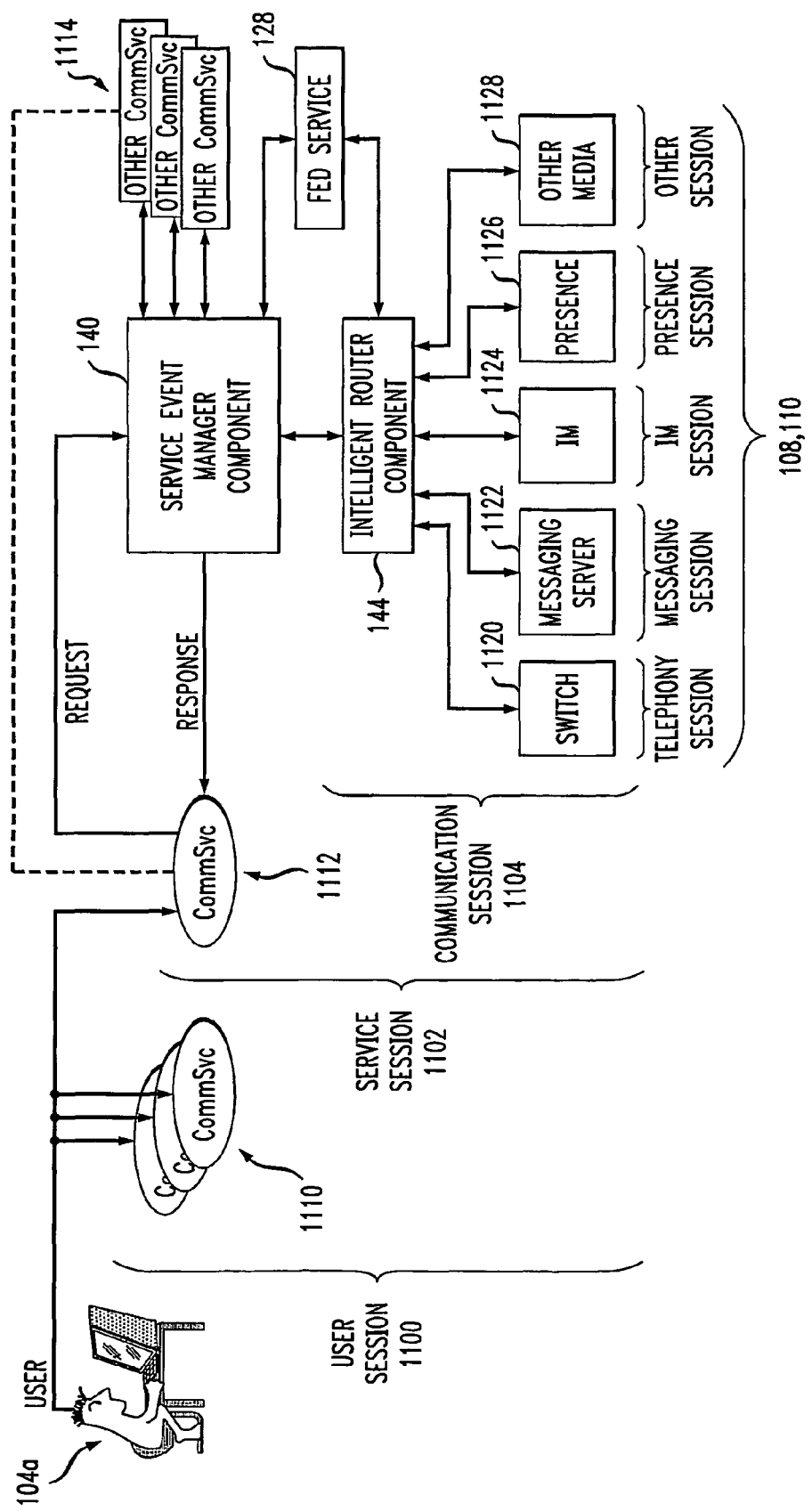
FIGS. 11A and 11B show examples of session hierarchies for communication service execution in a CAS in accordance with the invention.
Figure 11B:
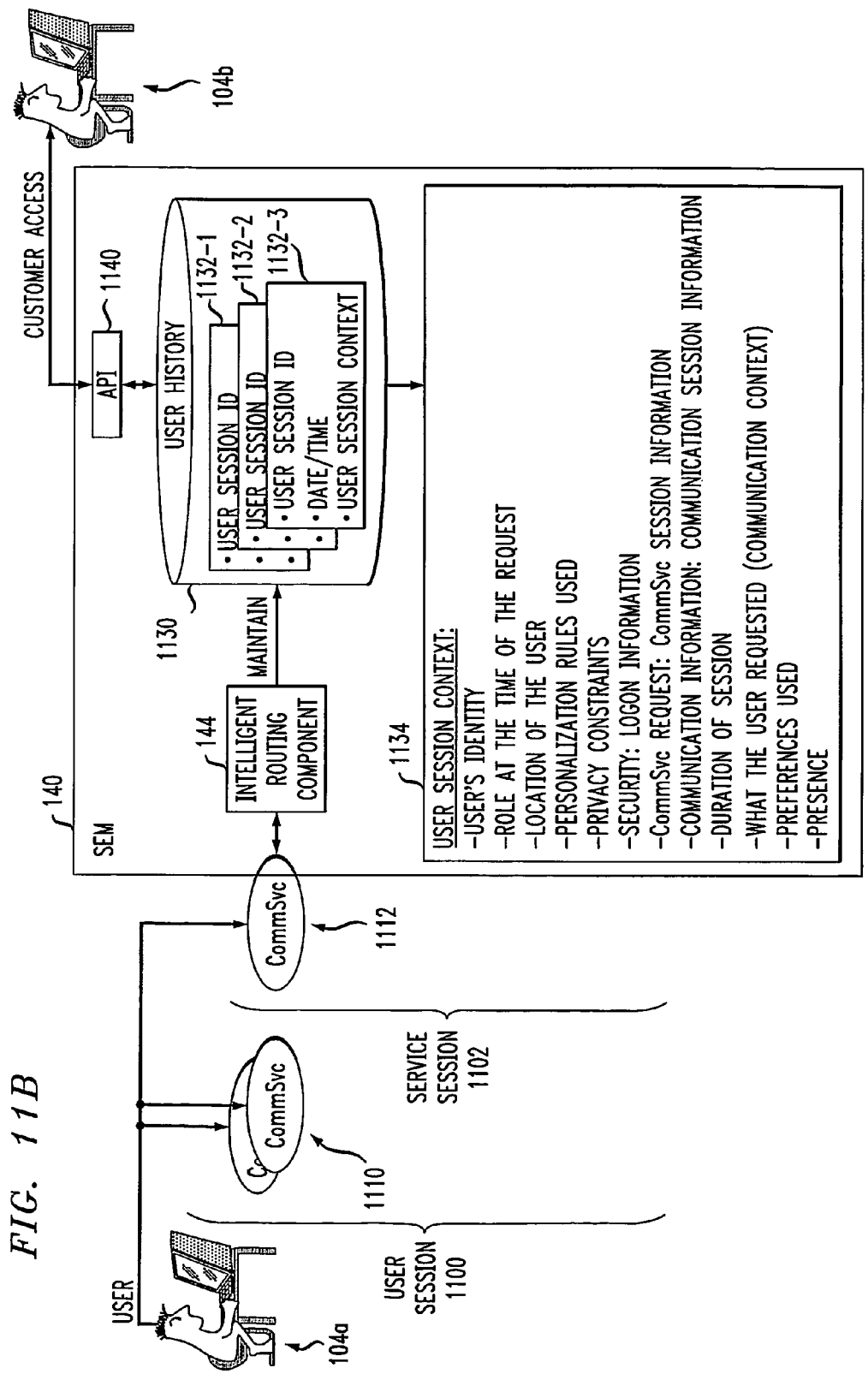

FIGS. 11A and 11B show examples of session hierarchies for communication service execution in the CAS 102 in accordance with the invention.

Referring initially to FIG. 11A, a session hierarchy is shown which includes a user session 1100 initiated by a user 104a, a service session 1102, and a communication session 1104. The session hierarchy is managed in the CAS 102 in the manner described above. Associated with the user session 1100 is a set of communication services 1110, one or more of which may represent services associated with feature services component 120, federated communication services component 124, or federated core services 128. Associated with the service session 1102 is a particular communication service 1112, which may represent a particular one of the communication services 1110.

The communication service 1112 associated with the service session 1102 generates a request which is processed by the service event manager 140 in conjunction with intelligent router 144 and federated core services component 128. The processing of the request may lead to the generation of one or more inbound requests for additional communication services 1114, each of which is processed substantially as an initial communication service 1112 in a hierarchy of communication services, or for a federated service supported by the federated core services component 128.

The communication session 1104 involves the intelligent router 144 establishing communications with one or more enterprise or communications servers 108, 110, which in this example include a switch 1120, a messaging server 1122, an instant messaging server 1124, a presence server 1126, and one or more other media servers 1128. The communication session 1104 may thus include one or more of a telephony session with switch 1120, messaging or instant messaging sessions with respective servers 1122 and 1124, a presence session with presence server 1126, and one or more additional sessions with other media servers 1128. Although not shown in the figure, connector component 150 may be used to establish connections between intelligent router 144 and the elements 1120, 1122, 1124, 1126 and 1128 as required.

FIG. 11B illustrates the storage of session-related information in the service event manager 140 in the FIG. 11A example. The service event manager 140 operating in conjunction with the intelligent router 144 processes a request for the communication service, and maintains associated session-related information in a memory or other storage device 1130 of the CAS 102. In this illustration, the storage device 1130 stores user history information in the form of records denoted 1132-1, 1132-2, 1132-3, etc., each including a user session ID, a date and time indicator, and user session context information. Access to the storage device 1130 may be provided to a customer endpoint 104b via an application programming interface (API) 1140 as shown, where "customer" in this example may refer to an entity which is providing services to the user via the CAS.

As illustrated in element 1134, the user session context information may include, by way of example, user identity, role at the time of the request, location of the user, personalization rules used, privacy constraints, security information such as logon information, communication service request and associated service session information, communication session information, duration of session, what the user requested (e.g., the communication context), preferences used, presence, etc. Other types and arrangements of information may be used.

The particular session hierarchies, processing operations and storage arrangements shown in FIGS. 11A and 11B are intended as illustrative only, and numerous alternative arrangements implementable in a CAS in accordance with the invention will be readily apparent to those skilled in the art.

Figure 12:
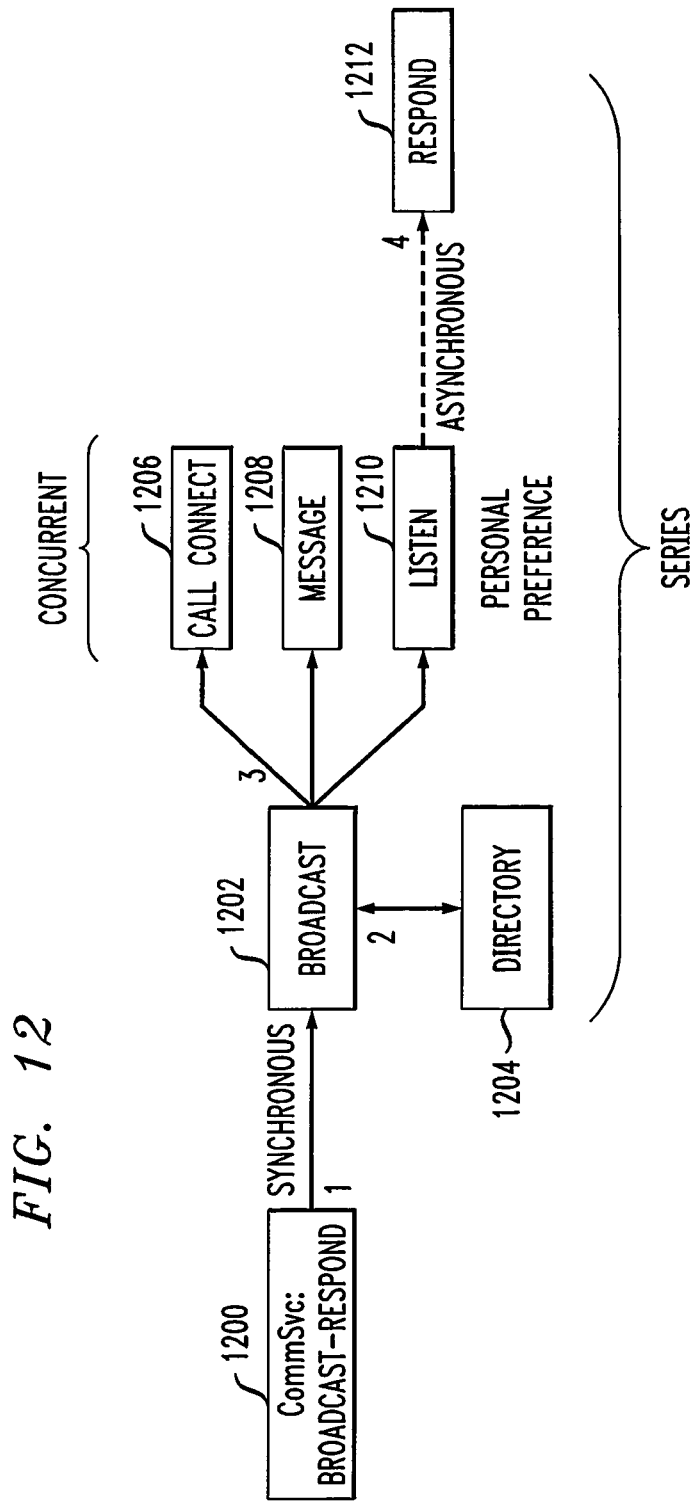
FIG. 12 shows an example of a persistent session that may be maintained within a CAS in accordance with the invention.

FIG. 12 shows an example of a persistent session that may be maintained within a CAS in accordance with the invention. Persistent sessions refer generally to sessions which continue to exist after the requesting device disconnects from the CAS. For example, this may occur when an application that initiated a given session no longer is interested in the outcome of the session and there is work still in progress.

A broadcast-and-response service 1200 is an example of a communication service which may be associated with a persistent session, and its operation is illustrated in the FIG. 12 diagram. The service 1200 is a synchronous service at point 1 in the figure, and involves a broadcast operation 1202 that requires access to a directory 1204 as indicated at point 2 in the figure. The broadcast operation is one of a series of communication service operations that are associated with the service 1200 in this example. The broadcast operation 1202 as indicated at point 3 leads to the generation of a number of concurrent service requests, including call connect service 1206, message service 1208, and listen service 1210. The listen service as indicated at point 4 is an asynchronous service which subsequently leads to execution of a respond service 1212.

A more detailed example of the processing of a communication service request by the service event manager 140 is given below.

1. Request session:
   a. If user session ID previously allocated, and if sub-task request, allocate new session token and associate with parent session token.
   b. It user session SD previously allocated, and if parallel (sibling) task request, allocate new session token and associate with parallel session. Record interested events.
   c. If user session ID previously allocated, and if concurrent task linkage request (multiple parents), allocate new session token and associate with concurrent sessions. Record interested events.
   d. If user session ID not previously allocated, initiate new session.
2. Add user session ID to session information.
3. Process context:
   a. Access requester specific history of initiated and receiving of events (communication or business), if maintained in a persistent store.
   b. Connect to federated core services as needed for directory of user/device/appliance profiles, security (e.g., authorization), directory of enterprise data, database of data, management information, etc.
   c. Determine with respect to the requester:
      (i) Role of requester for request: user, administrator, "platinum," none, etc.
      (ii) Security preferences.
      (iii) QoS preferences and rules.
      (iv) Personalization rules.
      (v) Privacy rules.
      (vi) Originating device.
      (vii) Failure preferences.
      (viii) Personalization/presence preferences.
   This context establishes what the requester can and cannot do, what will be personalized or not personalized, what QoS channel should be used, what information is passed or not passed to the receiver, what preferences take place in decision of how to communicate with recipient, etc.
4. Comm task:
   a. Initiate possible decomposition of request by communication services manager 142.
      (i) Comm task to process.
      (ii) Data task to process.
      (iii) Results of data task processed.
      (iv) Errors as appropriate: invalid script, processing error, etc.
   b. Receive comm or data task to process:
      (i) Parse and interpret request.
      (ii) Apply inbound routing comm rules, e.g., alter destination recipient/device based on presence preferences and routing preferences, invoke intelligent router for routing, etc.
      (iii) Transform message as appropriate.
      (iv) Manage update to user context (of this event).

(v) Initiate comm task processing, e.g., locate service provider through registry; initiate routing of comm request to communication services manager 142.

Note that a comm task can result in processing by a network server (e.g., PBX, messaging), an enterprise server (e.g., database management server, workflow server, message queue server), an enterprise application (e.g., supply chain manager, contact center), or other system element.

5. Manage events.
6. Manage response:
a. Associate response to session token.
b. Evaluate response.
c. Record response to aggregate.
d. If response is new comm service (called "inbound") request:
   (i) Record events, record context as determined by business policy.
   (ii) Get new session token, possibly linked to some previous determined session.
   (iii) Invoke communication services manager 142 as appropriate.
   (iv) Recursively process comm service as needed.
e. If response is internal comm request, process request.
f. Conclude session ID, recording response; record events; record context as determined by business policy.
g. Aggregate responses for all comm and data task initiations.
h. Reply to initiator of request.

It is to be appreciated that the foregoing example is merely illustrative of communication service request processing that may be implemented by the service event manager 140 in the CAS 102, and other types of request processing may be used.

Communication Services Manager 142

The communication services manager 142 decomposes a given communication service request into its individual executable tasks, which as noted above are also referred to herein as "communication tasks" or simply "comm tasks," and may operate recursively and hierarchically. It preferably utilizes a schema or other communication service script, which may be defined by a description language, to determine the behavior of the communication task, the transactions, the expected return results, and the pre-conditions, post-conditions or other associated constraints. It uses this communication script, in addition to pre-defined or learned behavior, to determine the order of the tasks, and the nature of the aggregated results. It decomposes the communication service into a set of communication tasks, any of which may be composite services, requiring recursive processing behavior.

It should be noted that some of the communication tasks may be processed substantially in their entirety within the communication services manager 142. If the response to a given request is itself a request for a communication service, the communication services manager may be recursively initiated. The communications services manager also aggregates the responses from each communication task, based on type of response expected, e.g., synchronous, asynchronous, concurrent, none, error, and returns the response to the service event manager 140.

The communication services manager 142 is thus configured to provide run time service support for communication services implemented by the CAS 102. It is responsible for service decomposition and response aggregation. The incoming service request, a communication service, is decomposed into its one or more communication tasks and assembled in a logical workflow as defined by the communication service. That is, as mentioned previously, some of the communication services are compositions of multiple communication tasks. Each such communication task is processed in accordance with the defined script, to realize the overall communication service request. Response aggregation is the reverse process of assembling the responses in the same logical manner from the tasks into a response for the complete communication service.

By way of example, the above-noted "click-to-communicate" service may include multiple communication services, e.g., services to request directory services, to connect a call, to connect to a PDA, etc. The associated transaction between the user and the CAS includes the full set of communication tasks that make up the click-to-communicate service.

As another example, a "broadcast-and-respond" service is made up of two main services called broadcast and respond. The broadcast service sends the messages, registers the respond service to handle the response events, and then disconnects. The respond service may be invoked by the communication services manager 142 to manage the incoming events that comprise the responses to the original broadcast.

The communication services manager also initiates the registration and authentication associated with every one of the tasks from the decomposition. In addition, it is responsible for parsing and interpreting this request. To be able to do this successfully, script location services are invoked which may interface with standard LDAP directories, SIP location servers, etc. Finally, after any required authentication is successful, it passes the request to the service event manager 140. It should be noted that requests can be in the form of CPL scripts, SOAP scripts etc. Not all forms of requests require authentication.

Figure 13:
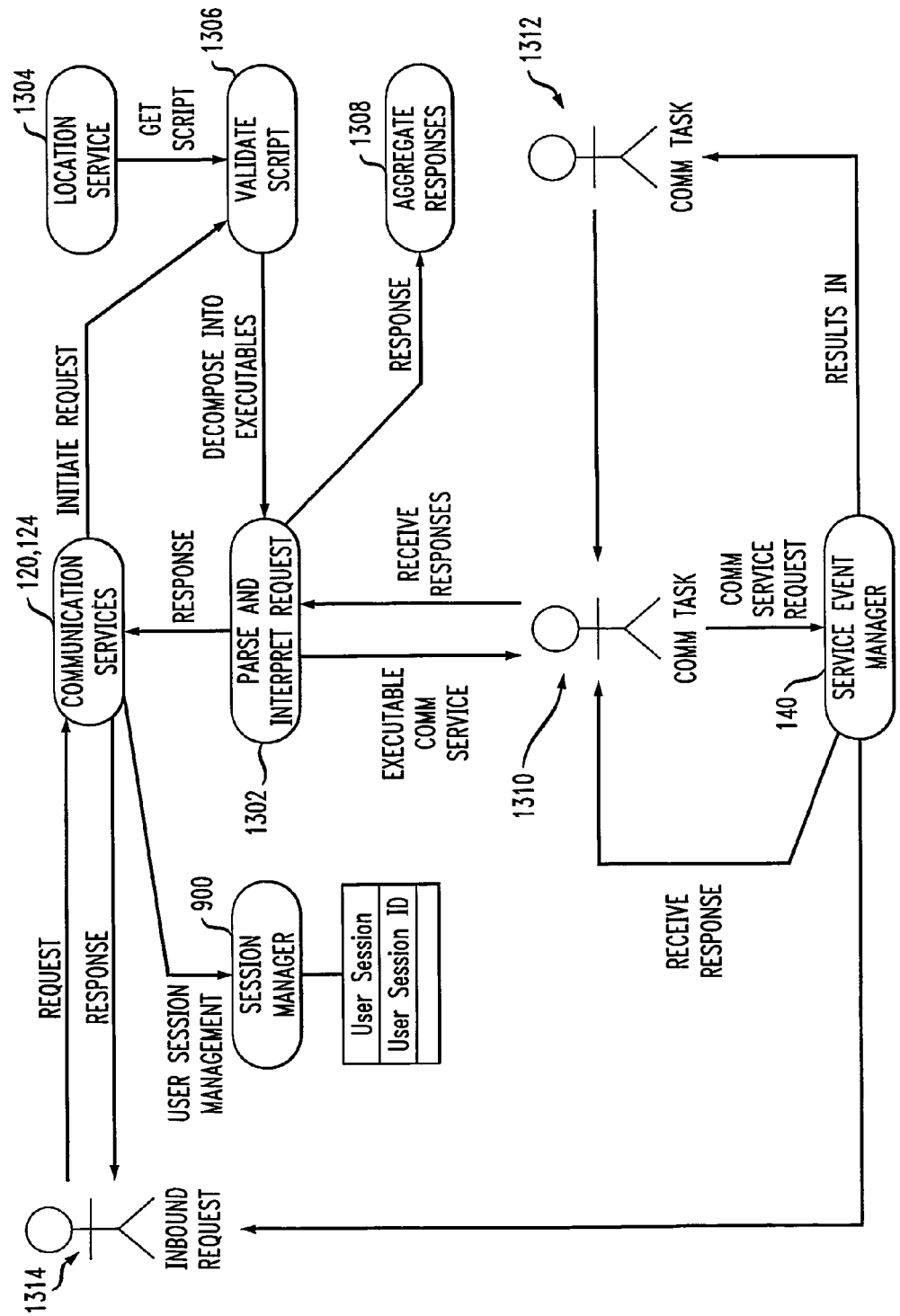
FIG. 13 is a diagram illustrating an example communication services manager in a CAS in accordance with the invention.

FIG. 13 is a diagram illustrating an example communication services manager 142, and its interaction with other components of the CAS 102. The communication services manager 142 in this embodiment includes a Parse and Interpret Request element 1302, a Location Service element 1304, a Validate Script element 1306, and an Aggregate Responses element 1308. The diagram shows interaction between these elements and a number of components of the CAS, namely, communication services components 120, 124, service event manager 140, and session manager 900, all of which may operate substantially as previously described.

An initiated request is processed by Validate Script element 1306, which obtains the appropriate script or scripts from Location Service 1304. Element 1306 validates the script(s) and provides decomposition into executables which are parsed and interpreted by element 1302. Element 1302 determines at least one communication task 1310 which interacts with the service event manager 140. The service event manager 140 may generate responses back to the communication task 1310. In addition, its processing may result in triggering of another communication task 1312, a communication service, and/or another inbound request 1314 requiring processing in accordance with communication services 120, 124. Responses received by element 1302 are aggregated by element 1308.

Figure 14:
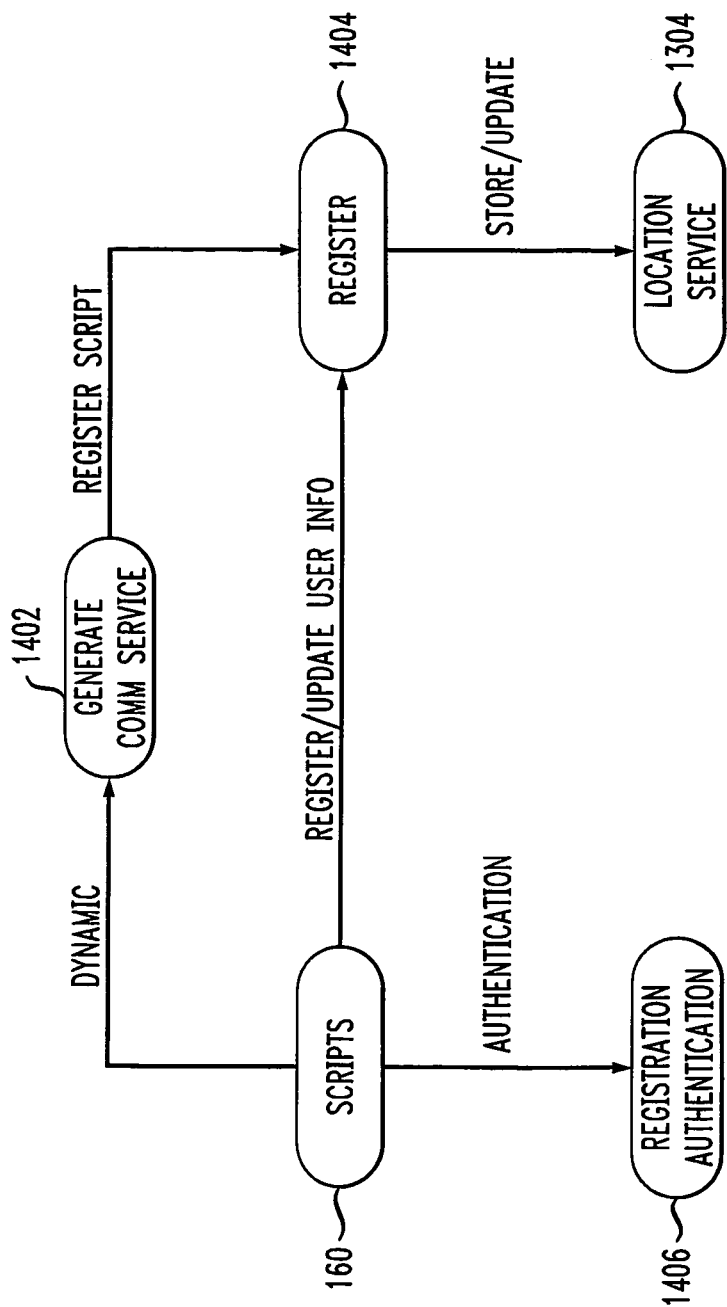
FIG. 14 is a diagram illustrating an example communication services script registration process implementable in a communication services manager in a CAS in accordance with the invention.

FIG. 14 illustrates the manner in which the communication services manager 142 may be configured to register particular communication scripts within the scripts database 160. As shown, the communication services manager 142 may include a Generate Comm Service element 1402, a Register element 1404, and a Registration Authentication element 1406. A given script or "dynamic" is supplied from the scripts 160 to element 1402, while register/update user information is supplied to element 1404, and associated authentication information is supplied to element 1406. If the script is authenticated, it is registered by element 1404 in response to a register script request from element 1402. Element 1404 then stores the registered script and provides appropriate update information to element 1304 as shown.

An example of the processing of a communication service request by the communication services manager 142 is given below.

1. Request new session token for request.
2. Get request script.
3. Validate script.
4. Parse into one or more comm tasks, zero or more internal comm tasks, zero or more comm services. Note that a comm service comprises one or more comm tasks, and a comm task comprises zero or more comm services. Each comm task results in particular processing steps, not specifically shown in this example but discussed in greater detail below.
5. Determine which comm service tasks to perform, in what order, and what aggregated results to return.
6. A comm task may be processed in the communication services manager and/or may require invoking the service event manager. More than one invocation of the service event manager may result, depending on the composition of the communications service request.
7. Receive responses:
   a. Response appropriate for request, e.g., aggregate responses in accordance with request.
   b. Response for composite communication service, recursively initiate communication services manager.
8. Respond as appropriate:
   a. Comm task to process.
   b. Data task to process. The term "data task" as used herein refers to an example of a particular type of comm task, that is, a comm task more particularly involving data.
   c. Results of data task processed, if accomplished in communications services manager.
   d. Errors as appropriate, e.g., invalid script, processing error, etc.
9. Report session status and request session conclusion.

Again, it is to be appreciated that the foregoing example is merely illustrative of communication service request processing by the communication services manager 142 in the CAS 102, and other types of request processing may be used.

Intelligent Communication Services Router 144

The intelligent communication services router 144 processes the routing requests, manages events, and handles responses, media translation, re-routing, etc. It invokes the appropriate ones of the connector(s) 150 for communicating with external servers such as 108, 110 and 212. It determines if a response results in another communication service request. It also provides resource management regarding the use of external servers. It routes inbound requests and responses, e.g., to the service event manager 140 for further processing, which in turn may invoke the communication services manager 142.

The intelligent communication services router 144 may include elements for interfacing with a wide variety of external servers, such as enterprise server 108, communications server 110, or the servers 212 identified in FIG. 2A. These servers may more particularly include SIP proxy and redirect servers, IP telephony servers, switches such as MultiVantage™ and Definity® from Avaya Inc. and other PBXs, gateways, etc., wireless network servers, messaging servers, media servers, computer-telephony integration (CTI) servers, databases, web services, etc.

The term "server" as used herein is intended to include without limitation any one or more of these or other devices which are configurable to perform communication processing tasks on behalf of the CAS 102.

The intelligent communication services router 144 may also be configured to provide resource management of the above-noted infrastructure servers, in addition to providing routing services. For example, it can be configured to route inbound response events from an infrastructure server layer to the service event manager 140 for processing, which subsequently interacts with the communication services manager 142. Communication services may use the intelligent router to access contact control and media control services associated with underlying communication platforms.

Routing destinations may include web services sites as well as other application servers. As indicated above, the intelligent router 144 communicates with the various infrastructure components external to the CAS 102 through connectors 150.

The intelligent router 144 may be configured to include or to otherwise be associated with an element which operates as an edge server. Such an edge server may include a bank of user agents (UAs), where each user agent "proxies" for a user in the sense that it assists in maintaining a centralized state, such as user session information, for each user interacting with the CAS.

Figure 15:
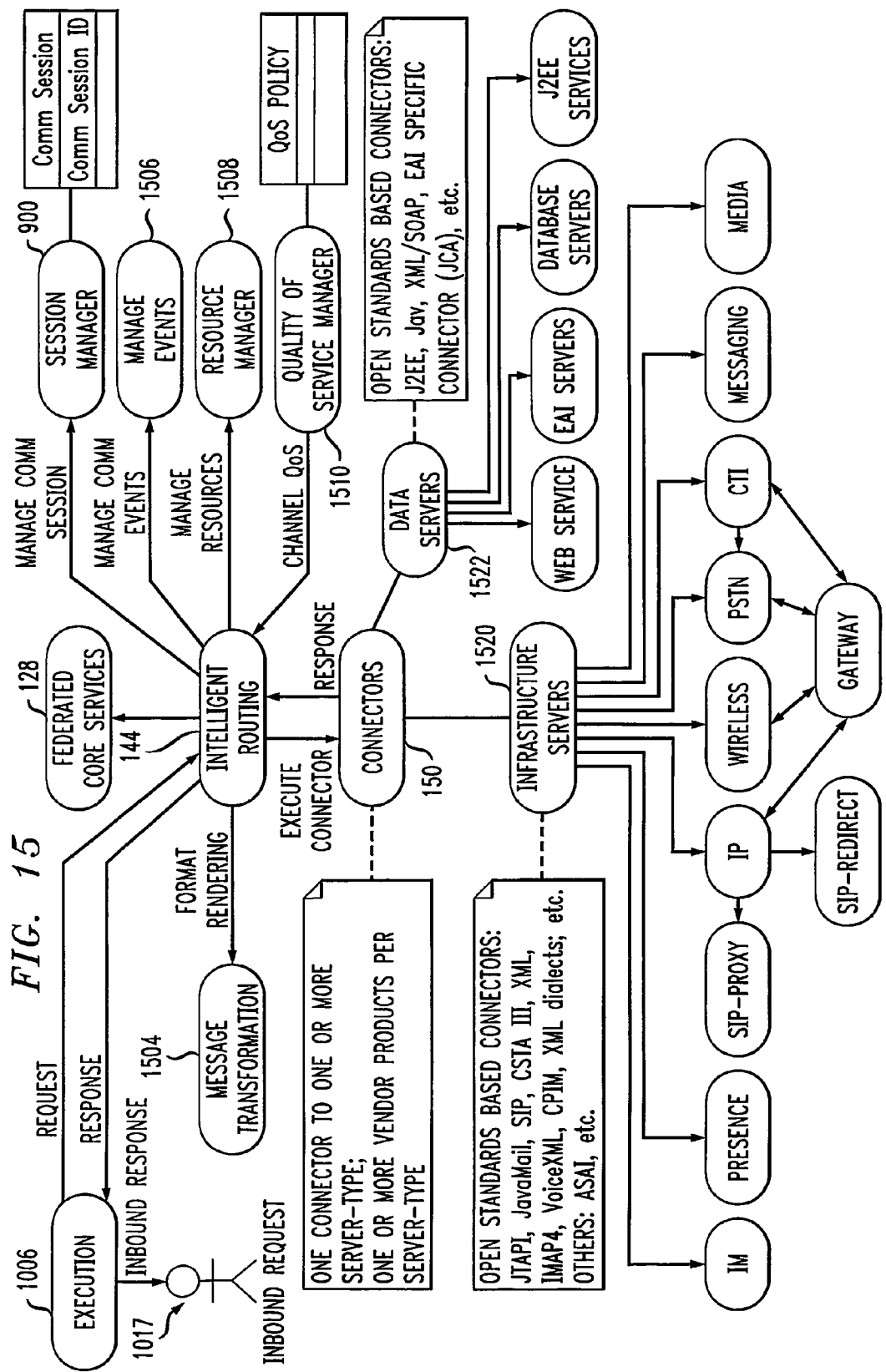
FIG. 15 is a diagram illustrating an example intelligent communication services router component in a CAS in accordance with the invention.

FIG. 15 is a diagram which shows an example intelligent communication services router 144 in accordance with the invention, and illustrates its interaction with other components of the CAS. The diagram as shown includes intelligent router 144, and shows interaction between that CAS component and a number of other CAS components, namely, federated services 124, 128, connectors 150, session manager 900, and execution element 1006 (which may generate inbound request 1017 as described in conjunction with FIG. 10). Associated with the intelligent router 144 are Message Transformation element 1504, Manage Events element 1506, Resource Manager 1508, and Quality of Service (QoS) Manager 1510.

The intelligent router 144 interacts with connectors 150, which in this example provide interfaces to a set of infrastructure servers 1520 and a set of data servers 1522, which may be viewed as corresponding generally to the servers 108, 110 of FIG. 1. The set of infrastructure servers 1520 in this example includes an IM server, presence server, IP network (with associated SIP proxy and SIP redirect servers), a wireless server, a PSTN server, a CTI server, a messaging server, and a media server. The IP, wireless, PSTN and CTI servers are shown as being associated with a gateway. The set of data servers 1522 includes web service servers, EAI servers, database servers, and J2EE services servers.

It should be emphasized that the particular arrangement of elements in FIG. 15 is presented by way of illustrative example only, and numerous alternative arrangements may be used to implement the invention.

The following is an example of a set of processing operations which may be performed by the intelligent communication services router 144.

1. Request new session token for request.
2. Get request and destination information.
3. Connect to federated core services 128 as needed for QoS policy, directory of device profiles, security (e.g., authorization), directory of enterprise data, database of data, etc.
4. Determine if media format needs to be rendered for destination; perform rendering.
5. Record comm event to manage; append to previous event if asynchronous response.

6. Provide routing decisions based on presence information, personal routing rules, and business routing rules:
   a. Routing requests originate from service event manager 140 or from end servers 108, 110 or connectors 150. Presence and rules-based routing decisions are made in the intelligent router 144. For example, a switch, such as the above-noted MultiVantage™ switch, may need routing decisions prior to routing the request.
   b. The presence server is used to determine all endpoints associated with the requested inbound or outbound communication.
   c. The personal rules are used to determine which route is preferred based on inbound origination information (e.g., name of user, type of media, etc.), time of day, urgency, etc.
   d. Separate but similar rules are used to determine which route is preferred for outbound requests (e.g., class of user, busy call indicator and re-route to voice mail, automatic call-back, etc.).
   e. Communication handling information, such as call coverage events, is made available from the infrastructure server through the connector 150 to the intelligent router 144 upon a previous routing request that has not completed. These events are used to handle re-routing of inbound or outbound requests, such as re-route based on available resource, re-route based on time of day or best cost route, invoke a call-back at a certain time of day, invoke a call-back when destination is not busy, etc. Further, a re-route to voice mail may be decided, in which case the call event will determine the appropriate voice message to apply (e.g., re-route to user's voice mailbox and apply a specified user voice mail greeting based on personal rules, re-route to an administrator and apply that greeting, etc.).
   f. Business rules may be used to determine which endpoint is preferred based on inbound communications that request urgency, security, QoS, best-cost-route rules, best resource available rules (e.g., agent skills based routing, available agent, least congested), etc.
7. Determine resources; may require re-routing if resources unavailable.
8. Determine QoS needs; may require re-routing if appropriate QoS channel not available.
   a. Resolve conflict if QoS unavailable through policy and QoS service manager.
   b. Connect to federated core services 128 as needed for QoS policy, directory of device profiles, directory of enterprise data, database of data, etc.
9. Invoice appropriate connector.
10. Receive responses:
    a. Response appropriate for request: aggregate responses in accordance with request.
    b. Response for new composite communication service, recursively initiate communication services manager 142.
    c. Response expected as asynchronous event:
       (i) Respond as appropriate.
       (ii) Maintain session ID.
       (iii) Maintain comm event history.
    d. Response is unsuccessful routing, with call coverage event information to be used for re-route.
11. Respond as appropriate:
    a. Some requests result in data response.
    b. Some in no response.
    c. Some in asynchronous response.
    d. Some in re-route.
    e. Some in action with no response other than failure.
    f. Some in simple success or failure response.
    g. If not asynchronous event/response, report session status and request session conclusion.
    h. If asynchronous event, do not terminate session.
    i. If asynchronous response, roll up session and event history, respond with information, and request session termination.

It is to be appreciated that the foregoing example is merely illustrative of a set of processing operations that may be implemented by the intelligent communication services router 144. Other processing operations may be used, as will be apparent to those skilled in the art.

Connectors 150

The connectors 150 provide a logical mapping of request and response for the communication services accessible via the CAS 102, using synchronous, asynchronous, transactional or other techniques or combinations thereof. The purpose of the connectors is to assimilate the dissimilar communication platforms used to support services provided by the CAS into a single functional collective (spanning voice, data, messaging, e-mail, etc.) which provides a homogeneous environment to a given requesting user. In an illustrative embodiment, it does this by providing mediation that pulls together the various capabilities of the communication platforms used into the common interface that is exposed to the requesting user. The connectors 150 thus ensure that this interface will be presented to the requesting user in a way that is communication platform-independent.

The connectors 150 may comprise a set of interfaces, including, for example, APIs, protocols, IDLs or other interface definitions, etc. These interfaces hide the complexities of infrastructure server access from the requesting user, including the ability to initiate and receive on-line contacts (e.g., real-time contacts such as telephone call, chat, etc.) and offline contacts (e.g., email, voice mail, etc.). The connectors provide protocol management through appropriate server specific interfaces invoking the appropriate protocol for each communication or data element. These protocols include, but are not limited to SIP for real time communication sessions, HyperText Transport Protocol (HTTP) or XML/SOAP for web services, Simple Mail Transport Protocol (SMTP) for email, proprietary ASAI to ACP for telephony services, EAI for data services, etc. The connectors manage the convergence of the service results received from these different environments.

The following is an example set of processing operations that may be performed by the connectors 150:
1. Request new session token for request.
2. Get request and destination information.
3. If routing request:
   a. Pass to intelligent communication services router 144 with comm origination and intended destination information.
   b. Receive results from intelligent router and pass results to requester through appropriate interface (protocol, internal connector interface, etc.).
4. If communication or data request (from intelligent router, service event manager 140, infrastructure servers, etc.), determine appropriate connector for request.
   a. Determine resources available (e.g., server failure from prior connection attempt); may require re-routing if resources unavailable.
   b. Connect to federated core services 128 as needed for QoS policy, directory of device profiles, security (e.g., authorization), directory of enterprise data, database of data, etc.

c. Mediate interfaces from request to connector, as appropriate.
d. Provide feature convergence, as appropriate. Where there are differences in models, feature request of one type may need to be mediated into a set of features of another connector type (e.g., "make a call" in PSTN resolves into "SIP INVITE").
e. Record connector event.
f. Determine appropriate connector server; locate server.
g. Invoke connector with appropriate interface and information.
h. In the case of communications servers, these may be actual servers (such as a messaging server, a switch, etc.), or a management server.
i. In the case of data servers, these may be actual database management systems, EAI engines, or an enterprise application (e.g., CRM application).

5. Responses can be null, asynchronous, synchronous, error, or server failure.
   a. Synchronous, error: Respond as appropriate.
   b. Server failure: respond as appropriate; Logging and alarm management can be notified.
   c. Asynchronous:
      (i) Initially respond success of connector only.
      (ii) Maintain session.
      (iii) Upon receipt of response, roll up session and event history; respond with information and request session termination.
   d. Maintain session ID as appropriate, including terminating, continuing.
   e. Maintain comm event history.

The particular processing operations in the foregoing example should be considered illustrative only, and a given embodiment of the invention need not require any particular subset of these operations.

Service Creation Environment 152

The service creation environment 152 provides an integrated platform for building communications services and integrating them with applications. In an illustrative embodiment, the service creation environment may be configured to comprise one or more of the following elements, features, or functions.

1. Interfaces for integrating communications services with application frameworks, to provide interfaces for building and integrating federated communications services with application frameworks.
2. SDKs or other software tools for building multi-modal interfaces for the access manager 132.
3. Testing and emulation tools for simulating communications services that are accessible via the CAS.
4. Deployment descriptions for CAS components.
5. Software tools for integrating federated communications services 124 with an application or application framework in terms of open web services, XML, EJB, Java/COM bean, Java/CORBA, etc.
6. Software tools to orchestrate federated communication services into higher level communication services which can be persisted into a registry of services, along with other federated communication services.
7. Software tools for building and orchestrating federated communications services within applications.
8. Software tools for tracking communication services utilization within an application.
9. Software tools to facilitate integration of communication services and components into applications.
10. Specifying communication service scripts
11. Software tools to facilitate discovery, reviewing and selecting communication service script based interfaces and integrated these interfaces into applications.
12. Combining services together to provide a composite service.
13. Supporting communication process flow services interleaved with business processes.
14. Integrating communication management services with business application management services (e.g., directory, security, etc.)
15. Integrating communication management services with business management information (e.g., user profile, security credentials, etc.)
16. Integrating the access manager with portal services.
17. Provisioning communications platforms and business platforms within a consistent service model (e.g., SNMP MIBS)
18. Provisioning integrated business rules with communication application service servicing rules (e.g., routing preferences, security, QoS, personal, user classes, class of service, etc.).
19. Software tools to instantiate a registry of communication scripts, web services, interface repository, etc. for use in discovery, selection, and integrating with business applications.
20. Software tools to manage a given CAS instance, including management of user provisioning and identity, persisted session storage, and management of events, errors, user profile, class of service, personalized rules, security credentials, etc.

The communication services of the CAS may be created by various parties, including parties associated with unrelated enterprises. These services may be integrated together through common interface specifications, as well as through the use of the federated services 124, 128. The integration of these services into an application, and the composition of these services into higher-level services, may be provided through a suite of SDKs or other software tools in the service creation environment 152. The service creation environment 152 is used to create new communication services and to create communication-enabled applications. These services may be utilized by the end user of the CAS to build applications.

The service creation environment 152 may be configured so as to map to an N-tier architecture which may include both business logic in the EJB sphere of control and multiple presentation layers (e.g., HyperText Markup Language (HTML)/XML, VoiceXML, WAP/Wireless Description Language (WDL)/Handheld Device Markup Language (HDML), etc.).

Figure 16:
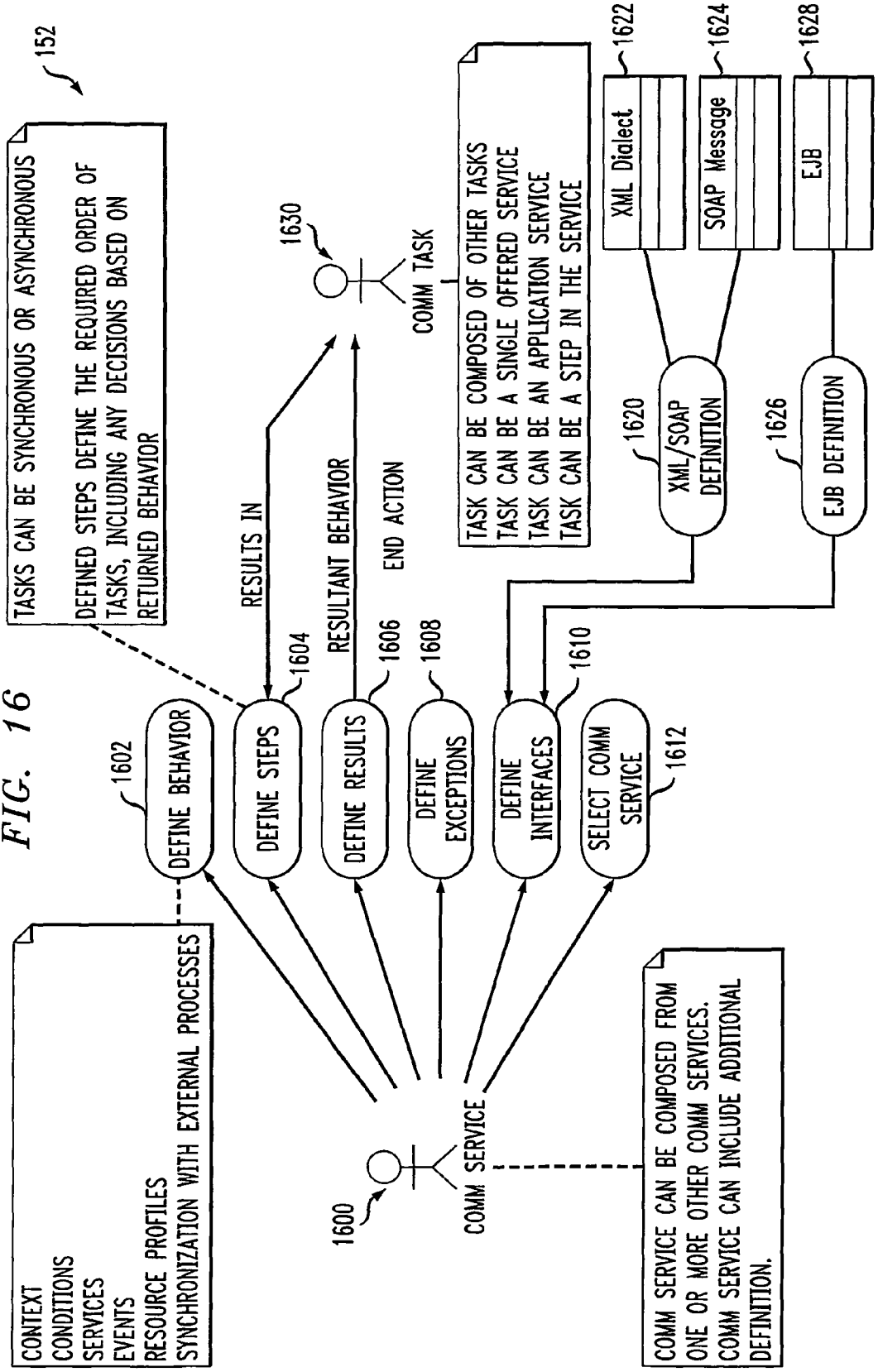
FIG. 16 is a diagram illustrating an example service creation environment in a CAS in accordance with the invention.

FIG. 16 illustrates the operation of an example service creation environment 152 in accordance with the invention. In this example, a communication service 1600, which may represent an advanced communication service 130, a federated communication service 138, or a federated core service 128, is composed utilizing a number of processing elements. These processing elements include a Define Behavior element, a Define Steps element 1604, a Define Result element 1606, a Define Exceptions element 1608, a Define Interfaces element 1610, and a Select Comm Service element 1612.

A given communication service 1600 can be composed of one or more other communication services, and may include additional definition as required. Associated with the Define Interfaces element 1610 in this embodiment are an XML/SOAP Definition element 1620, which accesses XML dialect information 1622 and SOAP message information 1624, and an EJB Definition element 1626, which accesses EJB information 1628.

Other elements not explicitly shown may also or alternatively be utilized, such as a Net definition element, a Java definition element, etc., depending on the particular needs of a given deployment environment.

The Define Behavior element 1602 may include information such as context, conditions, services, events, resource profiles, synchronization with external processes, etc.

The Define Steps element 1604 defines the required order of communication tasks for implementing the communication service 1600, including any decisions based on returned "resultant behavior" from a given communication task 1630, also referred to herein as a "comm task." A given communication task can be composed of other tasks, can correspond to a single offered service, can correspond to an application service, or can correspond to a step within a given service.

The particular arrangement of processing elements in the example service creation environment of FIG. 16 should not be viewed as being a requirement of the invention. Other arrangements of processing elements may be used to implement a service creation environment within a CAS in accordance with the invention, as will be readily appreciated by those skilled in the art.

Communication Service Scripts 160

The communication service scripts 160 defined requested services in sufficient detail to allow these services to execute in the system. An associated description language may be used to capture these details (e.g., Web Services Description Language (WSDL), orchestration flow, etc.). Because a communication script can include more than one communication service, each such service is preferably delimited into an embedded script. Along with each service description, the script will generally indicate if the corresponding services are executed concurrently, in series, with expected asynchronous or synchronous responses, etc. The defaults, if not specified, may be executing the scripts in series, with responses appropriate to the communication requested. As indicated previously, communication as the term is used herein is intended to include real-time, near-real-time and non-real-time communications, and may involve voice, data or other information formats.

The communication service scripts 160 may include presentation scripts configured to manage multi-modal interactions and provide markup to be interpreted by servers or end-user appliances including web browsers, multi-modal browsers, voice browsers, etc.

A given communication service script may be configured to implement communication i services with a database-neutral, platform-neutral, and programming language-neutral interface.

A communication service script may be initiated by a business process, and a business process may be initiated by a communication service script. Similarly, a communication service script may wait for an input or other signal from a business process, and a business process may wait for an input or other signal from a communication service script.

Scripts may be designed to run in a distributed architecture across multiple infrastructure servers external to the CAS.

Script interfaces to applications are preferably based on open standards (e.g., XML based) to promote multi-vendor development of applications and the creation of new scripts.

A communication service 120, 124 may be viewed as a particular instance of the script specification associated with a request of the corresponding service. For example, a "click to communicate" service may initiate a communication session specifying originating communication party information, destination party (or parties) information, exceptions that request (with appropriate parameters) services such as set-up_VoIP_call, set-up_chat_session, or request_callback, each with appropriate parameters specified, and with a series indicated.

A given communication service script may include, by way of example, at least a subset of the following elements.

1. Identifier of the script.
2. Version of the script.
3. Owner of specification.
4. Name or other identifier of the communication service.
5. Communication request actions.
6. Communication attributes (e.g., schema) with indications of input, output, error, exceptions, etc.
   a. Meaning of attributes.
   b. Mandatory, optional attributes indicator.
   c. Value ranges, as appropriate, for attributes.
   d. Exception handling.
7. Communication behavior (e.g., context), such as:
   a. When to establish a communication.
   b. With whom to establish a communication.
   c. What to communicate and when.
   d. What media to use and when.
   e. What events to process and when.
   f. What type of responses expected, such as synchronous or asynchronous.
   g. Pre-conditions to process, such as data access to determine a business user profile class-of-service indicator.
   h. Post-conditions to process, such as communication information collected is reported to a specified business application (through an EAI connector, for example).
8. Embedded sequences of communication service scripts, with indication of concurrency, series, asynchronous/synchronous response, including such elements as:
   a. Timing of occurrence of activities relative to each other.
   b. Sequence of permitted and prohibited state transitions of events.
   c. Required resources to perform the activities (e.g., QoS).
   d. Event-based synchronization points with other communication or business processes.
9. Unified Modeling Language (UML) sequence diagrams of interrelationships or orchestration process flow language to define communication behavior.

The particular script elements identified above are merely exemplary, and a given script utilized in a CAS in accordance with the invention may include only a subset of these elements, or other elements not specifically listed.

Additional CAS Examples

FIGS. 17 through 24 provide further illustration of the structure and operation of a CAS in accordance with the invention.

Figure 17:
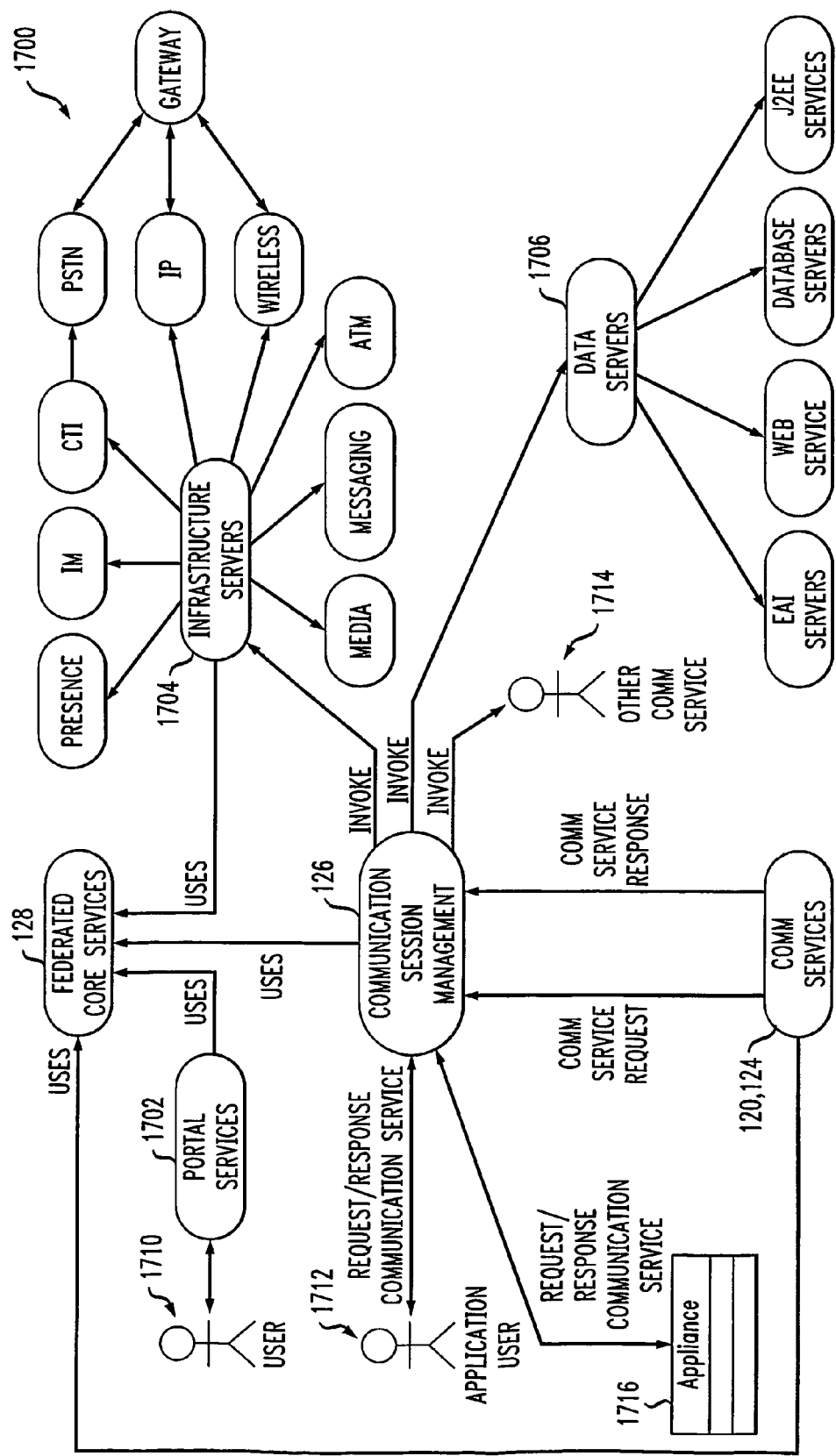
FIG. 17 is a diagram illustrating an example CAS in accordance with another embodiment of the invention.

With reference now to FIG. 17, a diagram illustrating an exemplary communication system 1700 comprising a CAS in accordance with the invention is shown. The CAS includes a communication services component corresponding generally to the feature services 120 and federated communication services 124 of FIG. 1, a federated core services component 128, and a communication session management component corresponding generally to the communication service and session management component 126 of FIG. 1.

The CAS as illustrated in FIG. 17 for includes a portal services component 1702, a set of infrastructure servers 1704, and a set of data servers 1706. The portal services component 1702 provides an interface into the CAS for a user 1710, and may be configured to include appropriate user interfaces as well as other elements associated with the common access framework 122 of FIG. 1. The set of infrastructure servers 1704 includes a presence server, an instant messaging server, a CTI server, a PSTN server, an IP server, a wireless server, an asynchronous transfer mode (ATM) server, a messaging server and a media server. The PSIN, IP and wireless elements are associated with a gateway.

The set of data servers 1706 includes web services servers, database servers, EAI servers, and J2EE services servers. An application user 1712, which may comprise an appliance or any other device with communication capability, interacts with the component 126 in the manner shown. Based on its interactions with user 1710 and application user 1712, the component 126 may invoke one or more other communication services 1714. The component 126 is also shown as interacting with an appliance 1716, which may correspond to appliance 114 or one of the endpoints 104 in the communication system of FIG. 1.

Figure 18:
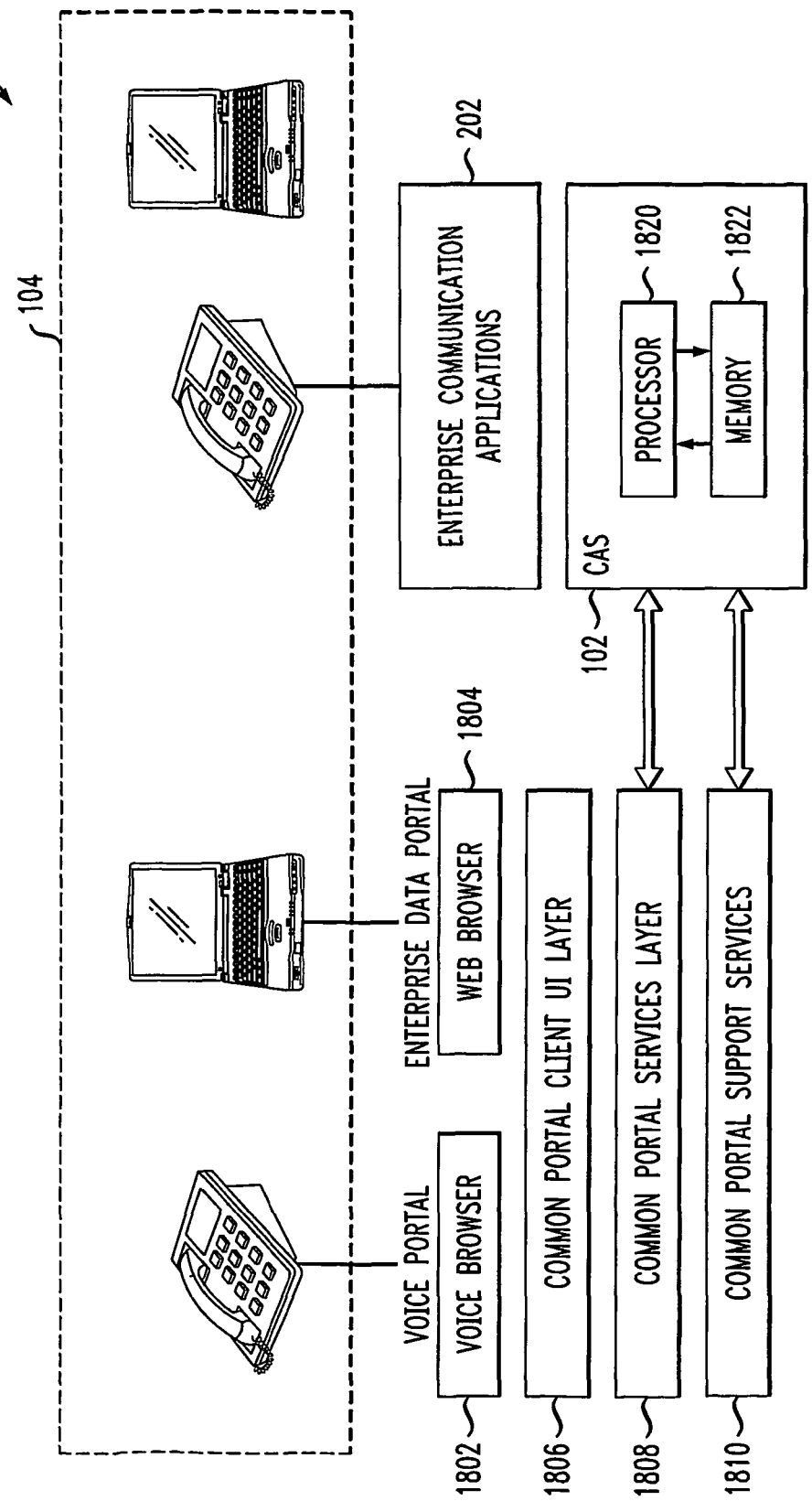
FIG. 18 illustrates example interfaces between communication system endpoints and a CAS in accordance with the invention.

FIG. 18 shows an example of another exemplary communication system 1800 which incorporates CAS 102 as previously described. In the system 1800, a number of endpoints 104 are shown. One of the endpoints comprises a telephone (e.g., any PSTN or SIP based telephone) which interacts with the CAS 102 via a voice portal having an associated voice browser 1802. Another of the endpoints comprises a computer which interacts with the CAS 102 via an enterprise data portal having an associated web browser 1804. Although shown as being separate elements, the voice browser 1802 and web browser 1804 are typically implemented in the corresponding endpoints 104. Other endpoints 104 interact with the CAS via enterprise communication applications 202.

A portal associated with the CAS 102 includes a number of communication layers, including a common portal client user interface layer 1806, a common portal services layer 1808, and a common portal support services layer 1810. Although shown for clarity of illustration as being separate from the CAS 102, one or more of these layers may be incorporated within the CAS 102, e.g., as part of the common access framework 122 or other portal component of the CAS 102. The layers 1806, 1808 and 1810 are shared by the voice and data portals associated with respective voice browser 1802 and web browser 1804, and may be configured so as to provide convenient access to the CAS 102 for a diverse array of endpoints 104.

The CAS 102 as shown in FIG. 18 includes a processor 1820 and a memory 1822. As indicated previously herein, the term "processor" as used in this context is intended to be construed generally so as to encompass any arrangement of one or more microprocessors or other digital data processing devices configured in a conventional manner. The memory may include RAM, ROM, disk-based storage and other types of storage devices, including one or more persistent store elements, also configured in a known manner. The communication processing functions described herein are implemented at least in part in the form of one or more software programs which are stored in the memory 1822 and executed by the processor 1820.

Figure 19:
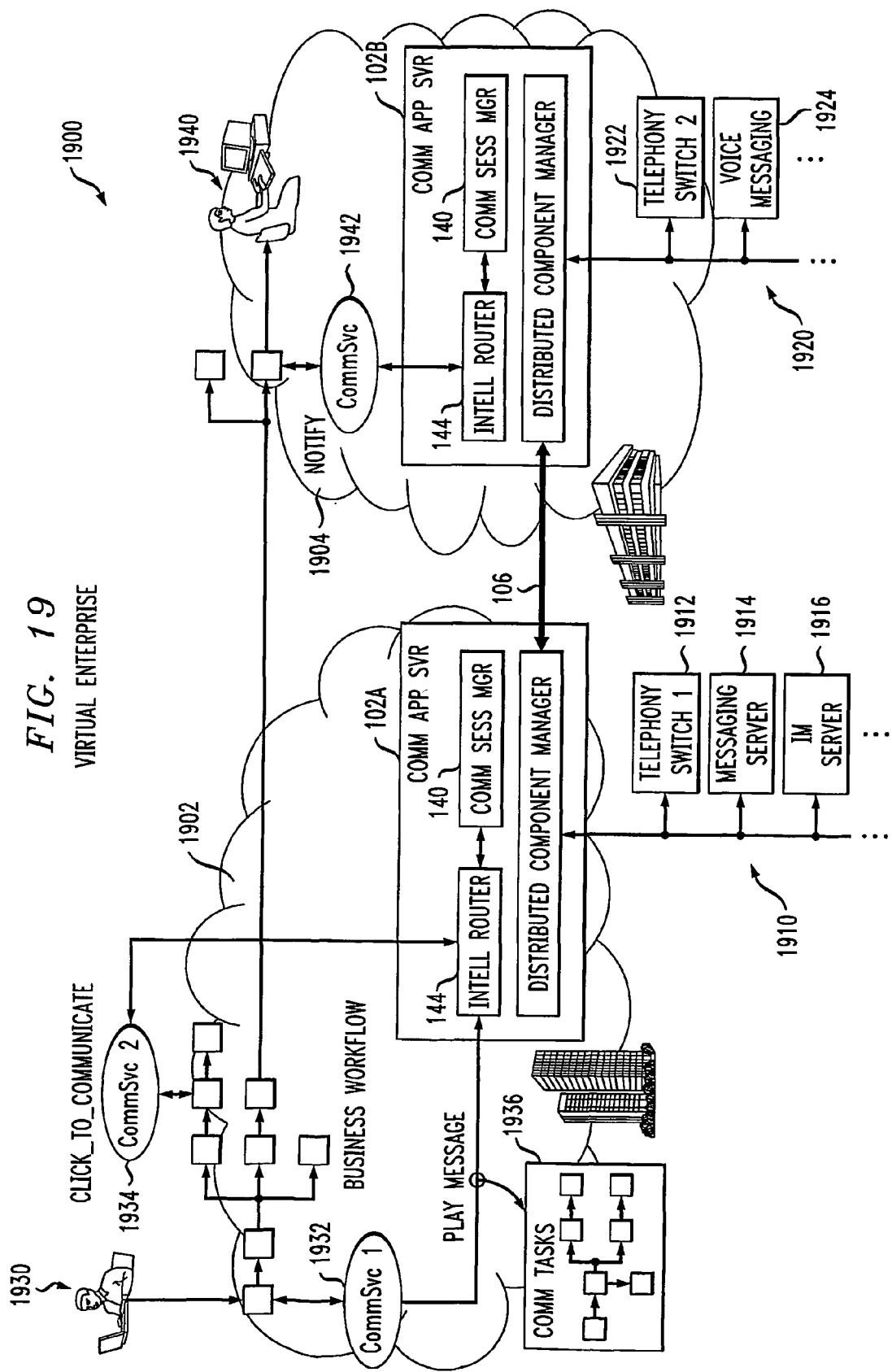

FIG. 19 shows another exemplary communication system 1900, which implements a virtual enterprise comprising first and second CASs 102A and 102B as shown. Each of the CASs 102A and 102B comprises at least a subset of the elements of the CAS 102 of FIG. 1, including a session management component corresponding generally to service event manager 140, and an intelligent router 144. The CAS 102A is associated with a first physical enterprise 1902, and the CAS 102B is associated with a second physical enterprise 1904. The CASs 102A and 102B are interconnected by network 106. In this example, the CASs 102A and 102B are each shown as including a distributed component manager coupled to the network 106. The distributed component manager may be a conventional system element of a type suitable for managing the operations of distributed processing elements, as will be appreciated by those skilled in the art. This element may be eliminated in other embodiments of the invention, with the CASs being coupled to the network 106 using other techniques.

The virtual enterprise achievable utilizing CASs 102A ands 102B allows users within the different physical enterprises 1902 and 1904 to interact as if they were part of the same physical enterprise. The first physical enterprise 1902 has access via the CAS 102A to a set of servers 1910 which includes a first telephony switch 1912, a messaging server 1914, an IM server 1916, etc. Similarly, the second physical enterprise 1904 has access via the CAS 102B to a set of servers 1920 which includes a second telephony switch 1922, a voice messaging server 1924, etc. By interconnection of the CASs 102A and 102B, the users associated with the different physical enterprises can be provided with communication services supported by any of the servers in the different sets of servers 1910 and 1920. For example, a user 1930 associated with the first physical enterprise 1902 is provided with communication service 1932, which corresponds to a "play message" service, and a communication service 1934 which corresponds to a "click-to-communicate" service and includes associated communication tasks 1936 as shown. One or both of these services may involve other services associated with the other physical enterprise 1904, such as notification of a user 1940 within enterprise 1904 via a "notify" service supported by the CAS 102B.

Of course, the particular number and arrangement of CASs in FIG. 19 is by way of example only, and a given system can include more or fewer CASs, each of which may be similarly arranged or distinctly arranged.

Figure 20:
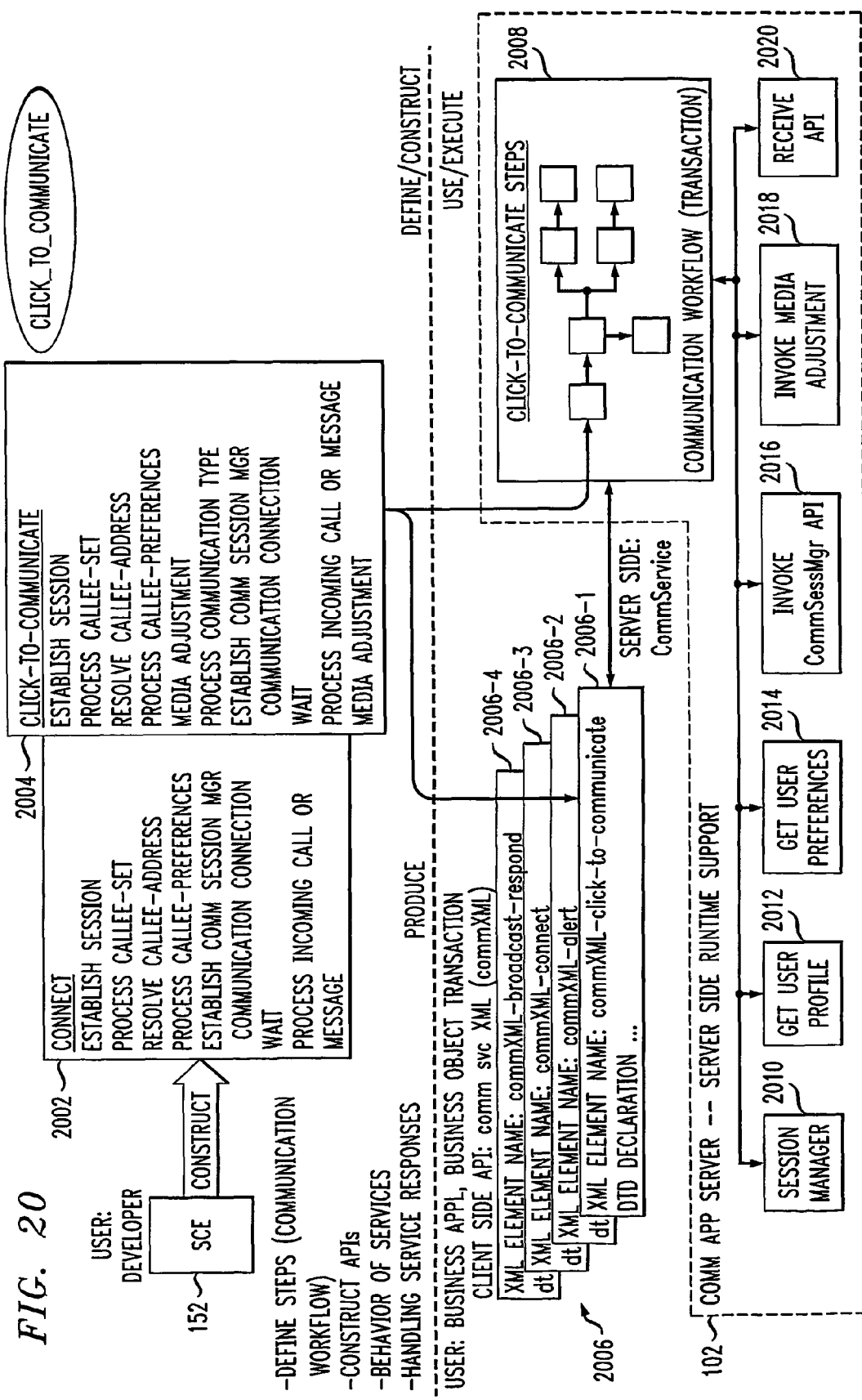
Figure 21:
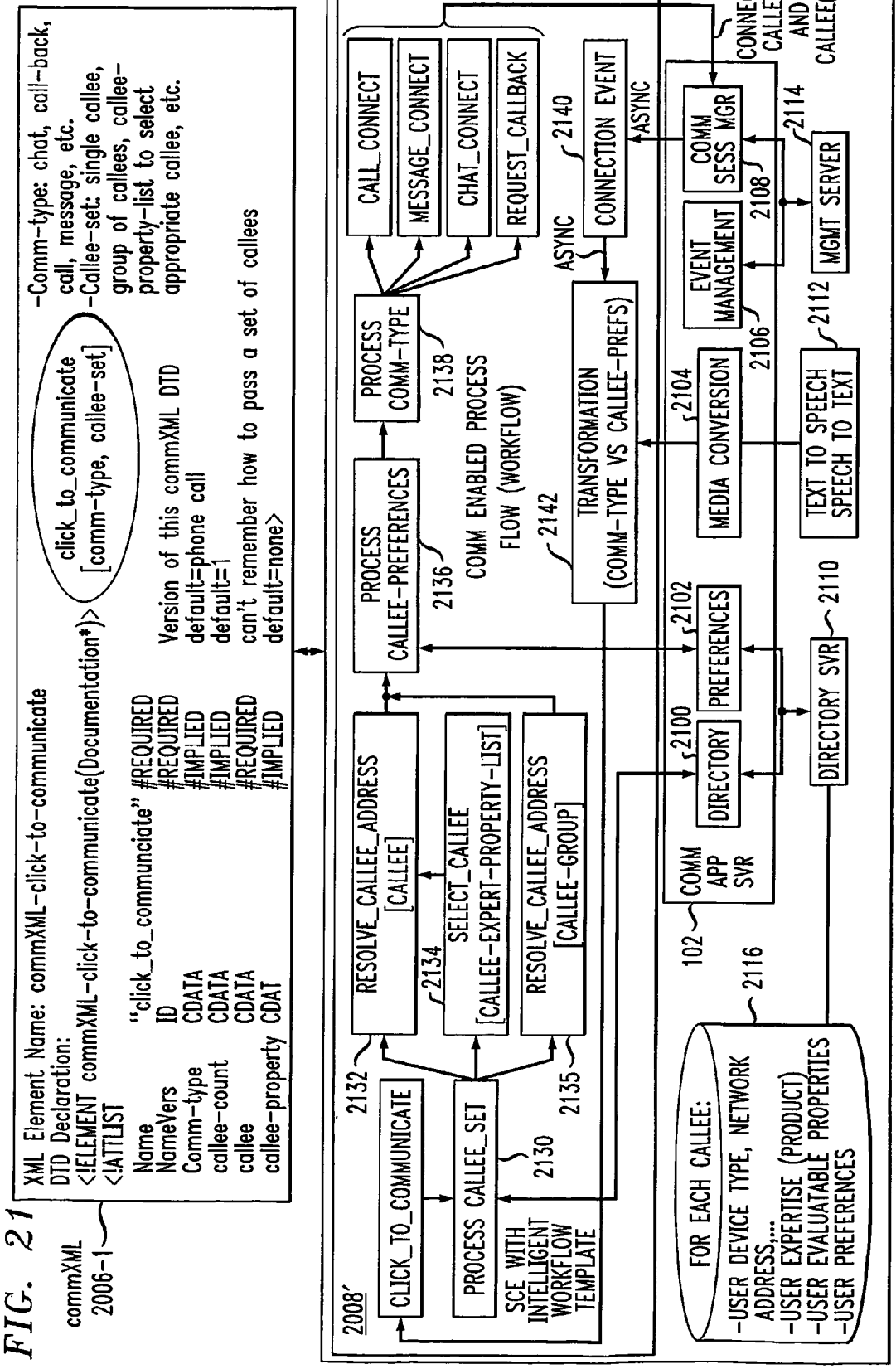
Figure 22:
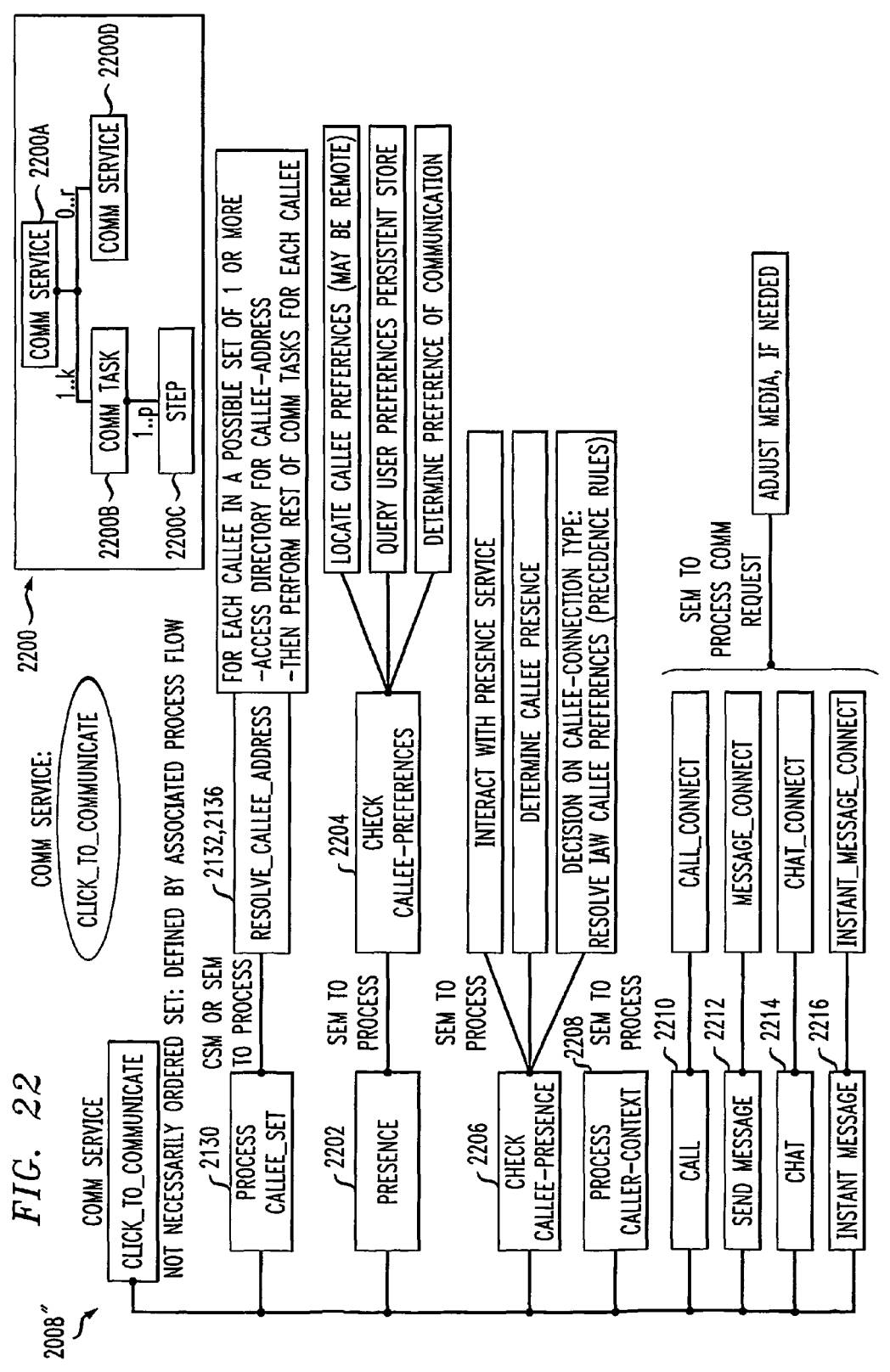

FIGS. 20, 21 and 22 illustrate the development, configuration and operation of an exemplary click-to-communicate service implementable in a CAS in accordance with the invention.

Referring now to FIG. 21, the upper portion of the figure illustrates the development of connect and click-to-communicate services using the service creation environment 152. The user in this context is a system developer, and that user performs service define, produce and construct operations utilizing the service creation environment 152 as previously described. More specifically, in this example the developer defines the steps associated with the given service, that is, defines a communication workflow, constructs the appropriate APIs, defines service behavior, and the manner in which service responses will be handled. For the connect service, a set of steps 2002 are defined, including establish session, process callee-set, resolve callee-address, process callee-preferences, establish communication service and session management communication connection, wait, and process incoming call or message. The click-to-connect service in this example may be constructed by modifying the connect service in the manner shown, leading to the set of steps 2004, which includes the steps of the connect service as well as additional steps including media adjustment steps, and a process communication type step.

The lower portion of FIG. 21 illustrates the execution of the click-to-communicate service in the CAS 102 on behalf of a user which in this embodiment may be a business application, a business object transaction, or other CAS user requiring execution of the click-to-communicate service. Associated with this user is a set of client side API elements 2006 in the form of communication service XML service declaration elements, including an element 2006-1 for the click-to-communicate service, an element 2006-2 for an alert service, an element 2006-3 for the connect service, and an element 2006-4 for a broadcast-respond service. The click-to-communicate service as defined in the service creation environment 152 to include the set of steps 2004 is associated with the client side XML element 2006-1, and with a communication workflow 2008, also referred to as a communication transaction.

The CAS 102 as illustrated in this example includes operational elements including a session manager operation 2010, a get user profile operation 2012, a get user preferences operation 2014, an invoke API operation 2016, an invoke media adjustment operation 2018, and a receive API operation 2020. These operations may be carried out using one or more of the components of the CAS 102 as previously described in conjunction with FIG. 1 and elsewhere herein.

FIG. 21 shows the client side API XML element 2006-1 in greater detail, as well as additional details associated with execution of the corresponding communication workflow utilizing the CAS 102. The communication word low, also referred to herein as a communication enabled process flow, is denoted as element 2008' in the figure. The CAS 102 in this exemplary illustration is shown as including operational elements for a directory operation 2100, a preferences operation 2102, a media conversion operation 2104, an event management operation 2106, and a communication session management operation 2108. Again, these operational elements of the CAS 102 may be carried out using one of more of the CAS components described in conjunction with FIG. 1 and elsewhere herein.

The directory and preferences operations 2100 and 2102 interact with a directory server 2110 (assuming the user preferences are stored persistently in the directory), the media conversion operation 2104 interacts with a text-to-speech and speech-to-text converter 2112, while elements 2106 and 2108 interact with a management server 2114. The directory server 2110 may access, for each callee associated with the click-to-communicate service, corresponding information from an associated storage device or other memory 2116. This information may include, by way of example, user device type, network address, user product expertise or other special expertise, user evaluatable properties, user preferences, etc. The elements 2110, 2112 and 2114 are shown as being external to the CAS 102 in this example, but these elements could be at least partially incorporated into the CAS in other embodiments of the invention. Also, the CAS can include other operational elements and may interact with other external elements, as was described previously herein.

The communication workflow 2008' associated with execution of the click-to-communicate service in the CAS 102 is generated in the service creation environment 152 as previously described, possibly using an intelligent workflow template or other suitable software development tool. The communication workflow as shown in this example includes a process callee-set operation 2130, which involves accessing the directory server 2110 via the directory element 2100 of the CAS 102. The process callee-set operation 2130 triggers a resolve_callee_address operation 2132 for the callee, a select_callee operation 2134, and a resolve_callee_address operation 2135 for the callee group if any. Following these operations in the communication workflow is a process callee-preferences operation 2136, which involves accessing the directory server 2110 via the preferences element 2102 of the CAS 102. This is followed by a process comm-type operation 2138, which based on the particular callee preferences may trigger one of a number of operations, including in this example a call_connect operation, a message_connect operation, a chat_connect operation and a request_callback operation, which lead to the connection of the caller and callee(s) via element 2108 of the CAS 102.

Element 2108 triggers an asynchronous connection event 2140, which is applied to a transformation operation 2142 which compares the communication type to the callee preferences. If necessary, the transformation operation 2142 accesses the text-to-speech and speech-to-text converter 2112, and provides appropriately transformed communication information back to the requester of the click-to-communicate service.

With reference now to FIG. 22, a more detailed example of a communication workflow associated with a click-to-communicate service is shown. The particular workflow shown in this figure is denoted as workflow 2008" and includes communication tasks and steps associated with an example click-to-communicate service.

The relationship between a communication service and a communication task has been previously referred to herein, and will now be described in greater detail. As shown generally at 2200, a given communication service 2200A can be decomposed into one or more communication tasks 2200B, e.g., 1, . . . k tasks, each of which may include one or more steps 2200C, e.g., 1, . . . p steps. Also, the given communication service 2200A may include multiple other communication services 2200D, e.g., 0, . . . r other services.

The set of tasks shown in FIG. 22 includes a communication task corresponding to the operation process callee-set 2130 as previously described, as well as additional tasks including presence 2202, check callee-preferences 2204, check callee-presence 2206, process caller-context 2208, call 2210, send message 2212, chat 2214 and instant message 2216. It should be noted that these tasks are not necessarily an ordered set, and that the particular execution order is defined by the associated process flow.

The various communication tasks and steps shown in the figure may be processed using elements such as service element manager 140, communication services manager 142 and intelligent router 144 of the CAS 102, in the manner previously described.

The communication task process callee-set triggers execution of resolve_callee_address steps 2132, 2135 as previously described. More specifically, for each callee in a possible set of one or more callees, a directory is accessed to determine the callee address, and then the remainder of the communication tasks in the defined workflow are performed for each of the callees.

The communication task check callee-preferences 2204 triggers execution of steps to locate callee preferences, possibly from a remote directory server accessible to the CAS, to query a user preferences persistent store associated with the CAS, and to determine preference of communication.

The communication task check callee-presence 2206 triggers execution of steps to interact with a presence service, to determine callee presence, and to make a decision on callee-connection type, e.g., to resolve IAW callee preferences using appropriate precedence rules.

The communication tasks 2210, 2212, 2214 and 2216 trigger corresponding tasks denoted call_connect, message_connect, chat_connect and instant_message_connect, one or more of which may trigger execution of a media adjustment step, if needed.

Figure 23:
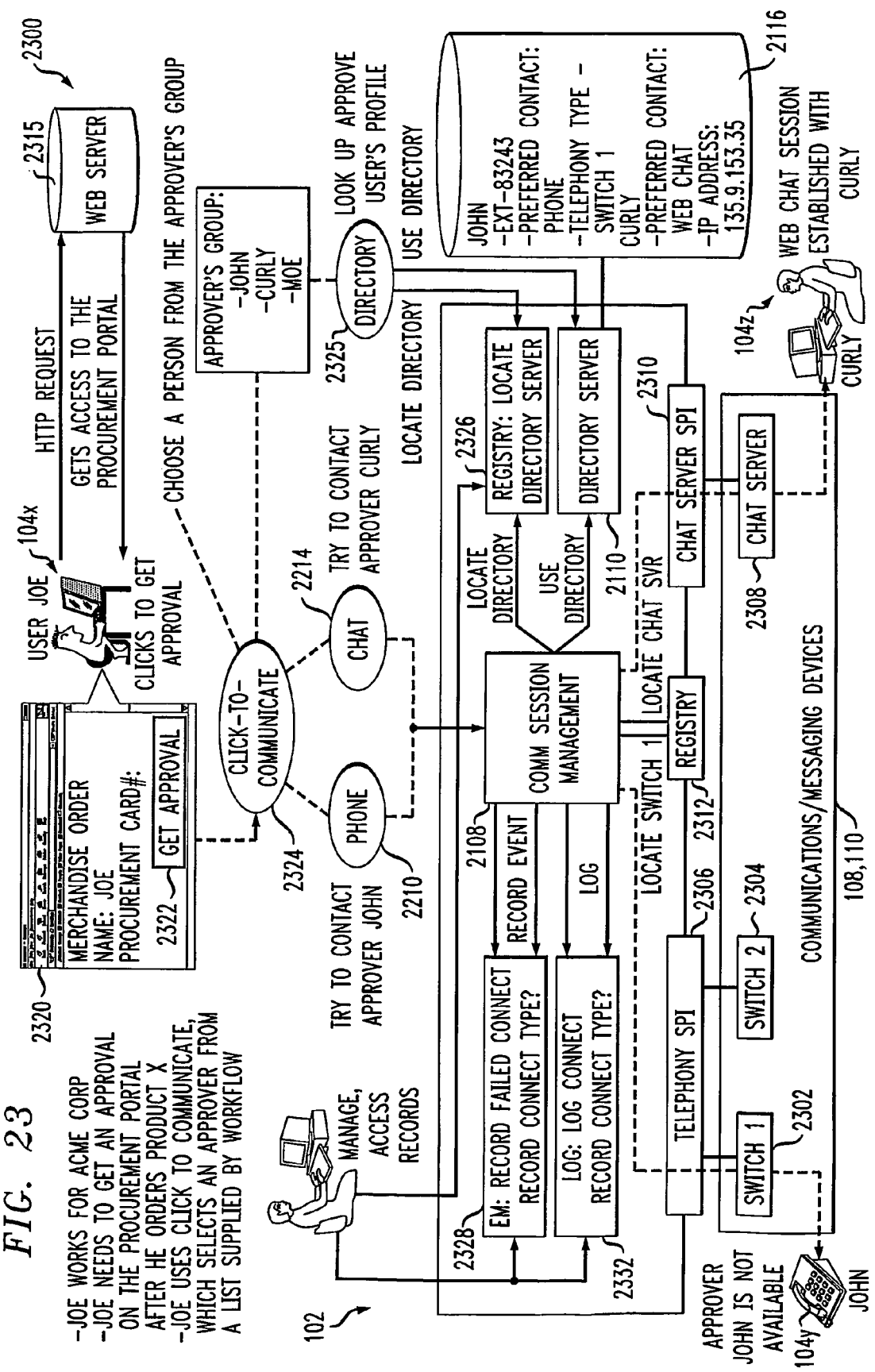

FIG. 23 shows a more particular example illustrating the operation of a click-to-connect service. In this example, the click-to-connect service is implemented in a communication-enabled supply chain management application in a communication system 2300 which includes CAS 102. The system 2300 includes elements 2108, 2110, 2116, which operate substantially as described previously herein. The system 2300 further includes endpoints 104x, 104y and 104z, and servers 108, 110 which illustratively include a first switch 2302 also denoted as Switch 1, a second switch 2304, also denoted as Switch 2. The switches 2302 and 2304 are accessible via a telephony service provider interface (SPI) 2306. Also included in the servers 108, 110 is a chat server 2308, which is accessible via a chat server SPI 2310. The CAS 102 also includes or is otherwise associated with a registry 2312 as shown.

In this example, a user "Joe" associated with endpoint 104x accesses the click-to-communicate service of CAS 102 by first sending an HaTP request to a web server 2315 to obtain access to a procurement portal which includes one or more communication services supported by the CAS 102. After Joe has obtained access to the procurement portal and the associated CAS-supported services, Joe generates a merchandise order via a web page 2320. It is assumed that this particular procurement order requires an approval. The displayed web page 2320 thus includes a "Get Approval" button 2322 that triggers access to the CAS-supported click-to-communicate service 2324. Joe clicks on the button 2322, which in this example first determines a designated group of approvers, shown as including John, Curly and Moe, selects a given approver from the group, e.g., the first approver in the group, and initiates a directory service 2325 which attempts to locate a directory server via registry 2312 as indicated at 2326.

The directory service 2325 utilizes directory server 2110 to accessed stored user information 2116, which in this example indicates for John an extension (83243), a preferred contact (telephone) and a telephony type (Switch 1), and for Curly a preferred contact (web chat), and an IP address (135.9.153.35). The CAS 102 then attempts to access the first approver in the group, that is, John, by initiating a call communication task 2210. The task 2210 results in the placement of a telephone call to endpoint device 104y, which is assumed to correspond to extension 83243, via Switch 1 and telephony SPI 2306.

As indicated in the figure, the approver John turns out to be unavailable at endpoint 104y, so the CAS records a failed connect and connect type as indicated at 2328. The CAS via the defined click-to-communicate service 2324 then selects the next approver from the group, namely Curly, and initiates a chat communication task 2214. The chat communication task 2214 results in the initiation of a web chat session between Curly at endpoint 104z and Joe at endpoint 104x, via chat server 2308 and the chat server SPI 2310. Since this chat session is successfully established, the CAS 102 logs the connection event and records the connection type as indicated at 2332.

Another example of a communication-enabled supply chain management application utilizing communication services provided by a CAS in accordance with the invention is as follows. For a given supply chain, the supply chain management software specifies how to handle different levels of exception conditions. For the more severe level, an emergency collaboration session may be called for with specific participants, where these participants can configure their reachability preferences using the same definition of severity levels. The communication system can then use these preferences, along with corresponding presence information, to determine the best means to set up the collaboration session, whether it be through an instant message if the participant is in the middle of a meeting, a phone call if the participant is on the road, or a web collaboration session if the participant is in the office.

Figure 24:
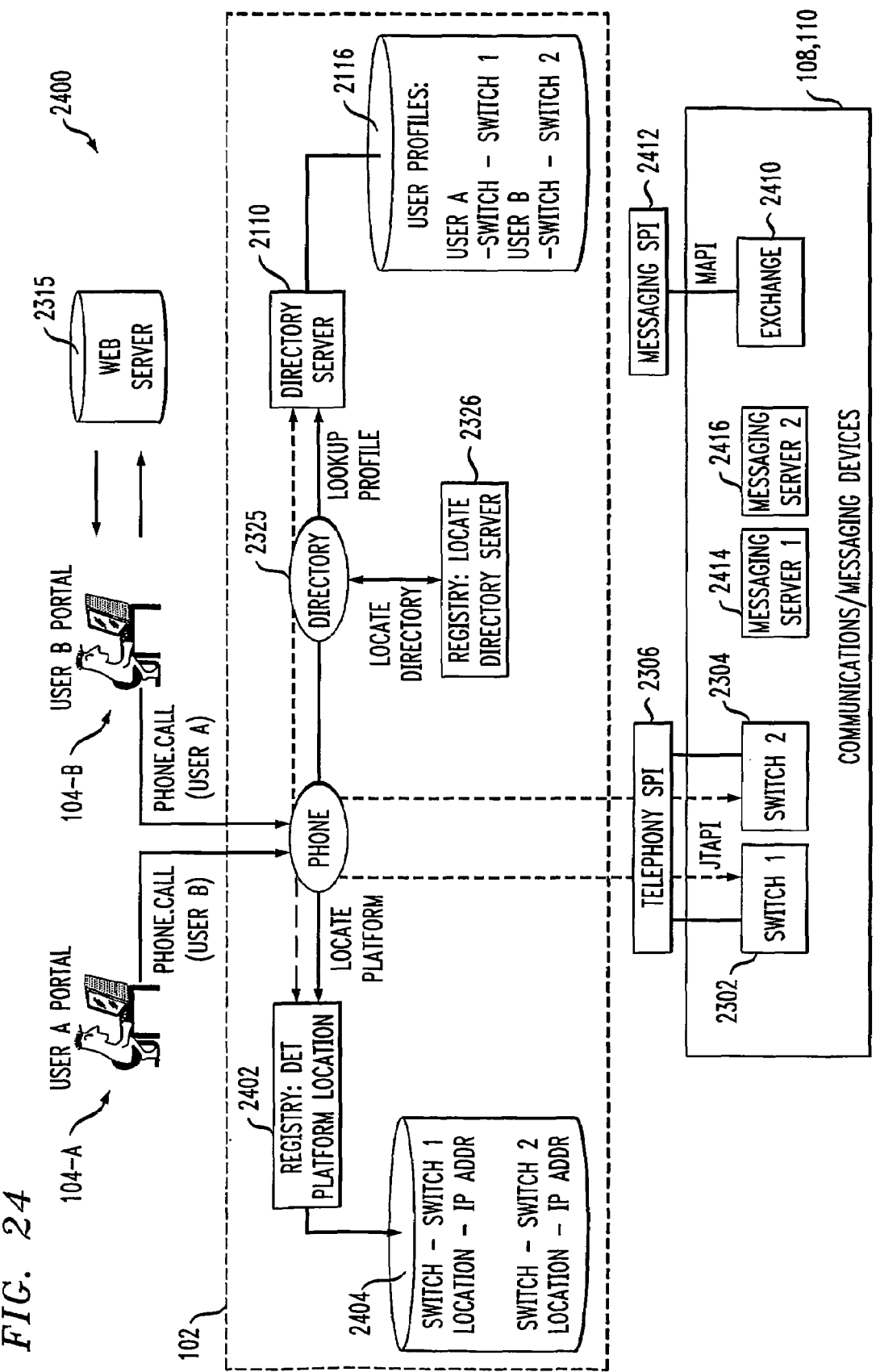

FIG. 24 shows yet another example of the operation of a CAS in accordance with the invention. A communication system 2400 includes CAS 102, first and second endpoint 104-A and 104-B associated with respective portals for a user A and a user B, and servers 108, 110 which include telephony switches 2302 and 2304 accessible via telephony SPI 2306. The servers 108, 110 further include a message exchange server 2410 accessible to the CAS 102 via a messaging SPI and a messaging API, and first and second messaging servers 2414 and 2416, also denoted as Messaging Server 1 and Messaging Server 2, respectively.

Associated with the CAS 102 in this example are the elements 2110, 2116, 2210, 2325 and 2326, all of which operate substantially as previously described herein.

It is assumed that users A and B are each utilizing different communication system switches to support their respective endpoints 104-A and 104-B, namely, user A utilizes Switch 1 and user B utilizes Switch 2. These two switches may be completely distinct, e.g., different models from different manufacturers, and thus ordinarily may be incompatible with one another outside of a connection established in a conventional manner via a PSTN. However, the CAS 102 allows each of the users 104-A and 104-B to transparently access the telephony switch of the other user, as if these users were in fact sharing the same physical switch.

In operation, when user A places a call to user B or vice-versa, the directory service 2325 locates the directory server 2110 utilizing the registry as indicated at 2326, and accesses user profile information in element 2116. This user profile information indicates that user A is associated with Switch 1 and that user B is associated with Switch 2. Another registry operation 2402 is initiated in the CAS to determine the platform location of the particular switches involved. This results in access to storage element 2404, which specifies IP addresses for Switch 1 and Switch 2. The CAS 102 can then establish a direct connection between the users A and B.

The foregoing examples illustrate the improved communication flexibility that is achievable using a CAS in accordance with the present invention.

Functions, Features and Advantages of CAS Architecture

The CAS architecture as illustrated in conjunction with FIGS. 1, 2A, 2B, 2C, 3A and 3B, as well as other figures herein, provides a comprehensive framework for converged communication services involving a wide variety of diverse communication system functionalities such as telephony, messaging, applications, network communications, session services, portal services, etc. The following is a description of a number of the functions, features and advantages that may be associated with a given embodiment of a CAS in accordance with the present invention. It is to be appreciated that any subset of one or more of the functions, features or advantages listed below may be present in a given embodiment of the CAS. Moreover, the following list is not intended to be exclusive or exhaustive, and a given embodiment of the invention need not support any of the particular elements listed, and may support other elements that are not specifically listed.

1. Communication services driven by the same business rules as enterprise application services.

2. Communication applications exposed as open integratable application services.

3. Communication components that are integratable and composable into higher level services.

4. Communication services registered as part of a service registry.

5. Communication services invocable by open Internet-based standards (e.g., XML, XML/SOAP, Java EJB, etc.).

6. Environment for creating communication services based on open standards.

7. Environment for creating composed communication services based on open standards.

8. Set of communication libraries.

9. Set of communication libraries that are integratable into an application through a communication application development toolkit.

10. Customizable communication software development toolkit with open interfaces.

11. Generic framework that can incorporate multiple communication environments and infrastructures.

12. Open environment for creating customized communication services and applications.

13. Converged communication environment that enhances the capabilities of all communication devices (telephones, PCs, pagers, cell phones, IP phones, intelligent phones, PDAs, etc.) regardless of their infrastructure (IP, PSTN, ATM, SMS, etc.).

14. Converged communication environment for real-time and non-real-time communication.

15. Intelligent communication for devices that deliver information when the user wants, where it is wanted, as the user wants, and on an endpoint device of choice.

16. Multimodal communication services delivered in a mode that is appropriate to the access appliance, as designated by the recipient.

17. Concurrent multi-modal communications.

18. Federated services that extend across multiple different domains of applications and infrastructure.

19. Federated services that ensure consistency of business rules across multiple domains including infrastructure, infrastructure services, applications, communication services, etc.

20. Federated services that extend across multiple different technology boundaries.

21. Federated services that provide open interfaces.

22. Specification of a user engaged in communication (e.g., communication party).

23. The CAS includes components to compose more complex services and each such complex services can be a composition of one or more less complex communication services. These complex services can in turn be integrated into the CAS as part of its set of offered communication services.

24. The CAS includes an execution environment to execute any communication services of the CAS, including authentication, execution, session management, context management, service execution, communication service execution of each part, aggregation of results, etc. Complex services can be a composition of many separate communication services, each of which is executed as defined.

25. The CAS provides the capability to execute synchronous or asynchronous communication services, separately or composed into a complex communication service.

26. Converged communication of traditional PSTN telephony with IP telephony and real-time IP communication.

27. Converged voice and data access to either voice or data information.

28. Converged communication and data based management services, including but not limited to event management.

29. The CAS may include basic building blocks of communication features which can be executed individually or composed to provide a higher level service.

30. Dynamic discovery and execution of communication services independent of the platform of the server.

31. Execution of the communication services independent of the software programming language.

32. Execution of the communication services independent of the software middleware environment.

33. Communication services to Enterprise and non-Enterprise telephony servers.

34. Communication services to Enterprise and non-Enterprise portal servers.

35. Communication services to Enterprise and non-Enterprise messaging servers.

36. Communication services to Enterprise and non-Enterprise media servers.

37. Communication services to Enterprise and non-Enterprise SIP servers.

38. Open, programmable environment of communication services for use by developers, through a service creation environment of open toolkits.

39. Open, standards-based set of interfaces to all major components of the CAS.

40. Peer-to-peer communication, with increased control and intelligence at the communication session endpoints.

41. Modular communication services to facilitate rapidly creating integrated Internet data-centric services with communication services by integrating disparate communication elements via well-defined standard open interfaces, even mixing the communication elements from different vendors or other sources.

42. Telephony switch features as separable distributable interworking services, accessible via open interfaces, interworking with other openly accessible communication elements, providing openly externally accessible communication services.

43. Increased use and centrality of voice control and manipulation of total communications as well as human visual and auditory presentation of information.

44. Enterprise-wide presence information about user, appliance, device, etc. across converged communications, including where and how to contact a given user at any time over any medium according to personal needs. The CAS can be configured to provide presence on a totally enterprise-wide distributed stage across various products, blended with presence across SIP servers, both enterprise based as well as 3rd party.

45. Intelligent routing based on presence, preferences, channel capacity, QoS, routing rules decisions, etc.

46. QoS based on business needs.

47. Communication services to "powerful" endpoints, including desktop PCs, PDAs, cell phones, set top boxes, televisions, etc.

48. Enhanced customization for receiving communication, including presentation preference services, communication customized preferred manner of receiving communication requests, etc.

49. Use of voice for activation, control, and feedback, even for the desktop.

50. Distributed intelligence, control, software component services, infrastructure services, federated services, portal services, etc.

51. Application integration of telephony services.

52. Application integration of messaging services.

53. Application integration of media services.

54. Portal component configured for initiating and receiving services through web based interfaces.

55. Communication capabilities operative over a variety of endpoints and networks ensuring flexibility.

56. Communication services available anytime, anywhere, under any condition through reliability techniques.

57. Communication services that are simple and intuitive to install, use, and maintain.

58. Transparent access to communication-oriented services and to existing data-oriented information by means of standard APIs including J2EE interfaces, such as JNDI, Java Database Connectivity (JDBC), JavaMail, etc. as well as J2EE frameworks such as JCA, Java Authentication and Authorization Service (JAAS), etc.

59. Communication services in the form of modular software components that offer a communication-related service to the user.

60. Combining SIP and traditional telephony, providing seamless access by an application or endpoint device.

61. Enhanced capabilities to the SIP and traditional telephony environments, including, for example, providing presence as a communication service by extracting presence information from traditional communication services and converging this with presence of the SIP services.

62. Protocol management through appropriate connectors invoking the appropriate protocol for each communication or data element, including SIP for real-time communications, HTTP for web services, SMTP for e-mail, XML/SOAP, proprietary ASAI to ACP, etc. and managing the convergence of the results of these different environments.

63. Service and session management capabilities providing transparent unified access to voice, web, IM, presence and other session services and providing session, context and interaction management for communication services.

64. Application session management managing the session and state of application requests of communication services, across multiple communication services, synchronously invoked or asynchronously invoked, with synchronous or asynchronous responses, integrated with an individual communication session and state management.

65. Context management across converged communications.

66. Third-party call control (3PCC) as an open communication service capability.

67. Communication service creation tools for communication services including voice portal services, SIP services, etc.

68. A combination of communication services and SIP services, bridging not only protocols but also the feature sets between traditional network infrastructure elements and IP infrastructure elements.

69. A single converged communication session including both SIP and traditional telephony requests.

70. Data and voice access to portal services.

71. Converged communication of SIP services extended to traditional telephony services, such as conferencing.

72. Converged communication of traditional telephony services extended to SIP services, such as 3PCC.

73. Communication services to the application through Internet based interfaces including XML/SOAP, web services, EJB, etc.

74. Converged communication across traditional network infrastructure elements, such as telephony, media, messaging, etc., and SIP services.

75. Multimedia multi-modal portal that enables access of mobile end users, enterprise applications or other users to all CAS communication services.

76. Convergence of multi-telephony switches, multi-SIP services and multi-portal access, collectively and transparently to the requester of the communication service.

77. A software infrastructure, including components, interfaces, constraints, and rules, providing convergence of voice and data from infrastructure to application.

78. An ability to open communications as application web services that integrate voice and messaging related components and are integratable into a business application in a seamless manner.

79. Communication services that execute on a 3rd party application server.

80. Easily installable and configurable components for ease of integration into a customer's environment.

81. Interface specifications that are standards based or open to accommodate the blending of 3rd party partial solutions in creating new, possibly complex, communication services.

82. Access to a user profile of communication related information.

83. Provision of network edge services.

84. Supports a variety of client types, both outside and inside of corporate firewalls.

85. Supports client services through web containers in a web tier and supports business logic component services through generic component containers.

86. Additional connectors such as Java Telephony API (JTAPI), Intuity® Messaging API (IMAPI), etc.

87. Security services providing enhancement over similar services offered on external servers.

88. Common OAM&P across communication related components.

89. Provision of administration services.

90. Disaggregation of telephony applications into readily commoditized standard components, services and software.

91. Communication services integratable into customer application environments.

92. Enables integration and leverage of applications and services in a flexible, open environment.

93. Leverages existing data and web infrastructure in customer premises, e.g., application servers, portal servers, interfaces such as XML and SOAP, etc.

94. Services-based environment accommodates both peer-to-peer and client-server applications.

95. Acts as a runtime environment that provides the realization of communication services in a transparent manner.

96. Provides a development environment for the customers such as large enterprises, small or medium enterprises, systems integrators, independent software vendors, etc.

97. Provides the ability to access existing communication services, as well as enhanced communication services, in a converged manner.

98. Communication enabling of applications through a software infrastructure that provides the convergence of voice and data services.

99. Supports a virtual enterprise of mobile workers or customers that access services independent of voice or data endpoints.

100. Transparency of distributed heterogeneous solutions across multiple enterprises.

101. Support for fully distributed real-time, near-real-time and non-real-time service capabilities.

102. Dynamic discovery and use of communication services.

103. Integration of communication services into a customer enterprise as a library of services, remotely and dynamically executable services, etc.

104. Definition of complex communication services from composable communication services.

105. A common communication-enabling middleware that supports users, applications, and appliances.

106. Allows building of value added components that have intelligent behavior based on information gathered from an application context and historical behavior to drive system behavior and the user experience.

107. Enables the creation, sharing, and persistence of consistent context among business applications, communication systems, and a converged communications infrastructure.

108. Provides access to presence and availability management services on behalf of subscribers, including invocation of location services, DNS services, etc.

109. Allows a communication service to co-exist within CAS and a business application environment.

110. Allows a communication service or an associated interface to be integratable as a component into a business application for execution.

111. Allows a business application to combine communication services together to achieve a different, new or advanced capability.

112. Provides access to federated services that are selectable via an interface that allows separate identification and use of specific services, dynamically executable at runtime as a stand-alone capability, and autonomously available for selection without the need for deployment time or administration time provisioning.

113. Provides convergence between communication applications and enterprise applications.

114. Provides convergence amongst multiple communication applications and modes, real-time, near-real-time, and non-real-time, regardless of the underlying network infrastructure.

115. Provides convergence between communication applications infrastructure and enterprise applications infrastructure.

116. Provides convergence between common operating environment (COE) type services, e.g., a user in an enterprise space is the same user in a communication space, independent of how "user" is stored and processed in each space.

117. Provides convergence between interfacing technologies in business applications and communication applications.

118. Provides convergence of processing behavior between communication and business applications, associated with access to and use of common metadata that drives the communication service processing, e.g., dynamically changing customer data such as context, presence, customer profile, order information, history, etc.

As noted above, a CAS in accordance with the invention can be configured in a given embodiment to provide one or more of the above-noted functions, features or advantages, but the invention is not required to include any particular arrangement of such elements.

Moreover, as mentioned previously, the invention can be implemented at least in part in the form of one or more software programs storable in a memory or other machine-readable storage medium, and executable by a processor of a CAS. A computer-readable storage medium or device disclosed herein expressly excludes transitory signals per se and transitory mediums such as carrier waves, wires, cables, fiber optics, infrared media, communication media, and the like.

The above-described embodiments of the invention are intended to be illustrative only, and numerous alternative embodiments within the scope of the appended claims will be apparent to those skilled in the art.

What is claimed is:

1. A system comprising: a processor; and
a non-transitory computer-readable storage medium having stored therein instructions which, when executed by the processor, cause the processor to perform operations comprising:
in response to a communication service request from a requester, identifying a communication service supported by the system, the communication service request being associated with session information comprising (i) a session hierarchy for breaking the communication service into communication tasks to be processed in a recursive fashion and (ii) aggregation information for aggregating responses from each of the communication tasks based on response types;
executing the communication tasks in the recursive fashion to yield responses from the communications tasks, wherein at least two of the communication tasks are invoked and executed concurrently with each other;
based on the session information, aggregating the responses to yield an overall response; and
routing the overall response to the requester through a corresponding connector interface identified by the system for communicating the overall response.

2. The system of claim 1, wherein the computer-readable storage medium stores additional instructions which, when executed by the processor, cause the processor to perform further operations comprising:
based on the session information, determining an executable communication task associated with the communication service, wherein identifying the communication service and determining the executable communication task is performed via a communication service and session management component, the communication service and session management component comprising a session manager and
establishing a communication with an external server to execute the executable communication task, wherein the communication is established via the corresponding connector interface.

3. The system of claim 2, wherein the communication service and session management component further comprises:
a service event manager for processing the communication service request to identify the communication service;
a communication services manager adapted for interaction with a service event manager and operative to determine the executable communication task associated with the communication service; and
a routing element operative to establish communication with the external server.

4. The system of claim 2, wherein the external server comprises one of an enterprise server or a communications server.

5. The system of claim 4, wherein the communications server comprises a communication system telephony switch.

6. The system of claim 1, further comprising an access manager for controlling access of the requester to the system.

7. The system of claim 1, wherein the communication service request originates from an endpoint external to the system.

8. The system of claim 7, wherein the communication service request originates from an application running on the endpoint.

9. The system of claim 1, wherein the communication service comprises a federated communication service.

10. The system of claim 1, wherein the communication service comprises a federated core service.

11. The system of claim 10, wherein the federated core service comprises a communication service script.

12. The system of claim 10, wherein the federated core service comprises a user profile database service.

13. The system of claim 10, wherein the federated core service comprises one of a directory service, a registry service, a persistent store service, a QoS service, or a security service.

14. The system of claim 1, wherein the system receives communication service requests from a plurality of external applications, and provides communication services in response to the communication requests, utilizing an external server.

15. The system of claim 1, wherein the communication service request is received via a portal associated with the system.

16. The system of claim 1, wherein the communication comprises one of a telephony session, a messaging session, or an instant messaging session.

17. The system of claim 1, wherein the communication corresponds to an executable communication task associated with the communication service, and involves execution of at least a portion of the communication task by an external server.

18. The system of claim 1, wherein the communication service comprises a plurality of executable communication tasks, each of at least a subset of the plurality of executable communication tasks comprising a specified processing step.

19. The system of claim 1, wherein the communication service comprises additional communication services, the additional communication services having executable communication tasks associated therewith.

20. The system of claim 1, wherein the communication service is implemented in accordance with a communication workflow specified in a service creation environment associated with the system.

21. The system of claim 1, wherein the system comprises a communication application server.

22. The system of claim 1, wherein the executable communication task is executed substantially within the system.

23. The system of claim 1, wherein one of the communication tasks is executed via an external server, wherein the external server comprises a server implemented on a common processing platform with the system.

24. A communication application server comprising: a processor; and
   a non-transitory computer-readable storage medium storing instructions which, when executed by the processor, cause the processor to perform operations comprising:
   processing a communication service request to identify a communication service supported by the communication application server;
   managing session information associated with the communication service request, the session information comprising (i) a session hierarchy for breaking the communication service into executable communication tasks to be processed in a recursive fashion and (ii) aggregation information for aggregating responses from each of the executable communication tasks based on response types;
   determining the executable communication tasks associated with the communication service;
   establishing communication with an external server to carry out an execution of the executable communication tasks associated with the communication service to yield responses from the executable communication tasks, wherein at least two of the executable communication tasks are invoked and executed concurrently with each other;
   based on the session information, aggregating the responses to yield an overall response; and
   routing the overall response to a requester of the communication requester.

25. A method comprising:
   processing, via a communication application server, a communication service request to identify a communication service supported by the communication application server;
   managing session information associated with the communication service request, the session information comprising (i) a session hierarchy for breaking the communication service into executable communication tasks to be processed in a recursive fashion and (ii) aggregation information for aggregating responses from each of the executable communication tasks based on response types;
   determining the executable communication tasks associated with the communication service;
   establishing communication with an external server to carry out execution of the executable communication tasks associated with the communication service to yield responses from the executable communication tasks, wherein at least two of the executable communication tasks are invoked and executed concurrently with each other;
   based on the session information, aggregating the responses to yield an overall response; and
   routing the overall response to a requester of the communication requester.

26. A computer-readable storage device storing instructions which, when executed by a processor, cause the processor to perform operations comprising:
   processing, via a communication application server, a communication service request to identify a communication service supported by the communication application server;
   managing session information associated with the communication service request, the session information comprising (i) a session hierarchy for breaking the communication service into executable communication tasks to be processed in a recursive fashion and (ii) aggregation information for aggregating responses from each of the executable communication tasks based on response types;
   determining the executable communication tasks associated with the communication service;
   establishing communication with an external server to carry out execution of the executable communication tasks associated with the communication service to yield responses from the executable communication tasks, wherein at least two of the executable communication tasks are invoked and executed concurrently with each other;
   based on the session information, aggregating the responses to yield an overall response; and
   routing the overall response to a requester of the communication requester.

* * * * *

UNITED STATES PATENT AND TRADEMARK OFFICE
CERTIFICATE OF CORRECTION

PATENT NO. : 9,015,297 B2  
APPLICATION NO. : 10/484400  
DATED : April 21, 2015  
INVENTOR(S) : Jannis Rae Putman Page 1 of 1

It is certified that error appears in the above-identified patent and that said Letters Patent is hereby corrected as shown below:

IN THE CLAIMS

Column 48,

Line 29, replace "wherein the computer-readable" with --wherein the non-transitory computer-readable--

Column 50,

Line 11, replace "nication requester." with --nication service request.--

Line 37, replace "nication requester." with --nication service request.--

Line 65, replace "nication requester." with --nication service request.--

Signed and Sealed this
Eighth Day of March, 2016

Michelle K. Lee
*Director of the United States Patent and Trademark Office*